United States Patent
Kobayashi

(10) Patent No.: US 7,146,430 B2
(45) Date of Patent: Dec. 5, 2006

(54) TECHNIQUE FOR ENHANCING EFFECTIVENESS OF CACHE SERVER

(75) Inventor: Masayoshi Kobayashi, Tokyo (JP)

(73) Assignee: NEC Corporation (JP)

( * ) Notice: Subject to any disclaimer, the term of this patent is extended or adjusted under 35 U.S.C. 154(b) by 668 days.

(21) Appl. No.: 09/915,056

(22) Filed: Jul. 25, 2001

(65) Prior Publication Data

US 2002/0065932 A1 May 30, 2002

(30) Foreign Application Priority Data

Jul. 25, 2000 (JP) .............................. 2000-224448

(51) Int. Cl.
*G06F 15/16* (2006.01)
*G06F 15/173* (2006.01)
*H04J 1/16* (2006.01)
*H04J 3/14* (2006.01)
*H04L 1/00* (2006.01)
*H04L 12/26* (2006.01)
*H04L 12/28* (2006.01)

(52) U.S. Cl. .............. 709/238; 709/200; 709/239; 709/240; 709/241

(58) Field of Classification Search ........ 709/238–241, 709/200
See application file for complete search history.

(56) References Cited

U.S. PATENT DOCUMENTS

| | | | | |
|---|---|---|---|---|
| 5,521,910 | A * | 5/1996 | Matthews | 370/256 |
| 5,956,339 | A * | 9/1999 | Harada et al. | 709/238 |
| 6,167,438 | A * | 12/2000 | Yates et al. | 709/216 |
| 6,201,794 | B1 * | 3/2001 | Stewart et al. | 709/239 |
| 6,292,489 | B1 * | 9/2001 | Fukushima et al. | 709/238 |
| 6,502,175 | B1 * | 12/2002 | Krishnan et al. | 711/170 |
| 6,507,563 | B1 * | 1/2003 | Glick | 370/236 |
| 6,546,422 | B1 * | 4/2003 | Isoyama et al. | 709/238 |
| 6,606,303 | B1 * | 8/2003 | Hassel et al. | 709/241 |
| 6,678,244 | B1 * | 1/2004 | Appanna et al. | 370/229 |
| 6,697,333 | B1 * | 2/2004 | Bawa et al. | 370/238 |
| 2001/0053149 | A1 * | 12/2001 | Mo et al. | 370/389 |

FOREIGN PATENT DOCUMENTS

| | | | | |
|---|---|---|---|---|
| JP | | 05244249 A | * | 9/1993 |
| JP | | 7-58748 | | 3/1995 |
| JP | | 9-214509 | | 8/1997 |
| JP | | 10-243440 | | 9/1998 |
| JP | | 11-224239 | | 8/1999 |

OTHER PUBLICATIONS

English translation of relevant portions of a Japanese office action issued Mar. 1, 2005.

* cited by examiner

*Primary Examiner*—Khanh Dinh
*Assistant Examiner*—Hassan Phillips
(74) *Attorney, Agent, or Firm*—Dickstein, Shapiro, LLP.

(57) ABSTRACT

A path calculating section obtains a path suitable for carrying out an automatic cache updating operation, a link prefetching operation, and a cache server cooperating operation, based on QoS path information that includes network path information and path load information obtained by a QoS path information obtaining section. An automatic cache updating section, a link prefetching control section, and a cache server cooperating section carry out respective ones of the automatic cache updating operation, the link prefetching operation, and the cache server cooperating operation, by utilizing the path obtained. For example, the path calculating section obtains a maximum remaining bandwidth path as the path.

24 Claims, 37 Drawing Sheets

FIG.4

| ROUTER ADDRESS | LINK | BANDWIDTH | REMAINING BANDWIDTH | NEXT HOP ROUTER ADDRESS | CONNECTION SUB-NET ADDRESS |
|---|---|---|---|---|---|
| R100 | L0 | 10 Mbps | 5 Mbps | R101 | |
| R100 | L0 | 10 Mbps | 5 Mbps | R101 | C101,T1,T2 |
| R101 | L0 | 10 Mbps | 5 Mbps | R101 | |
| R101 | L1 | 20 Mbps | 1 Mbps | R102 | |
| R101 | L2 | 10 Mbps | 7 Mbps | R103 | |
| R101 | | | | | C102,T3 |
| R102 | L1 | 20 Mbps | 1 Mbps | R101 | |
| R102 | L3 | 10 Mbps | 4 Mbps | R103 | |
| R102 | L5 | 10 Mbps | 8 Mbps | R104 | |
| R102 | | | | | C103,S1 |
| R103 | L3 | 10 Mbps | 4 Mbps | R102 | |
| R103 | L2 | 10 Mbps | 7 Mbps | R101 | |
| R103 | L4 | 10 Mbps | 3 Mbps | R104 | |
| R103 | | | | | S2 |
| R104 | L4 | 10 Mbps | 3 Mbps | R103 | |
| R104 | L5 | 10 Mbps | 8 Mbps | R102 | |

TECHNIQUE FOR ENHANCING EFFECTIVENESS OF CACHE SERVER

BACKGROUND OF THE INVENTION

1. Field of the Invention

The present invention relates to a cache server and a network system having cache servers. The invention particularly relates to a technique of performing prefetching of linked information (link prefetching) and the like with enhanced effectiveness of a cache server in high probabilities without deteriorating a congestion status of the network.

2. Description of the Related Art

A conventional network system having cache servers will be described with reference to FIG. 36 and FIG. 37.

FIG. 36 is a block diagram showing an example of the configuration of a conventional network system having cache servers. Web servers S1 and S2 are the servers that exist within sub-nets N2 and N3, respectively, and hold various Web (Worldwide Web) contents. Terminals T1, T2 and T3 for accessing the Web servers S1 and S2 exist within sub-nets N1 and N4. Cache servers C1, C2 and C3 are also disposed on the network. Routers R0, R1, R2, R3 and R4 connect the sub-nets N1, N2 and N3 using links L0 to L5 to form the network. The cache servers C1, C2 and C3 hold copies of various contents on the Web server (here, S1 and S2).

When a terminal (assumed at T1 in this case) obtains the content from a Web server (assumed as S1 in this case), a certain cache server (assume as C1 in this case) intermediates this operation. When there has occurred a request for making access to the content information of the Web server S1, first, the cache server C1 checks whether the cache server C1 itself is holding the content information of the Web server S1 or not. When the cacher server C1 is not holding the content, the cache server C1 inquires other cache servers such as the cache servers C2 and C3 about whether these cache servers hold the content or not. The cache server C1 obtains the content information from the cache server that holds the same, or obtains the same from the Web server that has originally held the content (such a web server is called an original Web server) before forwarding the obtained content to the terminal T1. At the same time, the same content may also be held in a storage within the cache server C1. In this case, the cache server C1 passes the content information to the terminal T1.

When the cache server C1 holds the content, the content is passed to the terminal T1. The cache server C1 inquires the original Web server S1 about the last update date and time of the content. When the content held in the cache server C1 is older than that of the original Web server S1, the cache server C1 may obtain the content from the original Web servers S1 again. This operation in hereafter called an update checking operation.

The cache server (C1, C2 or C3) is also inquired from another cache server, not only from a terminal, about whether the cache server hold the content information or not. The operation in this case is similar to that of the intermediation in the access from the terminal to the Web server. In other words, when there has occurred a request for making access to the content information of the Web server, this cache server checks whether the own cache server is holding the content information of the Web server of not. When the cache server is not holding the content, this cache server inquires other cache servers about whether these cache servers hold the content or not. The cache server obtains the content from the cache server that holds the content, or obtains the content information from the original Web server that has originally held the content. Then, the cache server passes the content information to the cache server that has made the original inquiry. In this case, the same content may also be held in a storage at the same time. When the cache server is holding the content, the content is passed to the cache server issuing the original inquiry. In this case, the update checking operation may be carried out.

Each of the cache servers carries out the above operation. It the update checking operation is not carried out, then the cache server may be holding the content information older than that of the Web server (the content information that does not reflect the updating of the content carried out at the Web server), even when the cache server is holding the content information of the Web server for which there has been an access request. In this case, the old contents are sent to the terminal. When the cache server is holding the old content at the time of carrying out the update checking, it takes time for the terminal to obtain the updated content, because the cache server obtains the updated content from the original Web server again.

For the above reason, it is important for each cache server to hold Web content information which has a high possibility of receiving an access request from terminals and is not older than that on the Web server.

In order to meet this requirement, the conventional cache server has carried out: 1) an automatic cache updating operation; 2) a link prefetching operation; and 3) a cache server cooperating operation.

The automatic cache updating operation is the operation of obtaining the latest version of the Web content held by the cache server from the original Web server by making access to this original Web server.

The link prefetching operation is the operation of previously obtaining the content information associated with links described in the Web content that is held by the cache server.

The cache server cooperating operation is the operation of carrying out redistribution, sharing and comparison of freshness of caches held by cache servers, among the cache servers. The cache redistribution is the operation that a cache server that does not have a certain content obtains the content from another cache server that has the content. The cache sharing is the operation that when a cache server that does not have a certain content has received a request for making access to the content from a terminal, this cache server transfers this access request to a cache server that has the content. The cache freshness comparison is the operation that a cache server that has a certain content checks whether another cache server has the latest version of the that reflect the latest updating by the Web server, and obtains the latest version when necessary.

For the cache server cooperating operation, the conventional cache servers have exchanged with each other a list of contents held by respective cache servers and information showing cache validity of contents held by each of the cache servers (called content summary). As the information showing the validity of a cache, and effective period of the cache indicated by the content originating server, and the last updating time and date of the content have been used.

FIG. 37 is a diagram showing an internal structure of the conventional cache server. Each circuit block will be described hereinafter.

A communication interface section 1 provides a transmission/reception interface between a network and each of a cache operating section 3, a congestion information obtaining section 2, a link prefetching control section 4, an automatic cache updating section 5, and a cache server cooperating section 7.

The congestion information obtaining section 2 investigates congestion information on a patch determined based on the content of a routing table to a destination on the network specified by the link prefetching control section 4, the automatic cache updating section 5, and the cache server cooperating section 7, based on test communication to a specified destination through the communication interface section 1. The congestion information obtaining section 2 passes the result of the investigation to the link prefetching control section 4, the automatic cache updating section 5, and the cache server cooperating section 7.

The cache operating section 3 receives a request for making access to the Web content from a terminal via the communication interface section 1, and searches a storage 6 for the content. When the content does not exist, the cache operating section 3 makes access to a corresponding Web server, and obtains the content. The cache operating section 3 stores the obtained content in the storage 6, and at the same time, transmits the content to the request-originating terminal. When the contents exist, the cache operating section 3 transmits the content to the request-originating terminal. In the case of carrying out the update checking operation when the content exist, the cache operating section 3 checks whether the last update date and time of the content held by the Web server. When the last update and time of the held content is older, the cache operating section 3 obtains the content of the Web server, holds the obtained content in the storage 6, and at the same time, passes the content to the terminal.

The link prefetching control section 4 extracts links to content information which are now not stored in the storage 6 but have a possibility of making access thereto from now on, from the links to relevant information described in the Web content stored in the storage 6. For example, the link prefetching control section 4 extracts a first predetermined number of links to content information which are now not stored in the storage 6 from a plurality of links described in the content. The link prefetching control section 4 checks the load statuses of the network on paths to the Web servers that hold the contents indicated by the extracted links, by utilizing the congestion information obtaining section 2. Then, the link prefetching control section 4 decides whether the contents indicated by the extracted links are obtainable, depending on the obtained load statues. When it has been decided that the content are obtainable, the link prefetching control section 4 makes access to the corresponding Web server, and obtains the content. The link prefetching control section 4 stores the obtained content in the storage 6. Preset information may also be used for making this decision.

The automatic cache updating section 5 investigates the intervals of updating of the content on the Web server where the content originally exist, for the Web content held in the storage 6. Then, the automatic cache updating section 5 determines the date and time of updating the cached content. On the determined date and time, the automatic cache updating section 5 investigates the congestion status of the network on the path to the corresponding Web server that holds the content, by utilizing the congestion information obtaining section 2. Then, the automatic cache updating section 5 decides based on the obtained congestion information whether the content is obtainable. When it has been decided that the content are obtainable, the automatic cache updating section 5 makes access to the corresponding Web server, and obtains the content. The obtained content is stored in the storage 6. Preset information may also be used for making this decision.

The storage 6 stores various Web contents and content summaries.

The cache server cooperating section 7 exchanges with one another lists of contents held by the respective cache servers and validity information showing the validity of cache of the content held by each cache server, which are used to carry out redistribution, sharing and comparison of freshness. At the time of exchanging the content list and validity information, the cache server cooperating section 7 investigates the congestion status of the network on the path to an opposite cache server by using the congestion information obtaining section 2. The cache server cooperating section 7 decides whether the information exchange is to be carried out, based on the obtained congestion information. As a result of the information exchange, the cache server cooperating section 7 finds out the content that should be obtained in advance from another cacher server. For the content that have been decided to be obtained in advance, the cache server cooperating section 7 investigates the congestion status of the network on the path to the cache server that holds the target content, by using the congestion information obtaining section 2. The cache server cooperating section 7 decides whether the content is obtainable or not, based on the obtained information. When it has been decided to obtain the content, the cache server cooperating section 7 obtains the content from the corresponding cache server.

Basically, 1) the automatic cache updating operation, 2) the link prefetching operation, and 3) the cache server cooperating operation are performed to predict the Web content that is required by the terminal, and makes access to the Web server prior to the time when the terminal actually requires the content so as to increase the effectiveness of a cache server. When the predicted content are not actually required, or when the content is updated more frequently at the Web server than the automatic cache updating operation, these operations are not effective. Only the resources of the network are wasted. Therefore, in many cases, the traffic generated by these three operations is desired not to interrupt other traffics that are generated based on the actual needs of the Web servers by the terminals.

For this reason, conventionally, in the case of obtaining the Web content or the content summary corresponding to the above operations of (1), (2) and (3) by using the congestion information obtaining section 2, the load of the network path currently set is checked. In the conventional network system, the operations of (1), (2) and (3) is performed only when the network load is low.

Japanese Patent Application Unexamined Publication No. 11-24981 describes a technique of obtaining a relatively low traffic time zone in the wide-area network by using a wide area network monitoring apparatus, and fetching the content in advance during the obtained time zone.

The conventional techniques shown in FIG. 36 and FIG. 37 have the following disadvantages. Assume the following case. In the network configuration as shown in FIG. 36, the content or the content summary that the cache server C1 on the sub-net N1 is going to obtain for the automatic cache updating operation, the link prefetching operation, and the cache server cooperating operation exist in the Web server S1 on the sub-net N2. The path from the sub-net N1 to the sub-net N2 determined by routing tables (not shown) within the routers R0 to R4 is N1→R0→L0→R1→L1→R2→N2. Among the links L0 to L5, only the load of the link L1 is high.

In this case, as a path from the sub-net N1 to the sub-net N2 having the Web server S1 included therein, there is also another low-load path such as N1→R0→L0→R1→L2→R3→L3→R2→N2, in addition to the above path of N1→R0→L0→R1→L1→R2→N2.

However, according to the conventional cache server, the congestion information obtaining section 2 decides the congestion by flowing a test packet on the path currently set (on the path determined by the contents of the routing table). Therefore, the composition information obtaining section 2 decides that the network is in the high-load status. As a result, the information that the network is under the high load is transmitted to the link prefetching control section 4, the automatic cache updating section 5, and the cache server cooperating section 7. Consequently, there has been a problem that the operations of (1), (2) and (3) are not carried out.

Further, the technique described in Japanese Patent Application Unexamined Publication No. 11-24981 has had the following disadvantage. There is a case where the load of the path used for the prefetching of the content is high even in the time zone in which the wide-area network monitoring apparatus has decided that the wide area network is in relatively low traffic. As a result, the prefetching of the content may further deteriorate the congestion status of the network.

SUMMARY OF THE INVENTION

It is, therefore, an object of the present invention to provide techniques for increasing the efficiency of a cache server by performing a link prefetching operation, an automatic cache updating operation, and a cache server cooperating operation in higher probabilities than those of the prior art, without deteriorating a congestion status of the network.

The object of the present invention can be achieved by making the cache server know the network topology of routers and links within a network and the load status of each link and thereby to take a path by bypassing high-load links, lowering the traffic priority of the high load link, of relaying data using low-load links.

According to one aspect of the present invention, there is provided a network system including a cache server in which a path calculating section obtains a path suitable for carrying out an automatic cache updating operation, a link prefetching operation, and a cache server cooperating operation, based on QoS path information that includes network path information and path load information obtained by a QoS path information obtaining section. An automatic cache updating section, a link prefetching control section, and a cache server cooperating section carry out respective ones of the automatic cache updating operation, the link prefetching operation, and the cache server cooperating operation, by utilizing the path.

The path calculating section obtains a maximum remaining band path, for example, at the above path. In order to carry out communication using the above path, a path determination method such as a source route option or a path-settable router can be used. Whether the automatic cache updating operation, the link prefetching operation, and the cache server cooperating operation should be carried out may be controlled based on the value of a minimum remaining bandwhich (a minimum one among remaining bandwidths of links that constitute a path) in the path obtained by the path calculating section.

Based on provision of the above structure, it becomes possible to make a cache server perform the link prefetching operation, the automatic cache updating operation, and/or the cache server cooperating operation in higher probabilities than those of the prior art. This causes the efficiency of the cache server to be increased without deteriorating a congestion status of the network.

Further, in order to achieve the above object, according to another aspect of the present invention, there is provided a network system including a cache server in which a relay control section selects a relay server that is necessary for setting a path suitable for carrying out an automatic cache updating operation, a link prefetching operation, and a cache server cooperating operation, based on QoS path information that includes network path information and path load information obtained by a QoS path information obtaining section. The relay control section instructs the selected relay server about data to be relayed. The relay control section selects a relay server that is necessary for setting a relay path that does not include a congestion portion. According to this structure, it is possible to obtain the above-described advantages. Further, when a relay path including no congestion portion is not found, only a relay server that locates upstream from (preferably nearest to) the congestion portion is notified of data to be relayed, and the data is stored in that location of the relay path until the congestion status has disappeared. When the congestion status has disappeared, the relay control section issues a relay instruction to relay servers downstream from the location where the congestion had occurred. With this arrangement, it becomes possible to shorten the time taken for obtaining the data as compared with the case of obtaining the data from the original Web server after the congestion status has been released.

In addition to the above arrangement, a path setting section may be provided in the cache server, and a path settable router may be used that can set a path according to an instruction of the path setting section, as a router. With this arrangement, it becomes possible to make a cache server carry out the link prefetching operation, the automatic cache updating operation, and the cache server cooperating operation in higher probabilities without deteriorating a congestion status of the network.

Further, in order to achieve the above object, according to still another aspect of the present invention, there is provided a network system that includes a priority controllable router for controlling the priority of sending a packet to a link based on priority information given to the packet, and a cache server for carrying out at least one of the automatic cache updating operation, the link prefetching operation, and the cache server cooperating operation, and for giving priority information to a packet to be used for communications generated by the above three operations. According to this arrangement, it becomes possible to lower the priority of communications for the automatic cache updating operation, the link prefetching operation, and the cache server cooperating operation. Therefore, it becomes possible to execute the link prefetching operation, the automatic cache updating operation, and the cache server cooperating operation in higher probabilities, with out deteriorating a congestion status of the network.

Further, in order to achieve the above object, according to still further aspect of the present invention, there is provided a network system that includes a priority controllable router designed to give priority information to a packet relating to a specific communication flow by discriminating this communication flow, and to control the priority of transmitting a packet to a link based on the priority information given to the packet. The network system further includes a cache server for obtaining priority, that can be changed for each link of the network, suitable for executing the automatic cache updating operation, the link prefetching operation, and the cache server cooperating operation, based on QoS path information. The cache server further requests the priority controllable router to set and cancel the priority to a specific communication flow. According to this arrangement, it becomes possible to lower the priority of communications for the automatic cache updating operation, the link prefetching operation, and the cache server cooperating operation. Therefore, it becomes possible to execute the link prefetching operation, the automatic cache updating operation, and the cache server cooperating operation in higher probabilities, without deteriorating a congestion status of the network.

BRIEF DESCRIPTION OF THE DRAWINGS

FIG. 4 is a diagram showing one example of QoS path information.

DETAILED DESCRIPTION OF THE PREFERRED EMBODIMENTS

Embodiments of the present invention will be described in detail with reference to the drawings.

First Embodiment

Figure 1:
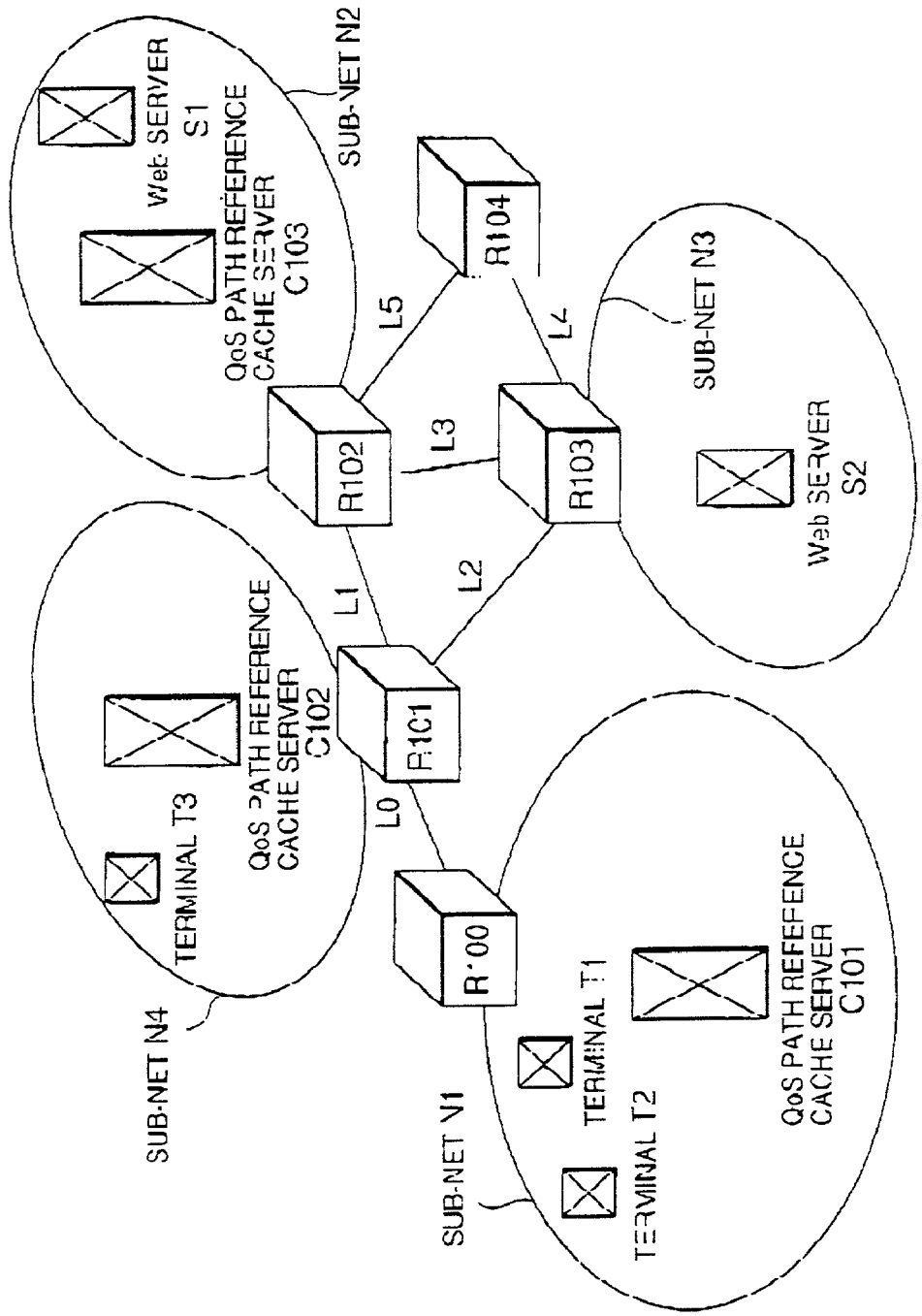
FIG. 1 is a block diagram showing an example of a structure according to a first embodiment of the present invention.

FIG. 1 shows the configuration of a network system according to a first embodiment of the present invention. Web servers S1 and S2 exist within sub-nets N2 and N3 respectively, and hold various Web content information. Terminals T1, T2 and T3 for accessing the Web servers S1 and S2 exist within sub nets N1 and N4. QoS (Quality of Service) path reference cache servers C101 to C103 are also disposed on the network. The QoS path reference cache server C101 to C103 hold copies of various content on the Web servers S1 and S2 that have been accessed from the terminals T1 to T3 and other cache servers (QoS path cache servers of conventional cache servers are not shown). In addition, the QoS path reference cache servers C101 to C103 are designed to obtain QoS path information that includes pairs of names of links and routers that are connected with each other, bandwidth of each link, and remaining bandwidth of each link.

The QoS path information may be obtained by communicating with each route operating a process of collecting information such as the predetermined bandwidth and currently available bandwidth of each line on routers R100 to R104. Alternatively, the QoS path information may be collected from the network by operating a path control protocol such as OSSPF for exchanging QoS path information on each of the routers R100 to R104, and the cache servers may obtain the QoS path information from an adjacent router. The routers R100 to R104 constitute a network for connecting the sub-nets N1, N2, N3 and N4 using links L0 to L5. Each of the routers R100 to R104 performs routing based on its own routing table.

When a terminal (assumed as T1 in this case) obtains the content within the Web server (assumed as S1 in this case), a certain QoS path reference cache server (assumed as C101 in this case) intermediate this operation. This operation is similar to that of the conventional cache server. When there has occurred a request for making access to the content information of the Web server S1, first, the QoS path reference cache server C101 checks whether the QoS path reference cache server C101 itself is holding the content information of the Web server 31.

When the QoS path reference cache server C101 is not holding the content, the QoS path reference cache server C101 inquires other QoS path reference cache server (here, the QoS path reference cache servers C102 and the C103) about whether these QoS path reference cache servers hold the content. The QoS path reference cache server C101 obtains the content from the QoS path reference cache server that holds the content, or obtains the content information from the original Web server that has originally held the content. Then, the QoS path reference cache server C101 passes the content information to the terminal T1. In this case, the same content may also be held in a storage with the cache server C101 at the same time.

When the QoS path reference server C101 holds the content, the content is passed to the terminal T1. When the QoS path reference cache server C101 passes the content to the terminal T1, the QoS path reference cache server C101 may inquire the original Web server S1 about last update date and time of the content. When the content held in the QoS path reference cache server C101 is older than that of the original Web servers S1, the QoS path reference cache server C101 may obtain the content from the original Web server S1 again, which is an update checking operation.

The QoS path reference cache servers (C101, C102 and C103) are also inquired from other QoS path reference cache servers, not only from the terminals T1 to T3, about whether the target content information is held. The operation in this case is also similar to that of the conventional cache server. In other words, when there has occurred a request for making access to the content information of the Web server, this QoS path reference cache server checks whether the own QoS path reference cache server is holding the content information of the Web server. When the QoS path reference cache server is not holding the content, this QoS path reference cache server inquires other QoS path reference cache servers about whether these QoS path reference cache servers hold the content. The QoS path reference cache server obtains the content from the QoS path reference cache server that holds the content, or obtains the content information from the original Web server that has originally held the content. Then, the QoS path reference cache server passes the content information to the QoS path reference cache server that made the original inquiry. In this case, the same content may also be held in a storage at the same time.

When the QoS path reference cache server holds the content, the content is passed to the QoS path reference cache server of the original inquiry. In this case, the update checking operation may be carried out. Further, in order to increase the effectiveness of the cache server, the cache server carries out (1) the automatic cache updating operation, (2) the link prefetching operation, and (3) the cache server cooperating operation, in a similar manner to that of the conventional cache server.

However, regarding the communication necessary for carrying out these operations, a decision has been conventionally made about whether these operations should be carried out, based on a congestion status of the network on the path set at this point of time with the other communication party.

On the other hand, according to the present embodiment, a path bypassing operation is carried out by utilizing QoS path information.

Figure 2:
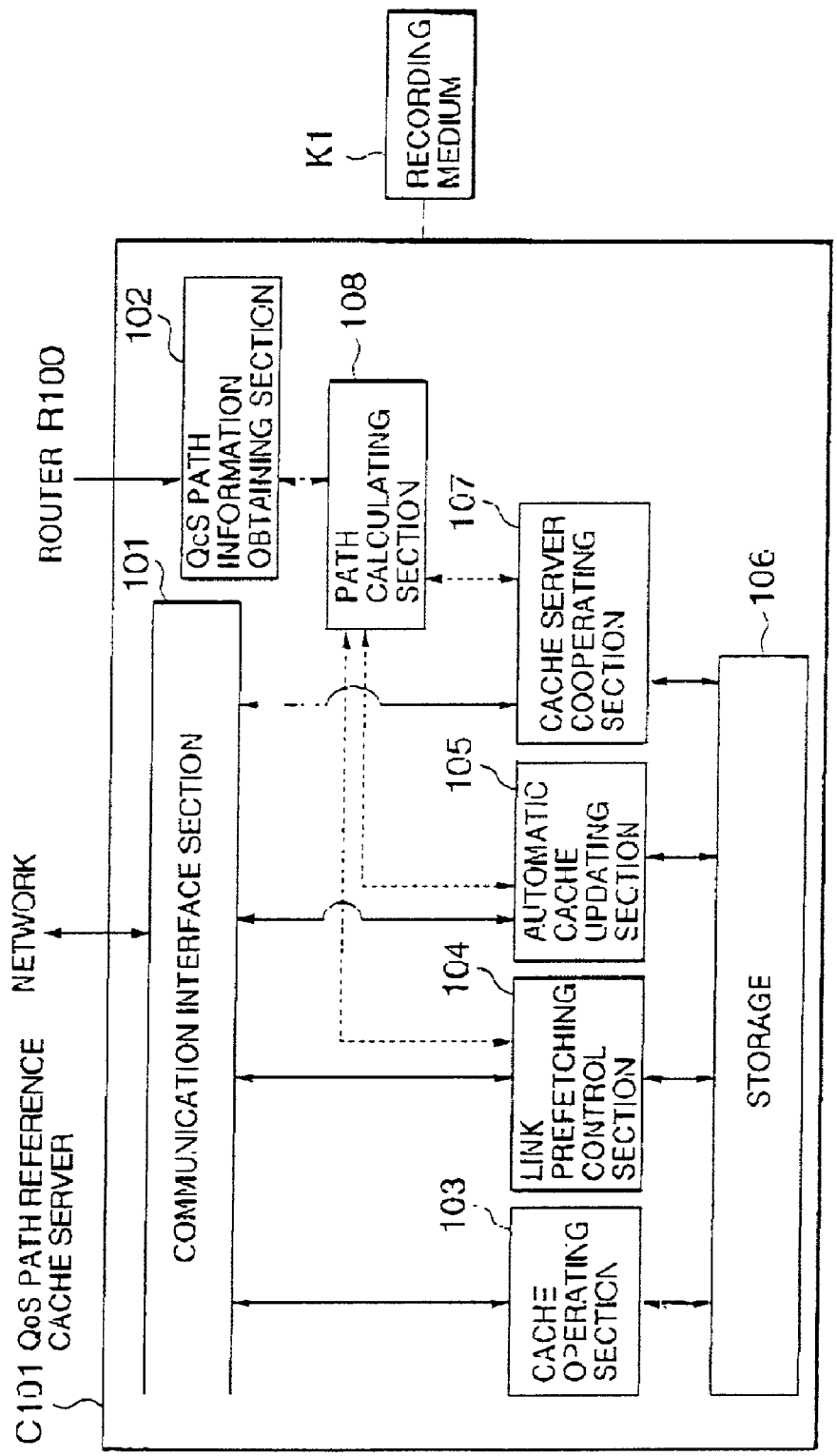
FIG. 2 is a block diagram showing an a example of a structure of a QoS path reference cache server C101.

FIG. 2 is a block diagram showing an example of an internal structure of the QoS path reference cache server C101 as shown in FIG. 1. Each element will be described hereafter. Other QoS path reference cache servers also have a similar structure.

A communication interface section 101 provides a transmission/reception interface between a network and each of a cache operating section 103, a link prefetching control section 104, an automatic cache updating section 105, and a cache server cooperating section 107.

A QoS path information obtaining section 102 obtains QoS path information.

The cache operating section 103 receives a request for making access to a Web content from a terminal via the communication interface section 101, and searches a storage 106 for the desired content. When the desired content is not found in the storage 106, the cache operating section 103 makes access to the corresponding Web server or other cache servers to obtain the desired content and stores the obtained content in the storage 106, and at the same time, transmits the content to the request-originating terminal. When the content is found in the storage 106, the cache operating section 103 transmits the content to the terminal.

In the case of carrying out the update checking operation when the content exist, the cache operating section 103 checks whether the last update date and time of the stored content is older than the last update date and time of the content held by the Web server. When the last update date and time of the stored content is older, the cache operating section 103 obtains the content from the Web server, stores the obtained content in the storage 106, and at the same time, passes the obtained content to the terminal.

The link prefetching control section 104 extracts links to content information which are now not stored in the storage 106 but have a possibility of making access thereto from now on, from the links to relevant information described in the Web content stored in the storage 106. Thereafter, the link prefetching control section 104 notifies a path calculating section 108 of the location information of the Web servers holding the contents indicated by the extracted links to obtain information of a maximum remaining bandwidth path and a minimum remaining bandwidth of the maximum remaining bandwidth path. The maximum remaining bandwidth path is defined as a path having a maximum remaining bandwidth. The minimum remaining bandwidth is defined as a minimum one among remaining bandwidths of respective ones of the links included in the maximum remaining bandwidth path. Then, the link prefetching control section 104 decides whether the contents indicated by the links are obtained, based on the obtained information. For example, when the minimum remaining bandwidth is equal to or greater than a predetermined value, a decision is made that the contents are obtainable. Alternatively, when the minimum remaining bandwidth is equal to or greater than the predetermined value, and also when the number of hops in the maximum remaining bandwidth path is equal to or smaller than a predetermined value, a decision is made that the contents are obtainable. When it has been decided that the contents are obtainable, the link prefetching control section 104 makes access to the corresponding Web service, using a path designating method such as a source route option for including the path information into the packet. When the contents are obtained, the obtained contents are stored in the storage 106.

The automatic cache updating section 105 investigates the intervals of updating of the content on the Web server originally holding the content, for the Web content held within the storage 106. Then, the automatic cache updating section 105 determines the date and time of updating the cache content. On the determined date and time, the automatic cache updating section 105 passes the location information (network address) of the Web server holding the content to the path calculating section 108. The automatic cache updating section 105 obtains information on the maximum remaining bandwidth path and information on the minimum remaining bandwidth from the path calculating section 108. Then, the automatic cache updating section 105 decides whether the content is obtainable. For example, when the minimum remaining bandwidth is equal to or greater than the predetermined value, a decision is made that the content is obtained. Alternatively, when the minimum remaining bandwidth is equal to or greater than the predetermined value, and also when the number of hops in the maximum remaining bandwidth path is equal to or smaller than a predetermined value, a decision is made that the content is obtained. When it has been decided that the content is obtained, the automatic cache updating section 105 makes access to the corresponding Web server, using a path designating method such as a source route operation, and obtains the content. The obtained content is stored in the storage 106.

The storage 106 stores various Web contents and content summaries.

The cache server cooperating section 107 exchanges with each other lists of contents held by the respective cache servers and information (content summary) showing the validity of the cache of content held by cache server, for carrying out redistribution, sharing and comparison of freshness among the cache servers. Based on such information, the cache server cooperating section 107 performs content exchanging as necessary. When exchanging contents and content summaries, the cache server cooperating section 107 passes the network address of the cache server of the other party to the path calculating section 108. The cache server cooperating section 107 obtains information on the maximum remaining bandwidth path and information on the minimum remaining bandwidth from the path calculating section 108. Then, the cache server cooperating section 107 decides whether the content or content summary is obtained or not. When it has been decided that the content or content summary is obtained, the cache server cooperating section 107 obtains the content or content summary, using a path designating method like a source route option. The obtained content or content summary is stored in the storage 106.

The path calculating section 108 obtains from the QoS path information obtaining section 102 information on the link connected to each router, and the name of the router connected to the link, and available bandwidth information of each link (QoS path information). The path calculating section 108 calculates the maximum remaining bandwidth path to the Web server and the minimum remaining bandwidth to the Web server, which are designated by the link prefetching control service 104, the automatic cache updating section 105, or the cache server cooperating section 107. An algorithm of Dijkstra is used for this path calculation. As a result of the calculation, the path information to the Web server and the minimum remaining bandwidth information are returned to the link prefetching control section 104, the automatic cache updating section 105, or the cache server cooperating section 107 that made the request.

The QoS path reference cache server C101 is implemented by a computer. A recording modium K1 such a disk or a semiconductor memory stores a program for making the computer function as the QoS path reference cache server. This program runs on the computer and thereby the operation of the computer is controlled to realize the communication interface section 101, the QoS path information obtaining section 102, the cache operating section 103, the link prefetching control section 104, the automatic cache updating section 105, the cache server cooperating section 107, and the path calculating section 108.

Figure 3:
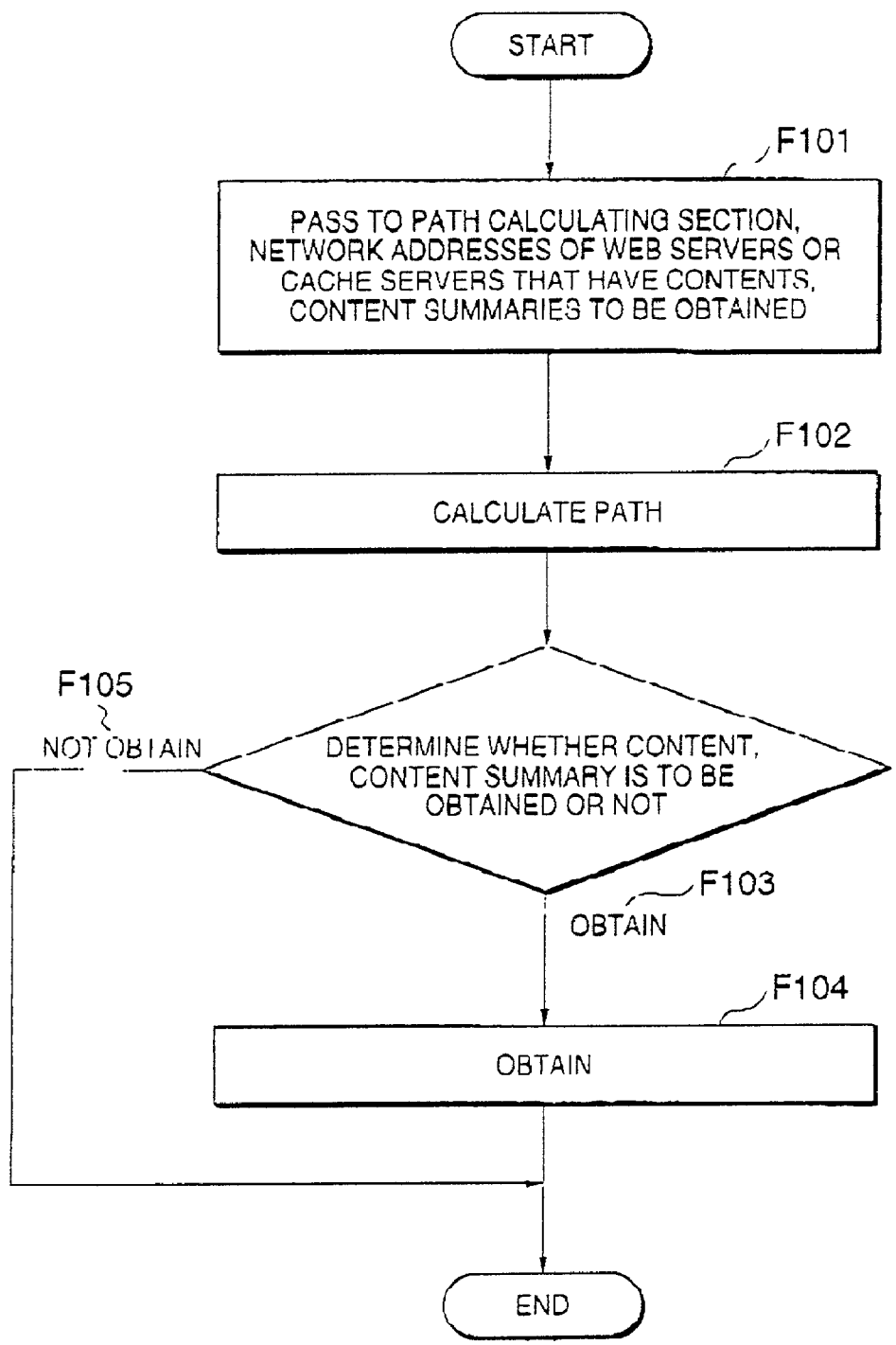
FIG. 3 is a flowchart showing an example of the operation according to the first embodiment of the present invention.

FIG. 3 is a flowchart showing the automatic cache updating operation, the link prefetching operation, and the cache server cooperating operation according to the first embodiment of the present invention.

The operation of determining the content to be automatically updated in the automatic cache updating section 105, the operation of determining the content for link prefetching in the link prefetching control section 104, and the operation of determining the necessary content or the content summary in the cache server cooperating section 107, are the same as those of the conventional cache server. Therefore, these operations will not be explained here. The operation after the necessary content or content summary has been decided will be described below.

The automatic cache updating section 105, the link prefetching control section 104, and the cache server cooperating section 107 pass to the path calculating section 108 the network addresses of the Web servers or the QoS path reference cache servers to which they want to make connection to obtain the content or the content summary in order to carry out the automatic cache updating operation, the link prefetching operation, and the cache server cooperation operation. Thus, these sections request the path calculating section 108 to carry out the path calculation (F101). When the cache update and time determined as a result of the content updating interval investigation has come, the automatic cache updating section 105 passes the network address used for obtaining the content to the path calculating section 108.

When the link prefetching control section 104 has found links to content information which are now not stored in the storage 106 but have a possibility of making access thereto from now on, from the links to relevant information described in the Web content stored in the storage 106, the link prefetching control section 104 passes the network addresses of the Web servers that hold the contents indicated by the found links, to the path calculating section 108. The cache server cooperating section 107 passes the addresses of the Web servers that hold the contents to be obtained, to the path calculating section 108 at intervals of a predetermined time period.

The path calculating section 108 obtains the maximum remaining bandwidth path to the network of a received network address and the minimum remaining bandwidth on the maximum remaining bandwidth path, based on the QoS path information obtained from QoS path information obtaining section 102 that includes pairs of names of links and routers that are connected with each other, the preset bandwidth and the currently available bandwidth of each link. Then, the path calculating section 108 passes the obtained information to the source of request (the automatic cache updating section 105, the link prefetching control section 104, or the cache server cooperating section 107) (F102).

Figure 5:
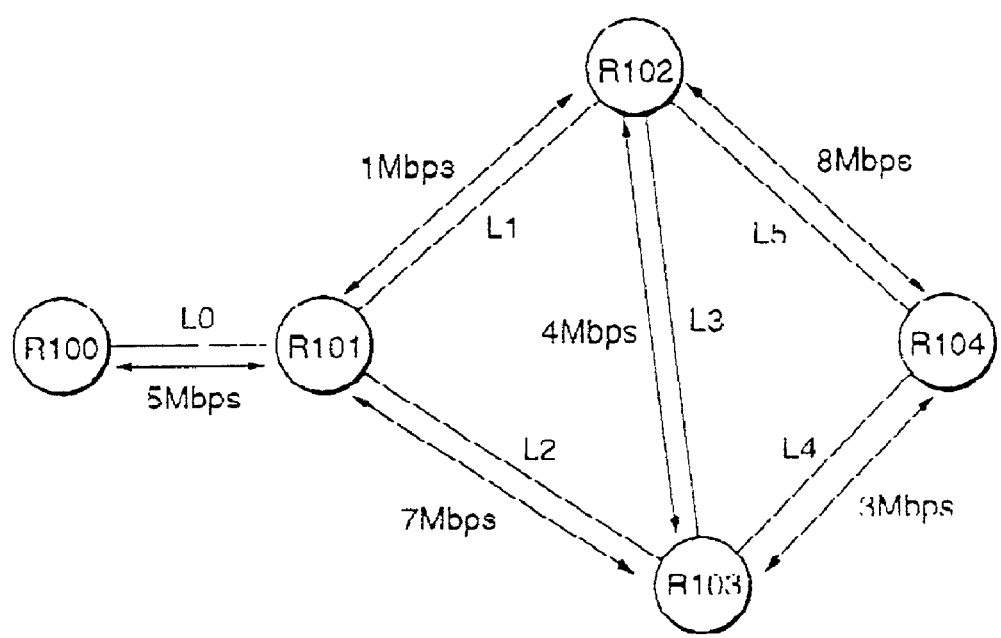
FIG. 5 is a diagram showing a graph of the QoS path information shown in FIG. 4.

For instance, in the case where the path calculating section 108 has obtained the QoS path information as shown in FIG. 4 from the QoS path information obtaining section 102, and also has received the network address of the Web server S1 from a request originator, the QoS path information shown in FIG. 4 can be expressed in a graph as shown in FIG. 5. If the SPF (Shortest Path First) algorithm of Dijkstra is used, it can be understood that the path capable of obtaining the maximum remaining bandwidth is R100→L0→R101→L2→R103→L3→R102. As a result, the minimum remaining bandwidth becomes 4 Mbps which is determined depending on the minimum remaining bandwidth among the links on the path.

An item "router address" in the path information shown in FIG. 4 shows network addresses of routers. An item "link" shows links to next hop routers. An item "next hop router address" shows network addresses of next, hop routers. An item "connection sub-net address" shows network addresses of devices such as terminals, Web servers, and QoS path reference cache servers that exist within sub-nets connected to the routers. When the QoS path information obtaining section 102 is notified of added routers and links by the path control protocol that operates on the nearest router R100 or of changed links in remaining bandwidths or remaining bandwidths of links after the changes, the QoS path information obtaining section 102 updates the held QoS path information depending on the content of information received from the path control protocol.

The source of request (the automatic cache updating section 105, the link prefetching control section 104, or the cache server cooperation section 107) that has obtained the maximum remaining bandwidth path and the minimum remaining bandwidth on this path determines whether the content should be obtained or not, based on the maximum remaining bandwidth path and the maximum remaining bandwidth (F103). For example, when the minimum remaining bandwidth is equal to or greater than a predetermined value, it is determined that the content should be obtained. When it is determined that the content should be obtained, the content is obtained based on an access method that designated the path, such as the source route option, depending on the path information obtained from the path calculating section 108 (F104). When it is determined that the content is not obtained (F105), the processing is terminated immediately when the content have not been obtained, the old content remains in the storage 106. However, when a terminal has made a request for making access to the content, the old content is replaced with the latest one depending on the update checking operation of the cache operating section 103.

The above operations cause unused bandwidths on the network to be effectively utilized. Therefore, according to the network system of the present invention, there increases the possibility of achieving the automatic cache updating operation, the link prefetching operation, and the cache server cooperating operation, even in the situation where the conventional cache server has not been able to achieve these operations.

Second Embodiment

Figure 6:
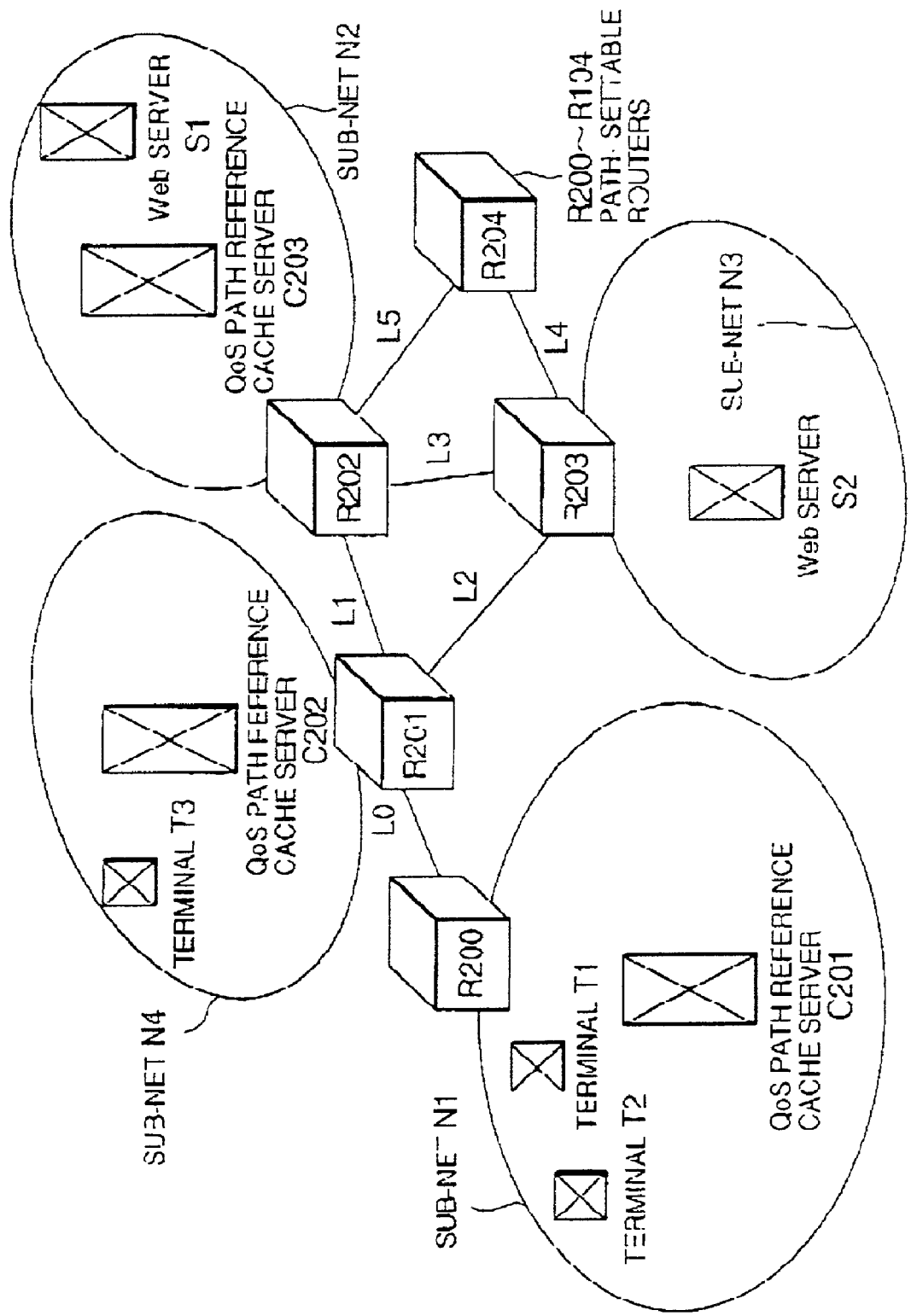
FIG. 6 is a block diagram showing an example of a structure according to a second embodiment of the present invention.

FIG. 6 is a block diagram showing an example of a network system according to a second embodiment of the present invention. The second embodiment shown in FIG. 6 is different from the first embodiment shown in FIG. 1 in that the routers R100 to R104 are replaced with path settable routers R200 to R204, and that the QoS path reference cache servers C101 to C103 are replaced with QoS path reference cache servers C201 to C203.

The path-settable routers R200 to R204 have functions that are achieved by operating an MPLS protocol in addition to the functions of the routers R100 to R104. The path-settable routers R200 to R204 have functions for setting a path specified by the path information on the network, according to the path information received from the QoS path reference cache servers C201 to C203. The path information is composed of network addresses of two servers that communicate with each other, identifies (port numbers and the like in a TCP/IP network) for identifying communications, and a string of router names of routers that constitute a cache path. The QoS path reference cache servers C201 to C203 have a path-setting cancellation function in addition to the functions of the QoS path reference cache servers C101 to C103. Other structures are similar to those of the first embodiment. Therefore, the difference from the first embodiment will be mainly described hereinafter.

Figure 7:
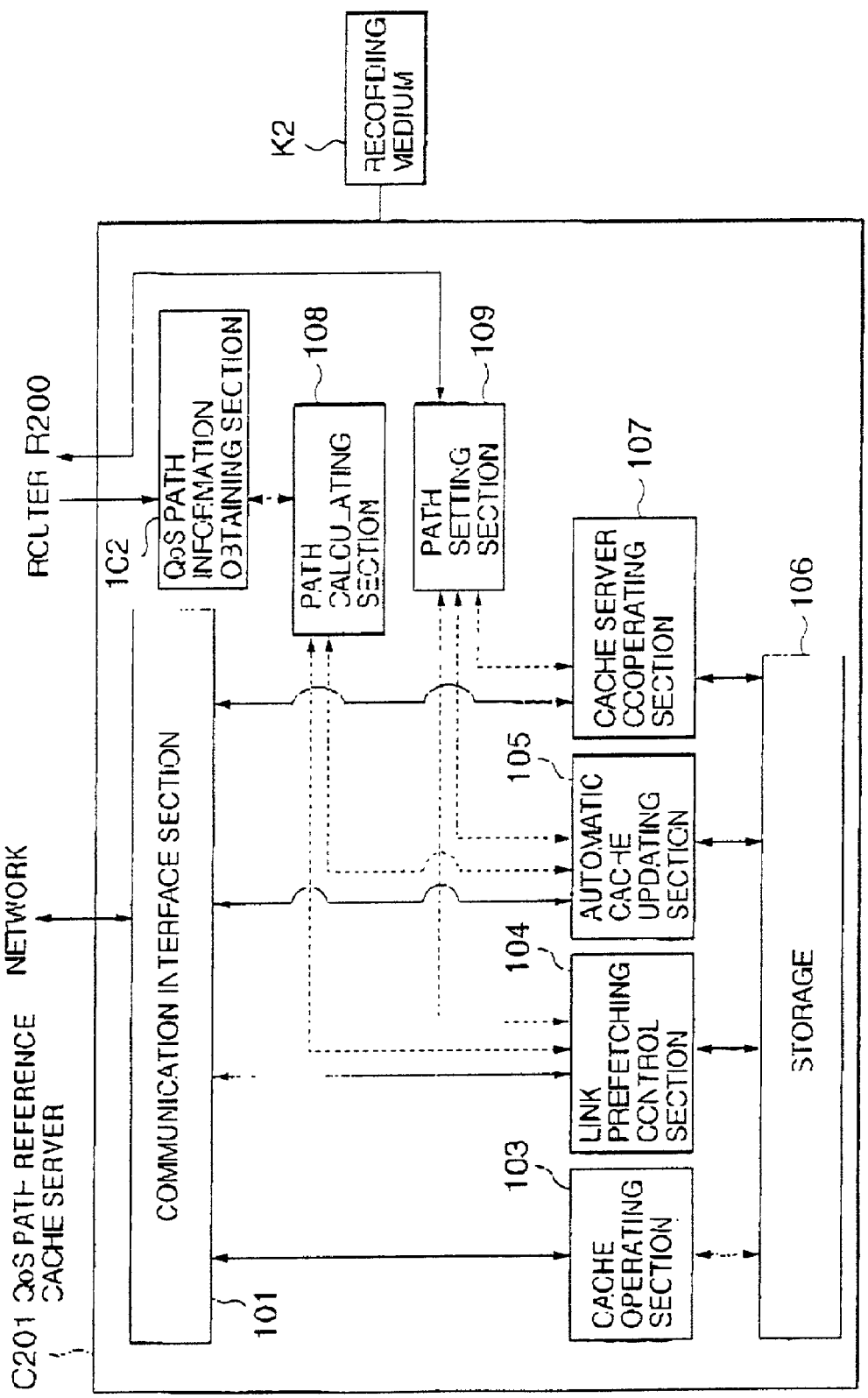
FIG. 7 is a block diagram showing an example of a structure of a QoS path reference cache server C201.

FIG. 7 is a block diagram showing an internal structure of the QoS path reference cache server C201. A path setting section 109 is added to the structure of the first embodiment.

A link prefetching control section 104, an automatic cache updating section 105, or a cache server cooperating section 107 determines whether the content or content summary is obtained by using a path obtained by a path calculating section 108. The link prefetching control section 104, the automatic cache updating section 105, and the cache server cooperating section 107 have a function of instructing the path setting section 109 to set up the path. When it is determined that the content or content summary is obtained, the setting section 109 is instructed to set up the path. After the path-settable router has set a path, the link prefetching control section 104, the automatic cache updating section 105, or the cache server cooperating section 107 obtains the content or the content summary, and instructs the path setting section 109 to cancel the path.

When receiving a path instruction from the link prefetching control section 104, the automatic cache updating section 105, or the cache server cooperating section 107, the path setting section 109 transmits path information showing this instructed path to the protocol such as MPLS (MuliProtocol Label Switching) in the nearest path-settable router R200, and requests the protocol to set up the path. Further, the path setting section 109 requests the near path-settable router R200 to cancel the path according to a path cancellation instruction from the link prefetching control section 104, the automatic cache updating section 105, or the cache server cooperating section 107.

The QoS path reference cache server C201 is realized by a computer. A recording medium K2 such as a disk or a semiconductor memory stores a program for making the computer function as the QoS path reference cache server. This program runs on the computer to control the operation of the computer, and thereby the communication interface section 101, the QoS path information obtaining section 102, the cache operating section 103, the link prefetching control section 104, the automatic cache updating section 105, the cache server cooperating section 107, the path calculating section 108, and the path setting section 109 are realized on the computer.

Figure 8:
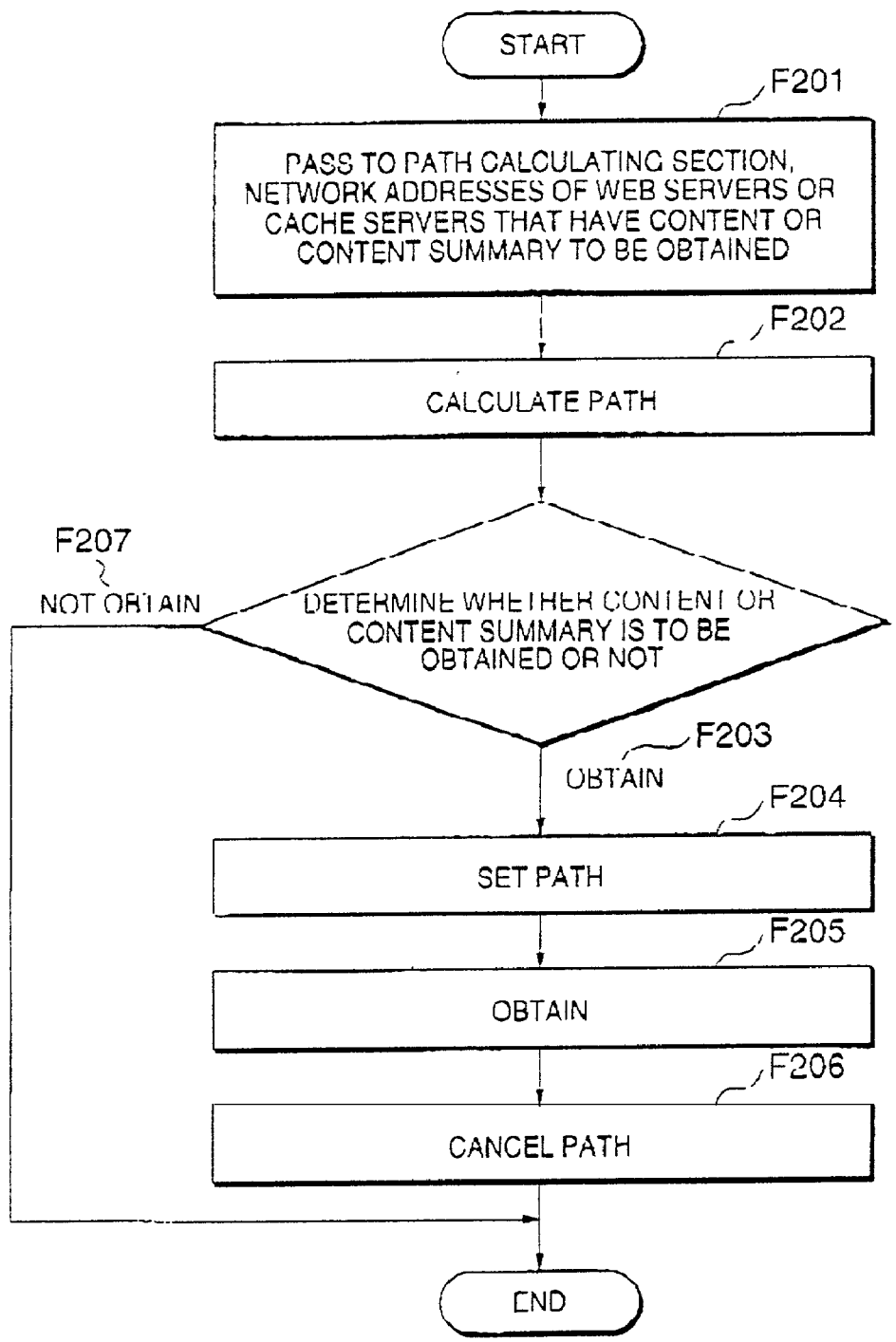
FIG. 8 is a flowchart showing a example of the operation according to the second embodiment of the present invention.

FIG. 8 is a flowchart showing the automatic cache updating operation, the link prefetching operation, and the cache server cooperating operation according to the second embodiment of the present invention.

The operations that the automatic cache updating section 105 carries out for determining the content to be automatically updated, the operations that the prefetching control section 104 carries out for determining the content for link prefetching, and the operation that the cache server cooperating section 107 carries out for determining the necessary content or the content summary, are the same as those of the conventional cache server. Therefore, these operations will not be explained here. The operation after the necessary content or content summary has been decided will be explained below.

The automatic cache updating section 105, the link prefetching control section 104, and the cache server cooperating section 107 pass to the path calculating section 108 the location information (the network addresses) of the cache server to which they want to make connection to obtain the content or the content summary in order to carry out the automatic cache updating operation, the link prefetching operation, and the cache server cooperating operation. Thus, these sections request the path calculating section 108 to carry out the path calculation (F201). The path calculating section 108 obtains the maximum remaining bandwidth path to the received network address, and the minimum remaining bandwidth on the maximum remaining bandwidth path, based on the QoS path information obtained from the QoS path information obtaining section 102. Then, the path calculating section 108 passes the obtained information to the source of request (the automatic cache updating section 105, the link prefetching control section 104, or the cache server cooperating section 107) (F202). The source of request that has obtained the maximum remaining bandwidth path and the minimum remaining bandwidth on this path determines whether the content should be obtained or not based on the maximum remaining bandwidth path and the minimum remaining bandwidth (F203). For example, when the maximum remaining bandwidth is equal to or greater than a predetermined value, it is determined that the content or the content summary should be obtained. Alternatively, when the minimum remaining bandwidth is equal to or greater than the predetermined value, and also when the number of hops of the maximum remaining bandwidth path is equal to or smaller than a predetermined value, it is determined that the content or the content summary should be obtained. For obtaining the content or the content summary, the source of request passes the maximum remaining bandwidth path obtained from the path calculating section 108, to the path setting section 109. The path setting section 109 transmits the path information showing the maximum remaining bandwidth path to the nearest path-settable router R200. Then, path-settable routers on the path including the path-settable router R200 cooperate to set the path on the network (F204). Thereafter, the source of request obtains the content or the content summary by utilizing the set path, and stores the obtained result in the storage 106 (F205). Then, the source of request instructs the path setting 109 to cancel the set path (F206). When the content or content summary are not obtained (F207), the processing finishes immediately.

Based on the above operation, available bandwidths on the network are effectively utilized. Therefore, according to the network system of the present invention, there increases the possibility of achieving the automatic cache updating operation, the link prefetching operation, and the cache server cooperating operation, even in the situation where the conventional cache server has not been able to achieve these operations.

Third Embodiment

Figure 9:
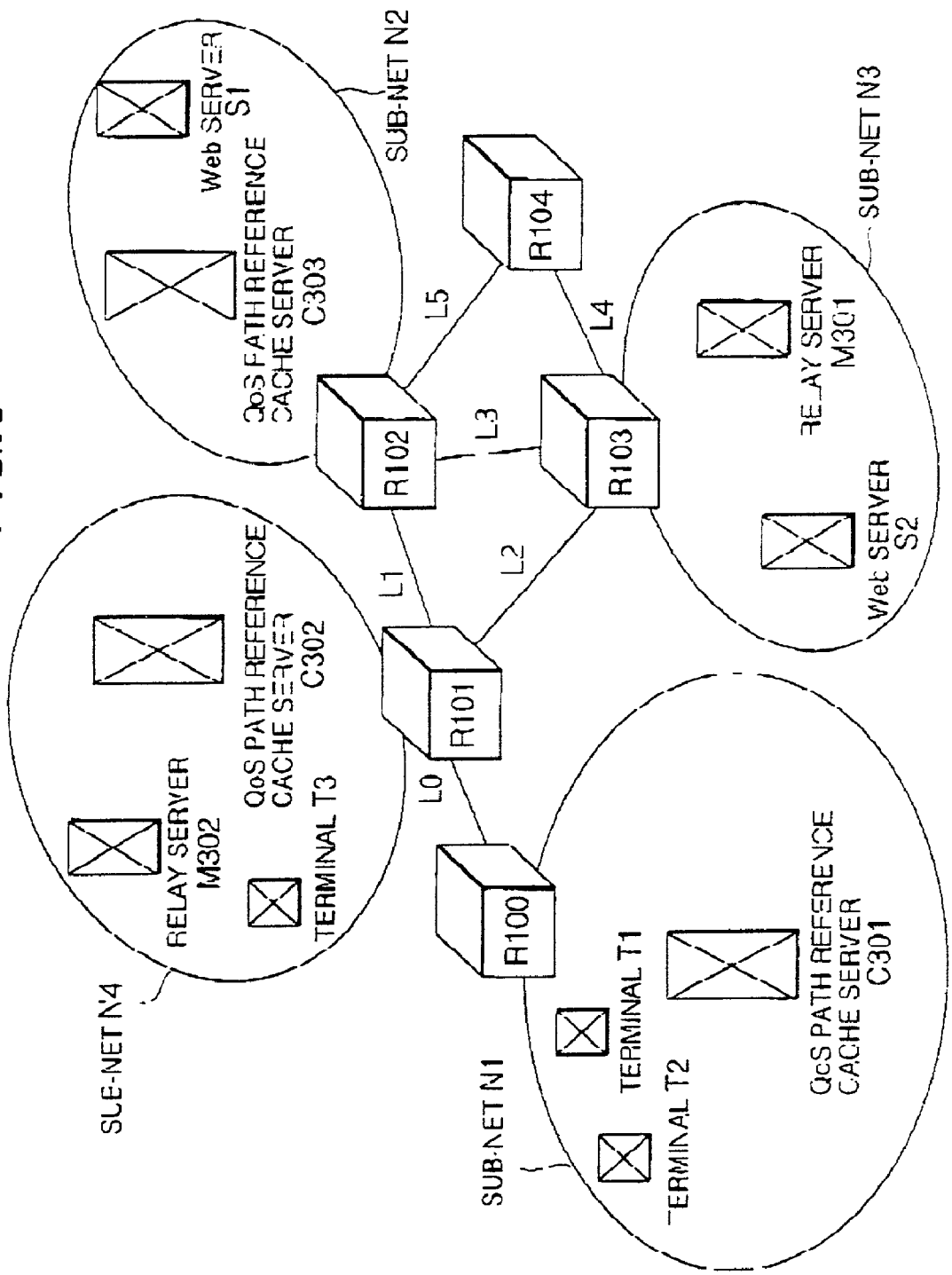
FIG. 9 is a block diagram showing an example of a structure according to a third embodiment of the present invention.
Figure 36:
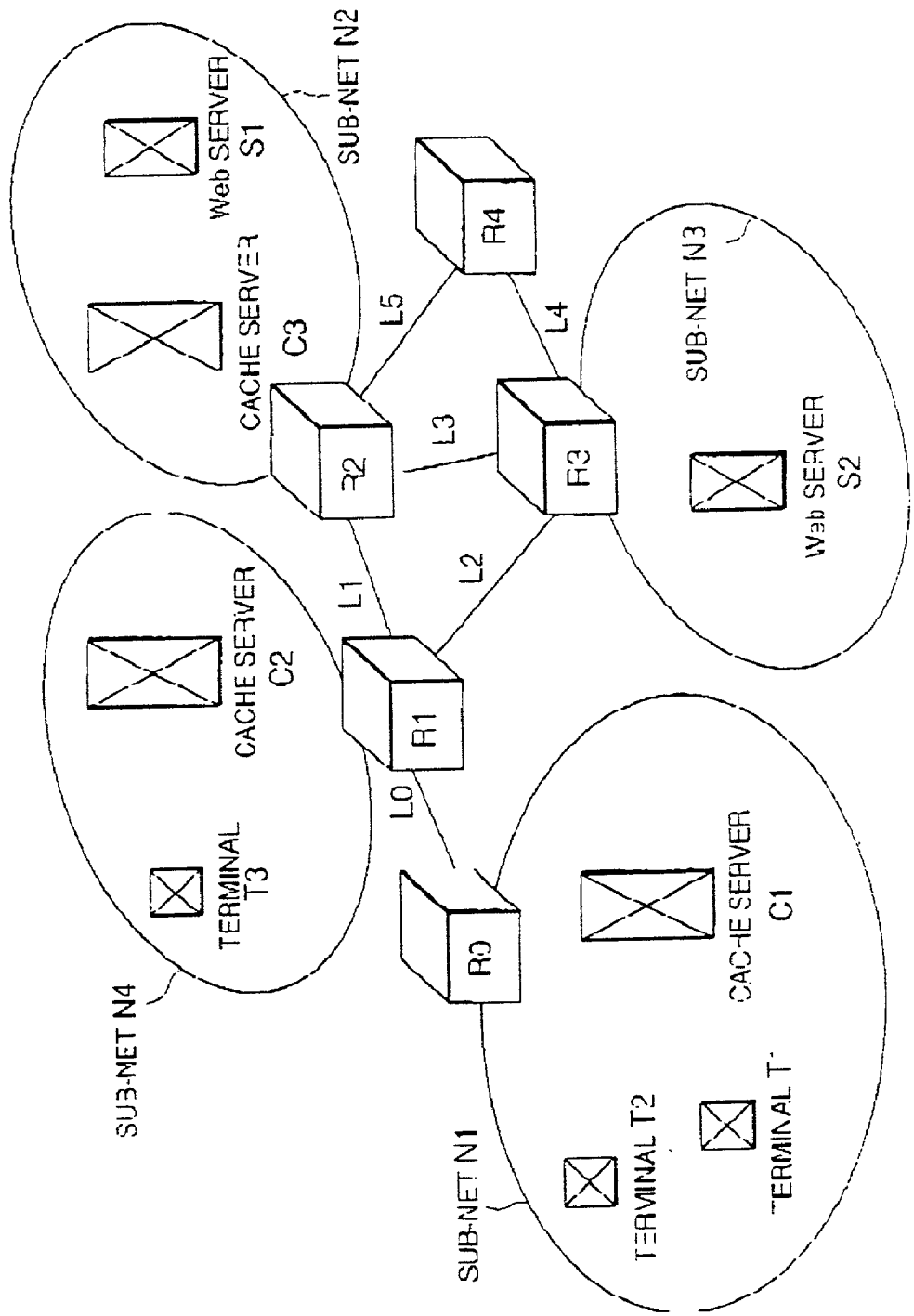
FIG. 36 is a block diagram showing an example of a structure of a conventional network system.

FIG. 9 is a block diagram showing an example of a network system according to a third embodiment of the present invention. The network system of the third embodiment shown in FIG. 9 is the same as the conventional network system (see FIG. 36) except the following. Namely, the cache servers C1 to C3 are replaced with QoS path reference relay control cache server C301 to C303. Relay servers M301 and M302 are provided in the third embodiment. Further, the routers R0 to R4 are replaced with routers R100 to R104, which have the same functions as those of the routers R0 to R4. It may be so structured that the QoS path reference relay control cache servers take the role of the relay servers at the same time. In other words, it may be so designed that the functions of QoS path reference relay control cache server and relay server are built into one casing. Further, it may also be so designed that the functions of router, QoS path reference relay control cache server, and relay server are built into one casing, where a router play the role of the QoS path reference relay control cache server and the relay server at the same time.

The relay servers M301 and M302 have a function of relaying the Web contents or the content summaries, and distributing them to the QoS path reference relay control cache servers C301 to C303, according to instructions of these cache servers C301 to C303. Based on the instructions of the cache servers C301 to C303, the relay servers M301 and M302 obtain the Web contents or the content summaries from the Web servers, the QoS path reference relay control cache servers, or the relay servers, on behalf of the cache servers C301 to C303. The relay servers M301 and M302 store the obtained Web contents or the content summaries until the QoS path reference relay control cache servers C301 to C303 or other relay servers that have issued the instruction retrieve these information. The QoS path reference relay control cache servers C301 to C303 that have issued the instruction designates the relay timing.

Each of the QoS path reference relay control cache servers C301 to C303 is a cache server that receives the QoS path information, and obtains data (Web content and the content summary) for carrying out an automatic cache updating operation, a link prefetching operation, and a cache server cooperating operation, based on the obtained QoS path information, by utilizing the relay servers.

Figure 10:
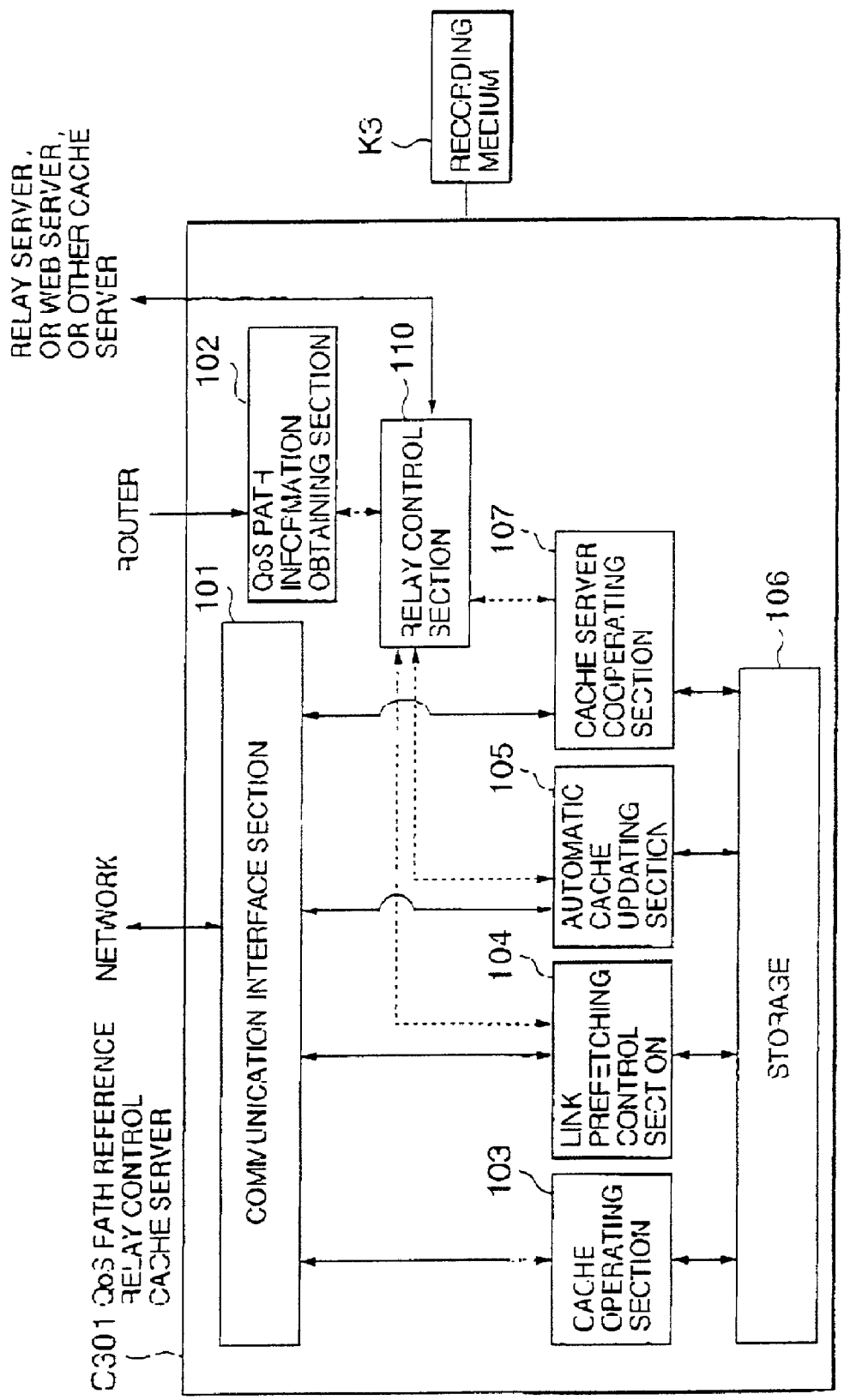
FIG. 10 is a block diagram showing an example of a structure of a QoS path reference relay control cache server C301.
Figure 37:
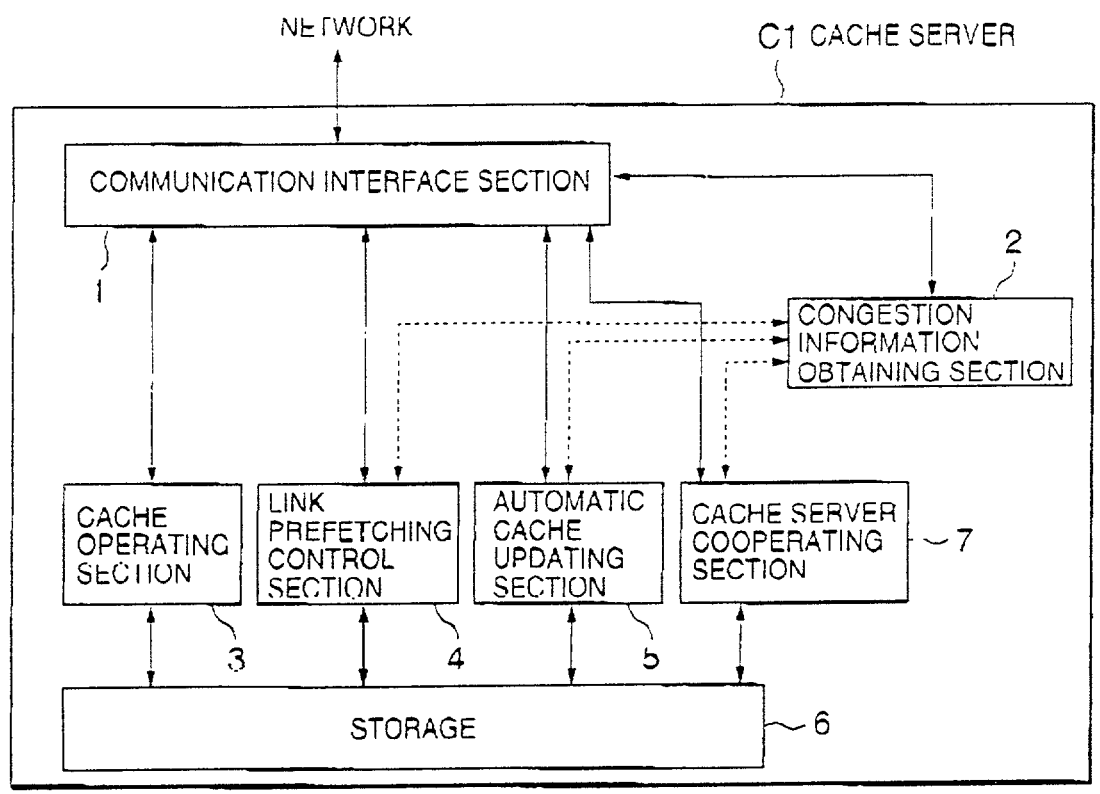
FIG. 37 is a block diagram showing an example of a structure of a conventional cache server C1.

FIG. 10. is a block diagram showing an example of a structure of a QoS path reference relay control cache server C301. A QoS path information obtaining section 102, a link prefetching control section 104, an automatic cache updating section 105, a cache server cooperating section 107, and a relay control section 110 that are different from the internal structure of the conventional cache server (see FIG. 37) will be described.

The QoS path information obtaining section 102 has similar functions to those of the QoS path information obtaining section of the first embodiment as show in FIG. 2. The QoS path information obtaining section 102 receives QoS path control protocol information.

The relay control section 110 receives information for specifying Web contents and content summaries to be obtained, from the link prefetching control section 104, the automatic cache updating section 105, and the cache server cooperating section 107. The relay control section 110 determines whether the Web contents and content summaries should be received or not, and determines which one of relay servers these are obtained through, based on the load status of the network received from the QoS path information obtaining section 102. There is also a case where relay servers are not used at all. When the Web contents and content summaries are to be obtained, the relay control section 110 issues relay instructions to all the relay servers that carry out the relay. Then, the relay control section 110 obtains Web contents and content summaries actually through these relay servers.

The link prefetching control section 104 finds links to content information which are now not stored in the storage 106 but have a possibility of making access thereto from now on, from the links to relevant information described in the Web content stored in the storage 106. The link prefetching control section 104 instructs the relay control section 110 to obtain the content and, when the content has been obtained, the obtained content is stored in the storage 106.

The automatic cache updating section 105 investigates the intervals of updating of the content on the Web server where the content originally exist, for the Web content held within the storage 106. Then, the automatic cache updating section 105 determines the time of updating the cache content. At the determined time instant, the automatic cache updating section 105 instructs the relay control section 110 to send the content thereto and, when the content has been obtained, the obtained content is stored in the storage 106.

The cache server cooperating section 107 exchanges with each other lists of contents held by the respective cache servers and information (content summary) that shows the validity of the cache of the content held by each server, for carrying out redistribution, sharing and comparison of freshness among the cache servers. Based on this information, the cache server cooperating section 107 exchanges contents as necessary. At the time of exchanging contents and content summaries, the cache server cooperating section 107 instructs the relay control section 110 to obtain the contents or the content summaries and, when the content has been obtained, the obtained content is stored in the storage 106.

The QoS path reference relay control cache servers C301 is implemented by a computer. A recording modium K3 like a disk or a semiconductor memory stores a program for making the computer function as the QoS path reference relay control cache server. This program runs on the computer to control the operation of the computer, and thereby the communication interface section 101, the QoS path information obtaining section 102, the cache operating section 103, the link prefetching control section 104, the automatic cache updating section 105, the cache server cooperating section 107, and the relay control section 110 are realized on the computer.

Figure 11:
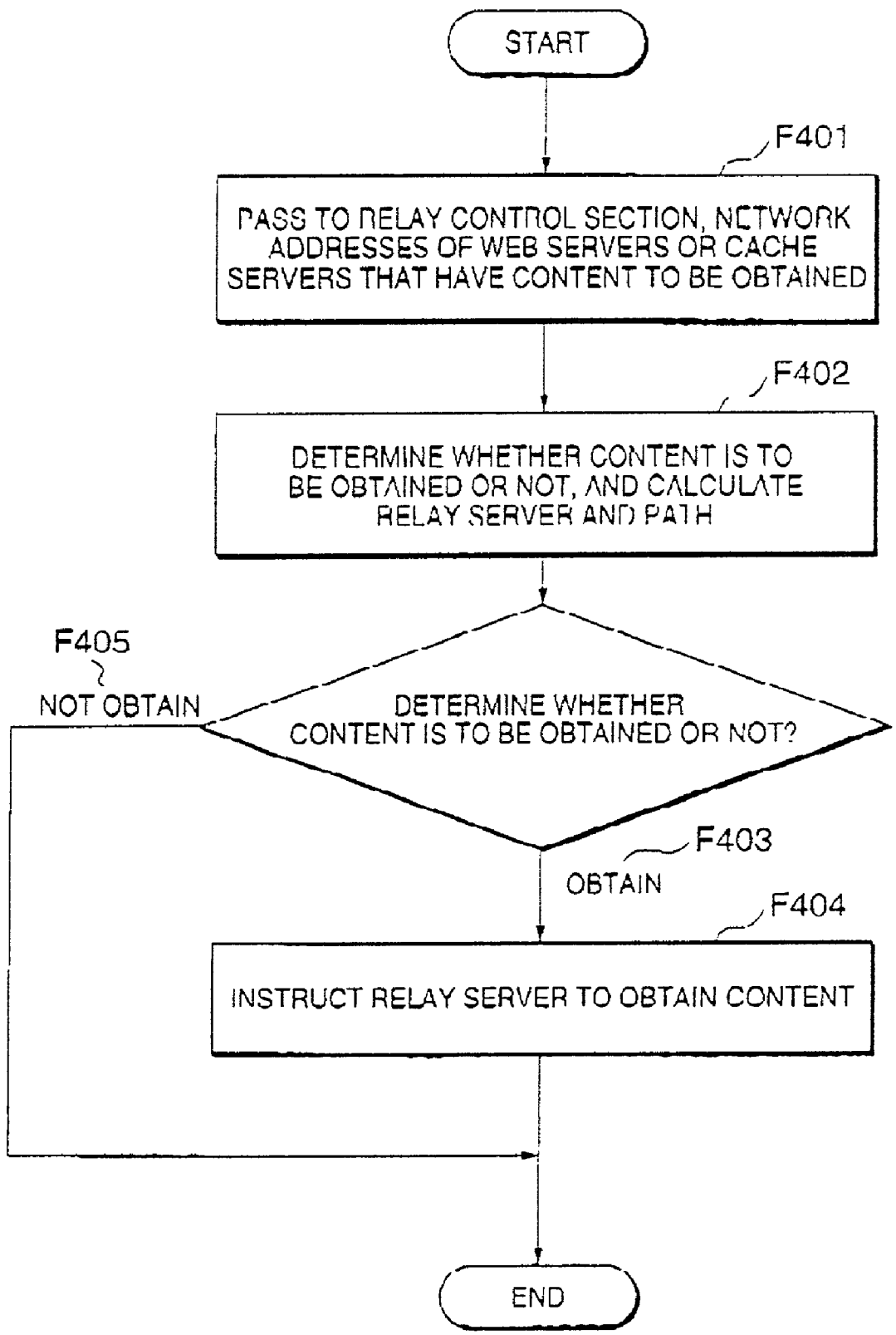
FIG. 11 is a flowchart showing an example of the operation according to the third embodiment of the present invention.

FIG. 11 is a flowchart showing the automatic cache updating operation, the link prefetching operation, and the cache server cooperating operation according to the third embodiment of the present invention. The operation that the automatic cache updating section 105 carries out for determining the content to be automatically updated, the operation that the link prefetching control section 104 carries out for determining the content for linking prefetching, and the operation that the cache server cooperating section 107 carries out for determining the necessary content of the content summary, are the same as those of the conventional cache server. Therefore, these operations will not be explained here. The operation after the necessary content or content summary has been decided will be explained below.

The automatic cache updating section 105, the link prefetching control section 104, and the cache server cooperating section 107 pass to the relay control section 110 network addresses of the cache servers or the Web servers to which they want to make connection to obtain contents or content summaries in order to carry out the automatic cache updating operation, the link prefetching operation, and the cache server cooperating (F401). Then, the relay control section 110 determines whether the contents should be obtained from the received network addresses or not, based on the location information of the relay servers recognized in advance and the QoS path information obtained from the QoS path information obtaining section 102. When it is determined that content is to be obtained, the relay control section 110 determines a path and relay servers to be used (F402). In the case of obtaining the content (F403), the relay control section 110 controls the relay server to obtain the content, and passes the content to the source of request (the automatic cache updating section 105, the link prefetching control section 104, or the cache server cooperating section 107) (F404). When it is determined that the content is not obtained (F405), the processing is terminated.

An operation of the present embodiment will be described in detail, taking as an example the case where the QoS path reference relay control cache server C301 obtains certain content α from the Web server S1 in the network system as shown in FIG. 9.

Figure 12:
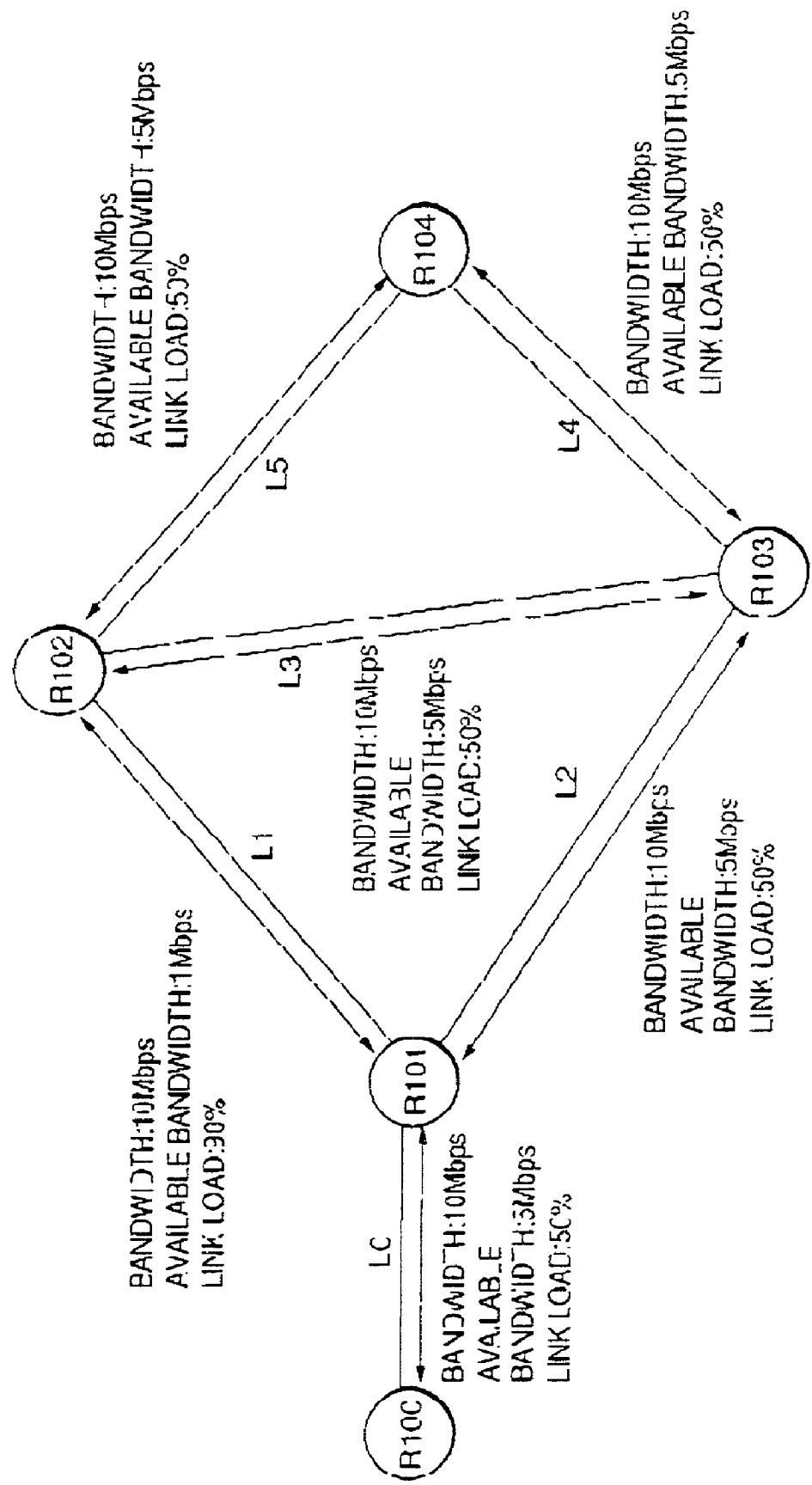
FIG. 12 is a diagram showing one example of QoS path information according to the third embodiment of the present invention.

It is assumed that a path (determined based on the content of a routing table within each router) from the Web server S1 to the QoS path reference relay control cache server C301 is S1→R102→L1→R101→L0→R100→C301, and that the QoS path information obtained from the QoS path information obtaining section is as shown in FIG. 12.

Further, assuming that congestion occurs when 90% or more of the link bandwidth is being used, it is considered that a congestion status exists in the link L1 that is on the path from the Web server S1 to the QoS path reference relay control cache servers C301. When a congestion section (the link L1) exists on the path, the relay control section 110 uses the relay servers M301 and M302 existing on the network, to check whether it is possible or not to set a path from the Web server S1 to the QoS path reference relay control cache server C301 without passing through the congestion section. In the case where a path from the Web server S1 to the relay server M301 determined based on the content of the routing table is S1→R102→L3→R103→M301, and a path from the relay server M301 to the relay server M302 is M301→R103→L2→R101→M101, the relay server M301 and M302 can be used to set a path that does not pass through a congestion section (the link L1) as follows: S1→R102→L3→R103→M301→R103→L2→R101→M302→R101→L0→R100→C301.

Therefore, the relay control section 110 issues the instructions to the relay servers M301 and M302 to relay the content on the path that uses only the links, each of which has a link bandwidth use rate that is lower than 90%, as follows: S1→R102→L3→R103→M301 (relay) M301→R103→L2→R101→M302 (relay) M302→R101→L0→R100→C301. More specifically, the QoS path reference relay control cache server C301 first instructs the relay server M301 to obtain the content α from the Web server S1. Based on this instruction, the relay server M301 obtains the content α from the Web server S1 on the path of S1→R102→L3→R103→M301, and holds the content α. Therefore, the QoS path reference relay control cache server C301 instructs the relay server M302 to obtain the content α from the relay server M301. Based on this instruction, the relay server M302 obtains the content α held by the relay server M301 on the path of M301→R103→L2→R101→M302. Thereafter, the QoS path reference relay control cache server C301 obtains the content α held by the relay server M302 on the path of M302→R101→L0→R100→C301.

If the link load of the link L3 becomes 90% or above among the links as shown in FIG. 12, it is not possible to transfer the content through the path that is determined based on the content of the routing table. In this case, the following processing is carried out, for example. The relay control section 110 obtains a path from the Web server S1 to the QoS path reference relay control cache server C301 that does not pass through the congestion portion, based on the QoS path information. The relay control section 110 obtains this path by disregarding a path determined based on the content of the routing table. In this case, a path of S1→R102→L5→R104→L4→R103→L2→R101→L0→R100→C301 is obtained as the path that does not pass through a congestion portion.

Then, the relay control section 110 selects all or a part of the relay servers existing on the path as the relay servers to be used. When it is assumed that all the relay servers existing on the path are used, for example, the relay control section 110 selects the relay servers M301 and M302. Then, the relay control section 110 instructs the relay server M301 that is located at the most upstream of the path to obtain the content α on the path S1→R102→L5→R104→L4→R103, based on a route specifying method such as the source route option. In response to this instruction, the relay server M301 obtains the content α from the Web server S1 through the path of S1→R102→L5→R104→L4→R103. Then, the relay control section 110 instructs the relay server M302 to obtain the content α from the relay server M301. In response to this instructions, the relay server M302 obtains the content α from the relay server M301. Finally, the QoS path reference relay control cache server C301 obtains the content α from the relay server M302.

Figure 13:
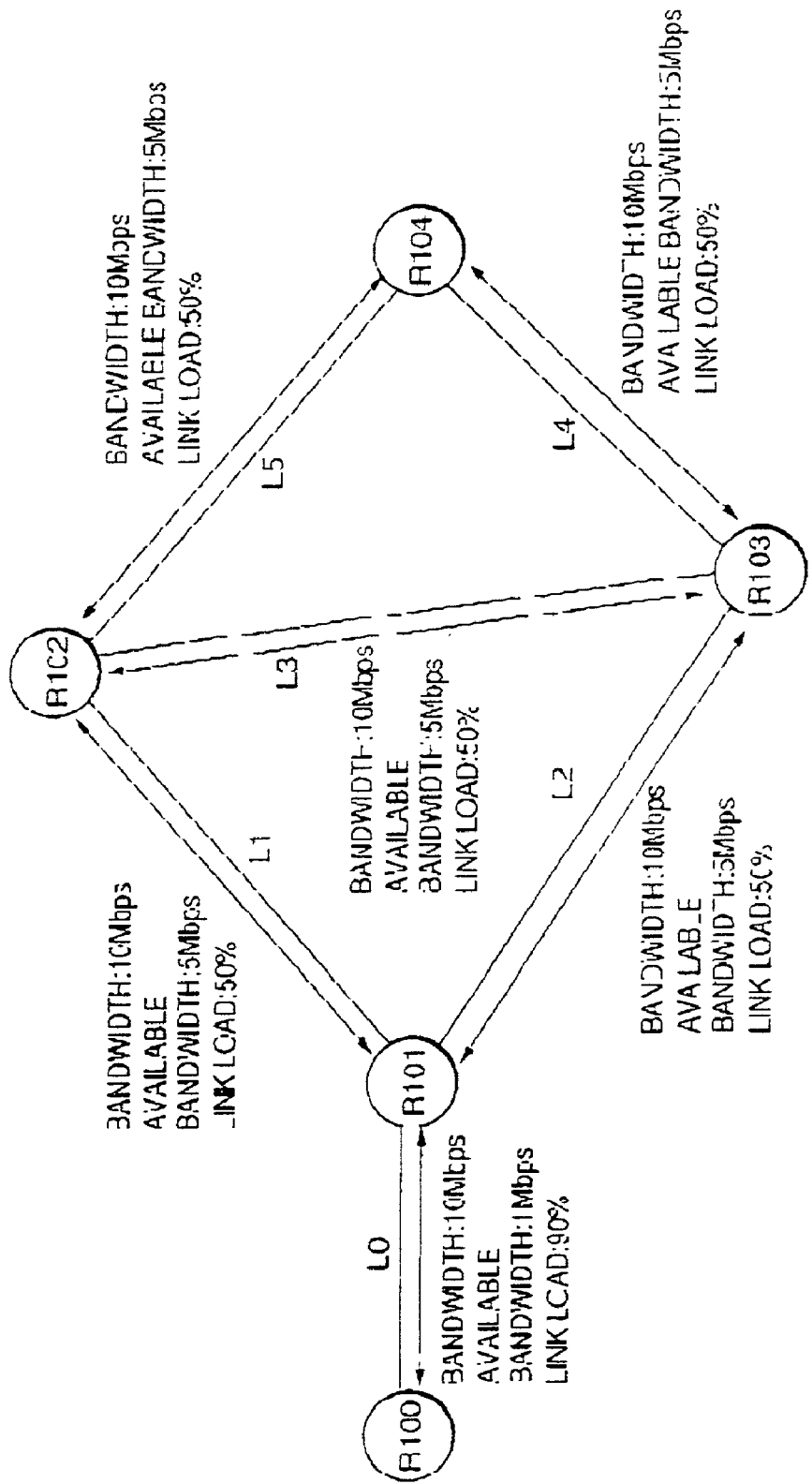
FIG. 13 is a diagram showing one example of QoS path information according to the third embodiment of the present invention.

In the case where the QoS path information obtained from the QoS path information obtaining section 102 is as shown in FIG. 13, it is not possible to set a path that does not include a congestion portion (link L0) even when the relay servers M301 and M302 existing on the network are used. In this case, the relay control section 110 transfers the content α from the Web server to a relay server which is one end of a path having no congestion portion among relay servers that exist on the path of S1→R102→L1→R101→L0→R100→C301 that is determined based on the content of the routing table. The relay server which is one end of a path having no congestion portion may not be a relay server nearest to the congestion portion, but it is most effective to transfer the content to the relay server nearest to the congestion portion.

In the case as shown in FIG. 13, an instructions is issued to the relay server M302 to have the content transferred to the relay server M302 on the path from S1→R102→L1→R101→M302. Thereafter, the relay control section 110 obtains the content α from the relay server M302 on the path from M302→R101→L1→R100→C301 after waiting for a recovery from the congestion status of the link L0 (the information about whether the traffic has been recovered from the congestion status or not can also be obtained from the QoS path information obtaining section 102).

Based on the operation, the available bandwidths on the network can be effectively utilized. Therefore, according to the network system of the present invention, there increases the possibility of achieving the automatic cache updating operation, the link prefetching operation, and the cache server cooperating operation, even in the situation where the conventional cache server has not been able to achieve these operations.

Further, it is possible to transfer the content to a relay server that exists in some midpoint in the path, and then obtain the content from this relay server after waiting for a recovery from the congestion status. Therefore, it is possible to obtain the content in a shorter time than the time required for obtaining the content from the Web server after waiting for a recovery from the congestion status.

Fourth Embodiment

Figure 14:
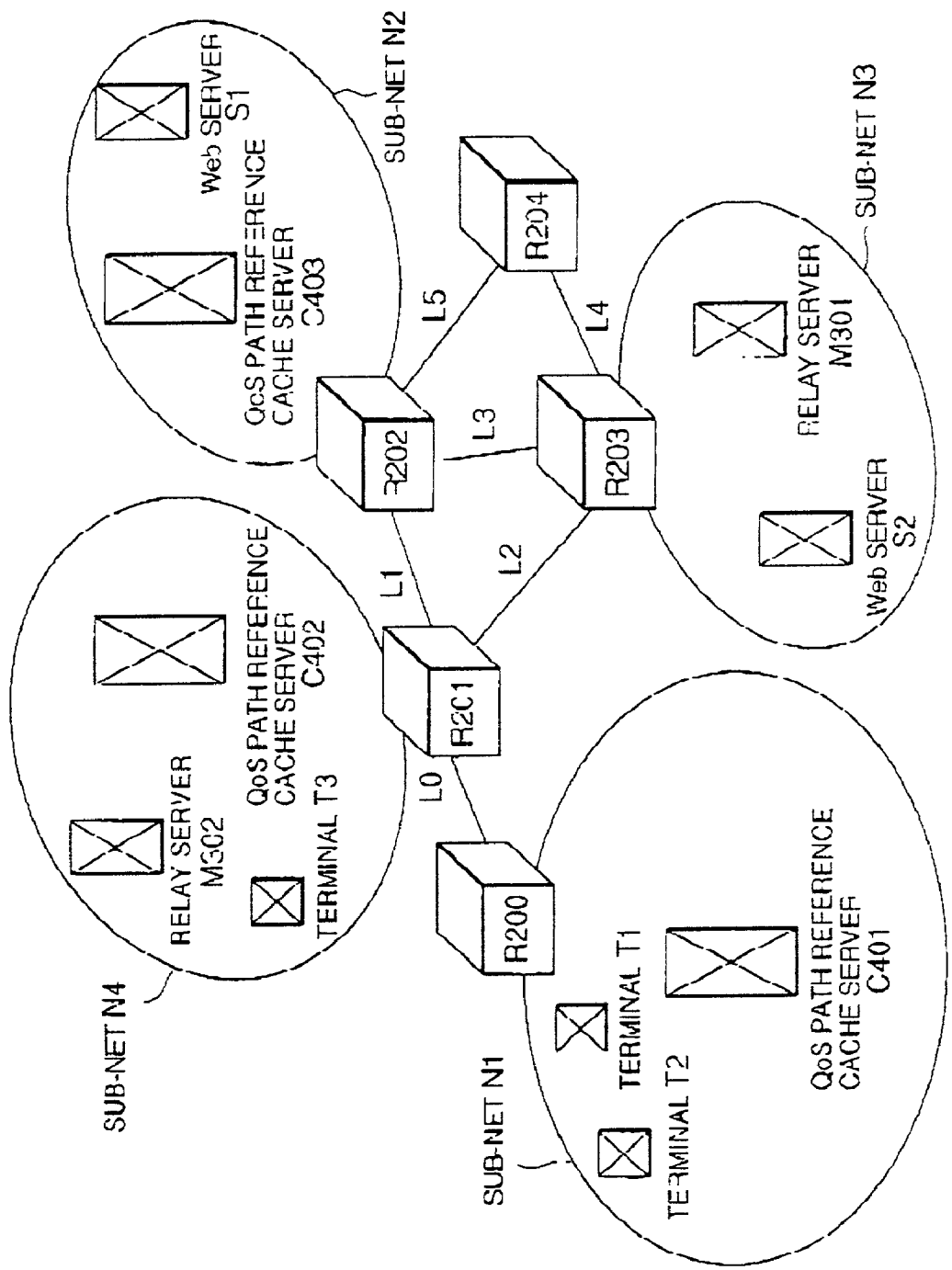
FIG. 14 is a block diagram showing an example of a structure according to a fourth embodiment of the present invention.

FIG. 14 is a block diagram showing an example of a structure of a network system according to a fourth embodiment of the present invention. The fourth embodiment is similar to the third embodiment, but is different in the following points. In the fourth embodiment, the routers are replaced with the path-settable routers R200 to R204 that have been explained in the second embodiment. Each of the path-settable routers R200 to R204 operates in the MPLS protocol and has path setting functions such that a necessary path can be set up based on the path information (consisting of network addresses of two cache servers that carry out communications, identifiers like port numbers for identifying communications, and a string of router names of routers that constitute a cache path). Such path information is designated by QoS path reference relay control cache server (C401 to C403). Each of the QoS path reference relay control cache server C401 to C403 has a function of setting paths to the path settable routers R200 to R204, in addition to the function of the QoS path reference relay control cache server explained in the third embodiment. It may be so designed that the QoS path reference relay control cache server take the role of the relay server at the same time. In other words, it may be so designed that the functional portions of the QoS path reference relay control cache servers and the functional portions of the relay servers are built into one casing. Further, it may also be so designed that the functional portions of the path settable routers, the functional portions of the QoS path reference relay control cache servers, and the functional portions of the relay servers are built into one casing, where the routers play both the roles of the QoS path reference relay control cache servers and the relay servers.

Figure 15:
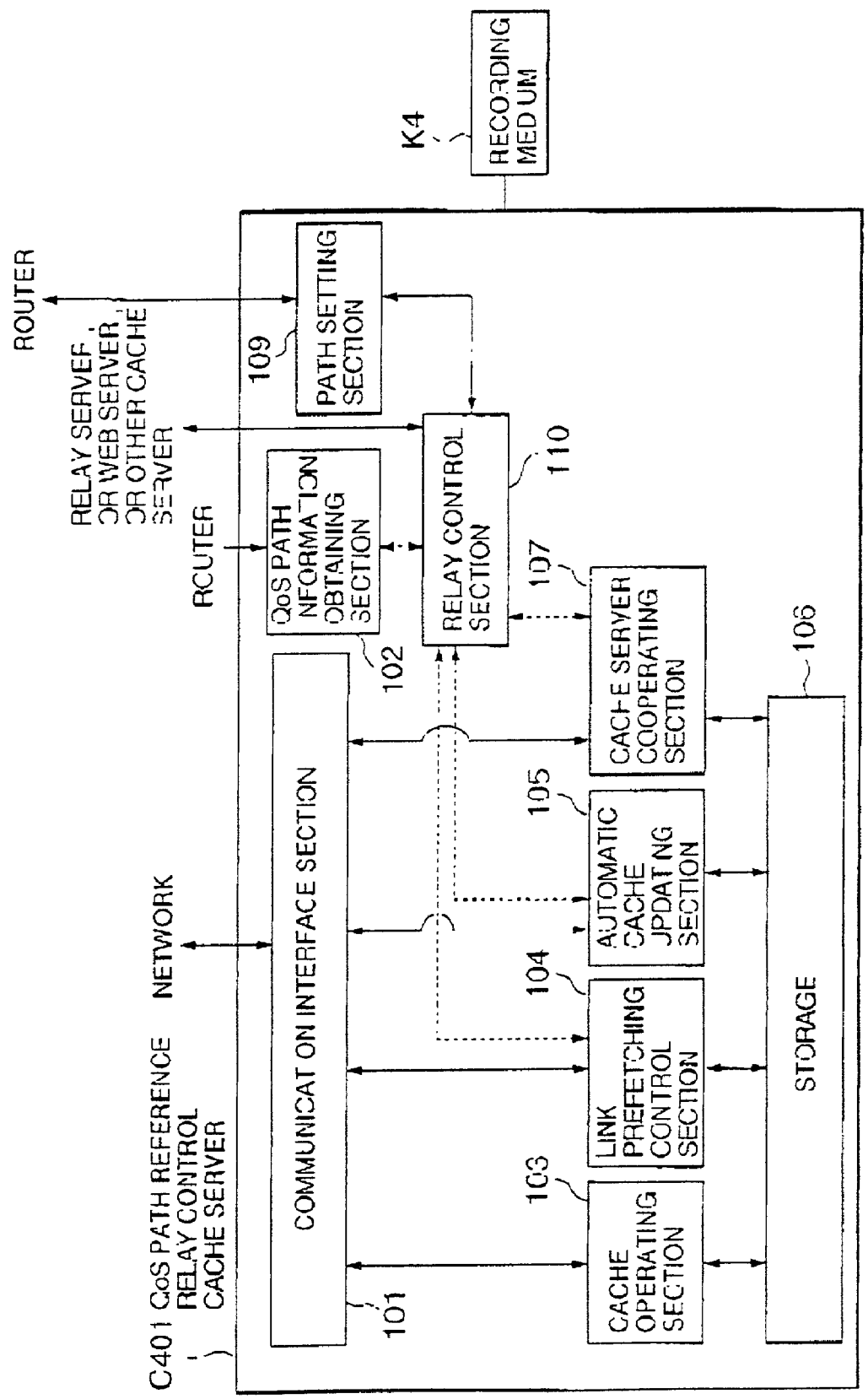
FIG. 15 is a block diagram showing an example of a structure of a QoS path reference relay control cache server C401.

FIG. 15 is a block diagram showing an example of a structure of the QoS path reference relay control cache server C401. The operations of a relay control section 110 and a path setting section 109 that are different from those of the third embodiment will be explained.

The path setting section 109 requests the protocol such as the MPLS of the path-settable router to specify a path according to path information received from the relay control section 110. Further the path setting section 109 cancels the path at the request of the relay control section 110.

The relay control section 110 operates in the substantially same manner as that of the relay control section 110 in the third embodiment, provided the relay control section 110 carries out the relay control by taking into account the QoS path information and the path detour information of the path setting section 109.

The QoS path reference relay control cache servers C401 is implemented by a computer. A recording medium K4 like a disk or a semiconductor memory stores a program for making the computer function as the QoS path reference relay control cache server. This program runs on the computer to control the operation of the computer, and thereby the communication interface section 101, the QoS path information obtaining section 102, the cache operating section 103, the link prefetching control section 104, the automatic cache updating section 105, the cache server cooperating section 107, the relay control section 110, and the path setting section 109 are realized on the computer.

Figure 16:
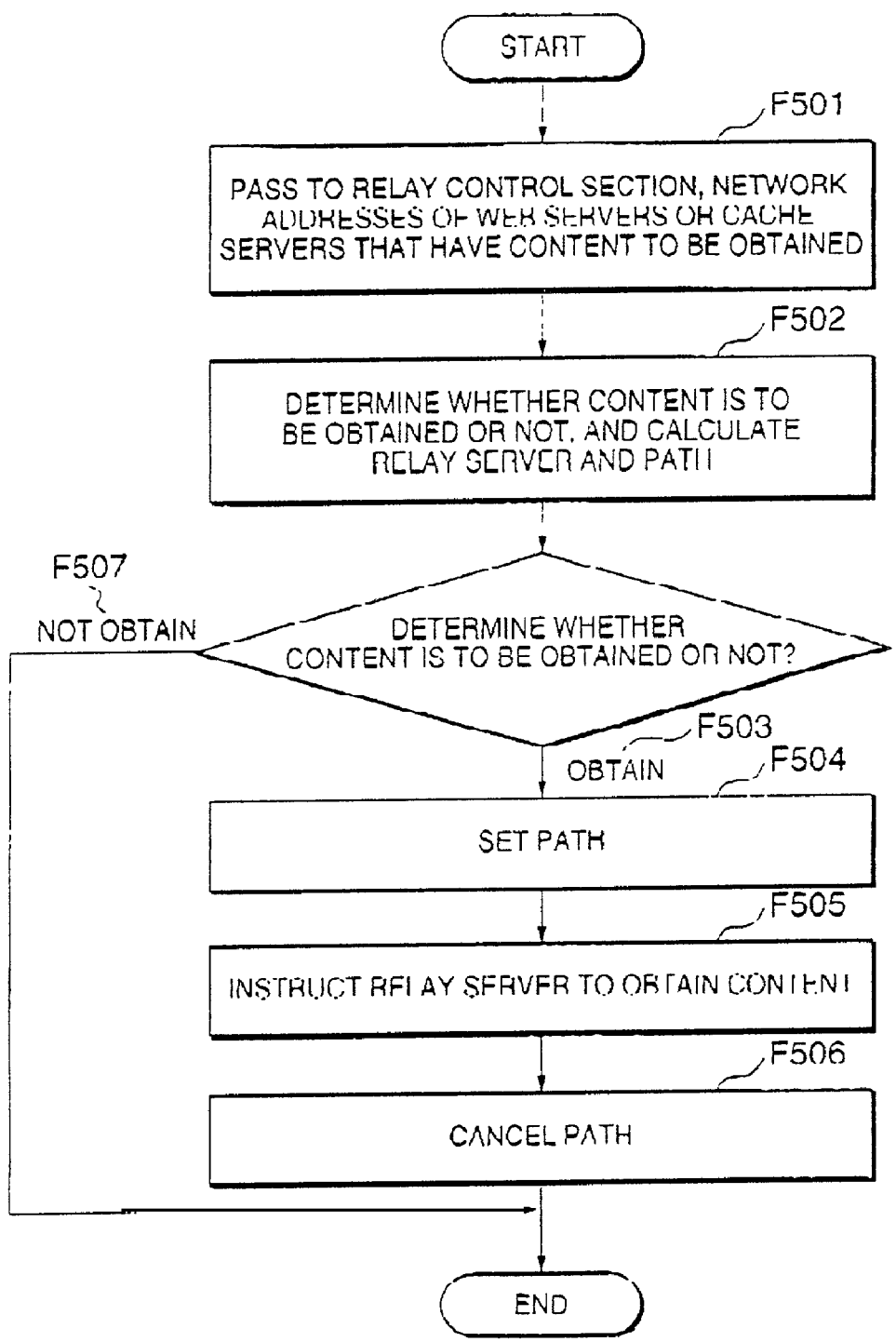
FIG. 16 is a flowchart showing an example of the operation according to the fourth embodiment of the present invention.

FIG. 16 is a flowchart showing the automatic cache updating operation, the link prefetching operation, and the cache server cooperating operation according to the fourth embodiment of the present invention. The operation that the automatic cache updating section 105 carries out for determining the content to be automatically updated, the operation that the link prefetching control section 104 carries out for determining the content for link prefetching, and the operation that the cache server cooperating section 107 carries out for determining the necessary content or the content summary, are the same as those of the conventional cache server. Therefore, these operations will not be explained here. The operation after the necessary content or content summary has been decided will be explained below.

The automatic cache updating section 105, the link prefetching control section 104, or the cache server cooperating section 107 pass to the relay control section 110 network addresses of the cache servers such as the QoS path reference relay control cache servers or the Web servers to which they want to make connection to obtain contents or content summaries in order to carry out the automatic cache updating operation, the link prefetching operation, and the cache server cooperating operation (F501).

Then, the relay control section 110 determines whether the content should be obtained from the received network address or not, based on the location information of the relay servers recognized in advance and the QoS path information obtained from the QoS path information obtaining section 102. When the content is to be obtained, the relay control section 110 determines a path and the relay server to be used (F502).

In the case of obtaining the content (F503), the relay control section 110 instructs the path setting section 109 to set a path based on the determined path. After the path setting section 109 has completed the setting of the path (F504), the relay control section 110 controls the relay server to obtain the content or the content summary, and passes the content to the source of request (the automatic cache updating section 105, the link prefetching control section 104, or the cache server cooperating section 107) (F505). Thereafter, the relay control section 110 instructs the path setting section 109 to cancel the set path (F506), and finishes the processing. When the content is not obtained (F507), the processing is terminated immediately.

The operation of the present embodiment will be explained based on an example. Description will be made of a case where the QoS path reference relay control cache server C401 obtains certain content α from the Web server S1 in the network system shown in FIG. 14. It is assumed that paths determined based on the content of a routing table are as follows:

path from S1 to C401: →R202→L1→R201→L0→R200→C401;

path from S1 to M302: S1→R202→L1→R201→M302;

path from S1 to M301: S1→R202→L3→R203→M301; and path from M301 to M302: M301→R203→L2→R201→M302.

Figure 17:
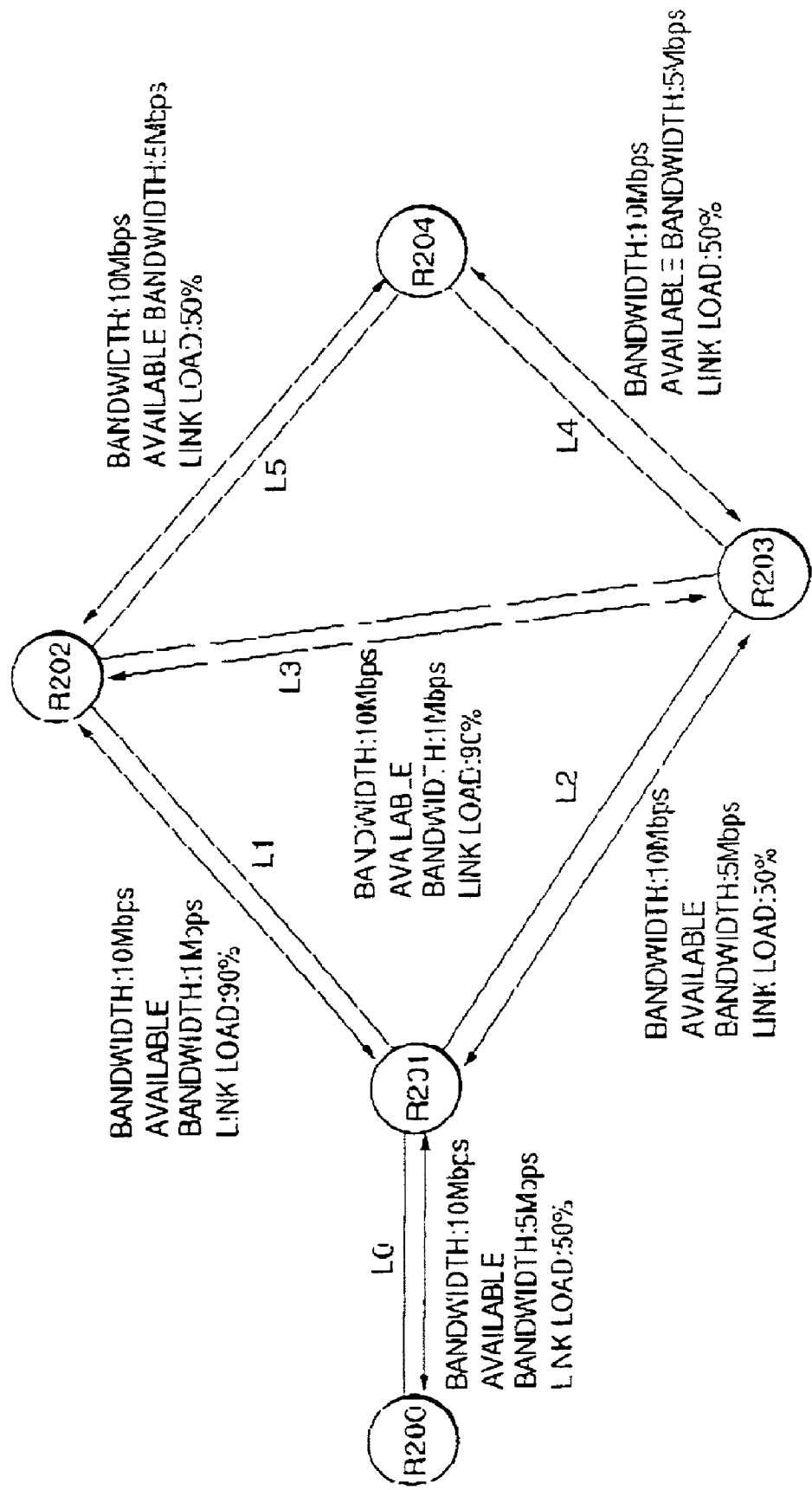
FIG. 17 is a diagram showing one example of QoS path information according to the fourth embodiment of the present invention.

It is further assumed that the QoS path information obtained from the QoS path information obtaining section 102 is as shown in FIG. 17. Here, when 90% or more of the link bandwidth is being used, it is determined that a congestion status exists. It is considered that a congestion status exists in the link L1 that is on the path from the QoS path reference relay control cache server C401 to the Web server S1. In this case, the relay control section 110 first checks whether there exists a congestion portion on the path that is determined based on the content of the routing table. When no congestion portion exist, the content is transferred using this path. However, in this case, a congestion portion (the link L1) exists on the path. Accordingly, the relay control section 110 uses the relay servers M301 and M302 and the path-settable routers R200 to R204 existing on the network, to check whether it is possible to set up a path from the Web server S1 to the QoS path reference relay control cache server C401 without passing through congestion portions (here, links L1 and L3. In this example, it is possible to set up a path that does not pass through any congestion portion, by using the relay servers M301 and M302 and the path-settable routers R200 to R204, as follows: S1→R202→L5→R204→L4→R203→M301→R203→L2→R201→M302→R201→L0→R200→C401. Therefore, the relay control section 110 notifies the path setting section 109 of this path.

Then, the path setting section 109 instructs the nearest path-settable router R200 to set up the above path. Thereafter, the relay control section 110 instructs the relay services M301 and M302 to relay the content on the path that uses only the links, each of which has a link bandwidth use rate lower than 90%, as follows:
S1→R102→L5→R104→L4→R103→M301 (relay)
M301→R103→L2→R101→M302 (relay)
M302→R101→L0→R100→C401.

Figure 18:
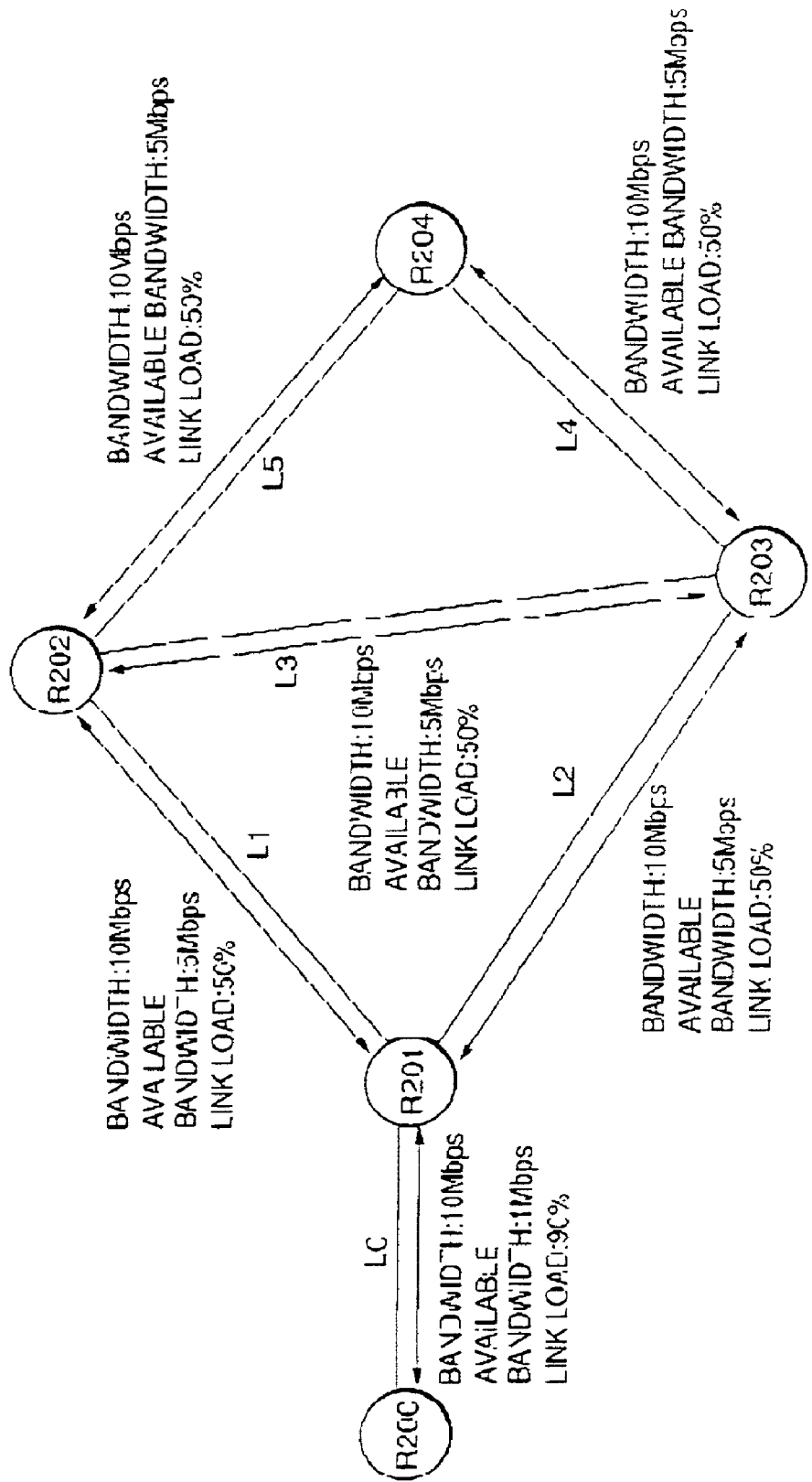
FIG. 18 is a diagram showing one example of QoS path information according to the fourth embodiment of the present invention.

It is assumed that the QoS path information obtained from the QoS path information obtaining section 102 is as shown in FIG. 18. In this case, it is not possible to set a path that does not include the congestion portion (link L0) even when the relay servers M301 and M302 existing on the network are used. Therefore, the relay control section 110 transfers the content α from the Web server to a relay server through a path on which there exists no congestion portion (this may not be a relay server nearest to the congestion portion, but it is most effective to transfer the content to a relay server nearest to the congestion portion) among relay servers that exist on the path of S1→R202→L1→R201→L0→R200→C401, that is determined based on the content of the routing table.

In the example as shown in FIG. 18, an instruction is issued to the relay server M302 to have the content transferred to the relay server M302 on the path from S1→R202→L1→R201→M302. Thereafter, the relay control section 110 obtains the content α from the relay server M302 on the path from M302→R201→L1→R200→C401 after waiting for a recovery from the congestion status of the link L0 (the information about whether the traffic has been recovered from the congestion status or not can also be obtained from the QoS path information obtaining section 102).

The path that is set in the above operation cannot be set in the third embodiment that has no path-setting function, without using the path assigning method like the source route option. Based on the above operation, the empty bandwidth on the network is effectively utilized. Therefore, according to the network system of the present invention, there increases the possibility of achieving the automatic cache updating operation, the link prefetching operation, and the cache server cooperating operation, even in the situation where the conventional cache server has not been able to achieve these operations.

Fifth Embodiment

Figure 19:
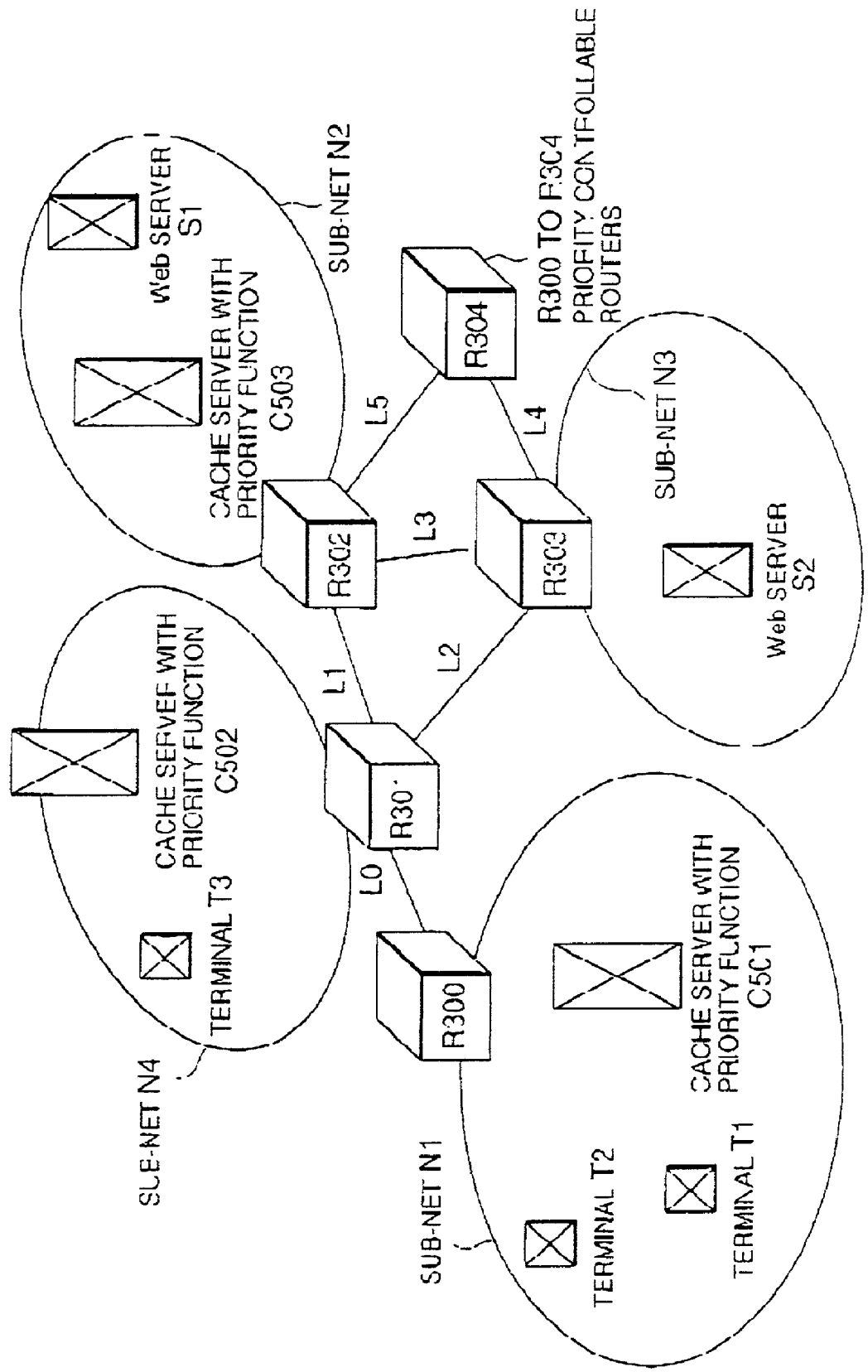
FIG. 19 is a block diagram showing an example of a structure according to a fifth embodiment of the present invention.

FIG. 19 is a block diagram showing an example of a structure of a network system according to a fifth embodiment of the present invention. In the fifth embodiment, the cache servers C1 to C3 of the network system (see FIG. 36) described in the conventional techniques are replaced with cache servers C501 to C503 each having priority functions, and the routers R0 to R4 are replaced with priority controllable routers R300 to R304. The priority controllable routers R300 to R304 can control the priority of transmitting a packet to a link, based on the priority information given to the packet.

Figure 20:
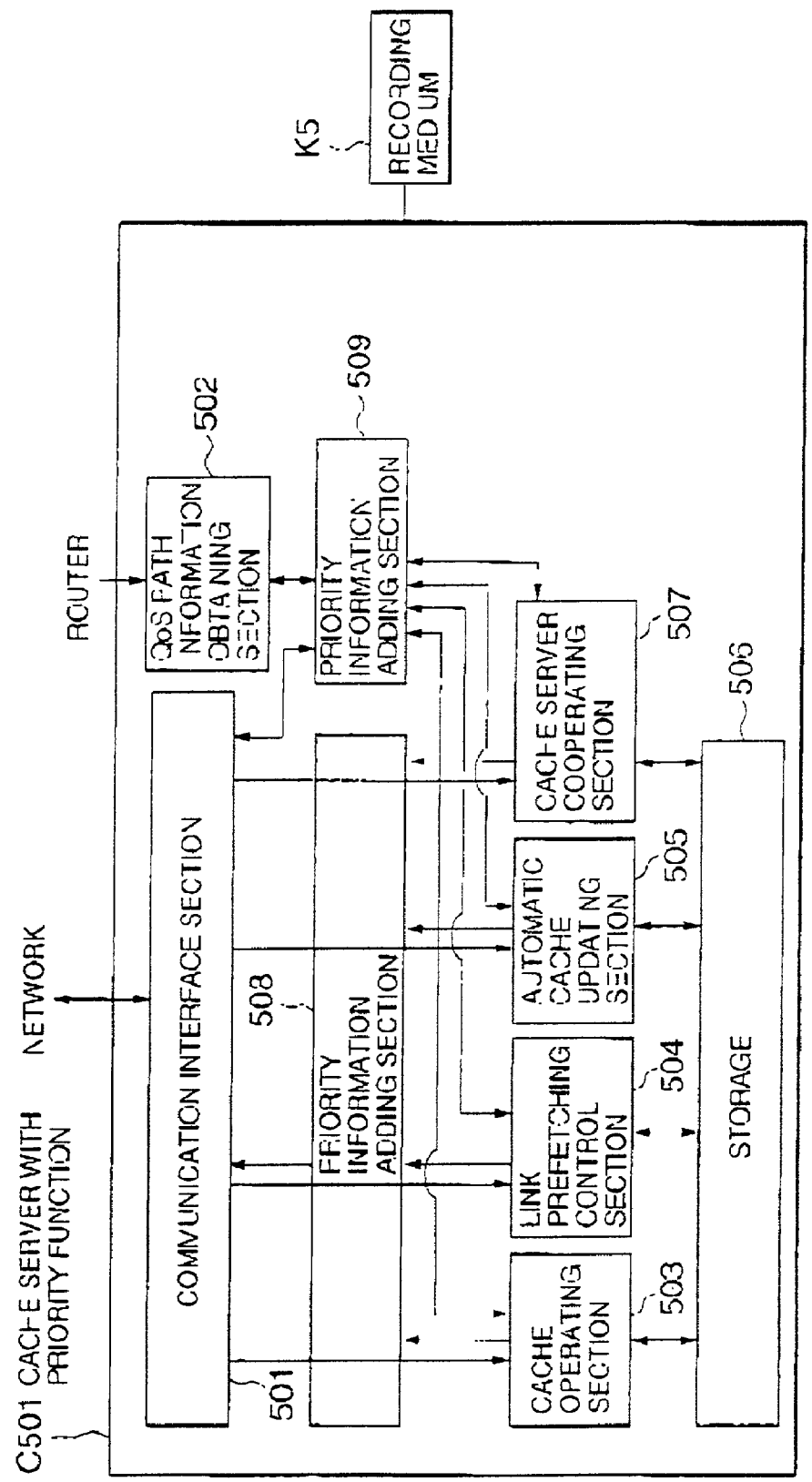
FIG. 20 is a block diagram showing an example of a structure of a cache server with priority function C501.

FIG. 20 is a block diagram showing an example of a structure of a cache server with priority function taking the cache server C501 as an example.

The communication interface section 501 passes data (a packet) from a network to a cache operating section 503, a link prefetching control section 504, a automatic cache updating section 505, and a cache server cooperating section 507. The communication interface section 501 receives a packet having priority information added thereto from a priority information adding section 508, and passes this packet to the network. The communication interface section 501 also transmits/receives the data to/from a priority providing section 509.

The cache operating section 503 receives a request for making access to the Web content from a terminal via the communication interface section 501, and searches a storage 506 for the content. When the content does not exist, the cache operating section 503 makes access to the corresponding Web server or other cache servers to obtain the content. The cache operating section 503 stores the obtained content in the storage 506, and at the same time, transmits the content to the request-orginating terminal. When the content exists, the cache operating section 503 transmits the content to the terminal.

In the case of carrying out the update checking operation when the content exists, the cache operating section 503 checks whether the last update date and time of the held content is older than the last update and time of the content held by the Web server. When the last update date and time of the held content is older, the cache operating section 503 obtains the content from the Web server, holds the obtained content in the storage 506, and at the same time, passes the content to the terminal. In relation to the above communications, the cache operating section 503 passes to the priority providing section 509 a request for providing a priority including a network address of the other party of communication, prior to the communication. Then, the cache operating section 503 passes the priority and a transmission packet provided from the priority providing section 509, to the priority information adding section 508. The priority information adding section 508 then transmits to the network the transmission packet having priority information added thereto.

The link prefetching control section 304 extracts links to content information which are now not stored in the storage 506 but have a possibility of making access thereto from now on, from the links to relevant information described in the Web content stored in the storage 506. The link prefetching control section 504 obtains the content, and stores them in the storage 506. In relation to the above communications, the link prefetching control section 504 passes to the priority providing section 509 a request for providing a priority including a network address of the other party of communications, prior to the communications. Then, the link prefetching control section 504 passes the priority and a transmission packet provided from the priority providing section 509, to the priority information adding section 508. The priority information adding section 508 then transmits to the network the transmission packet having priority information added thereto.

The automatic cache updating section 505 investigates the intervals of updating of content on the Web server where the content originally exist, for the Web content held within the storage 506. Then, the automatic cache updating section 505 determines the date and time of updating the cache content, obtains the content, and stores them in the storage 506. In relation to the above communication, the automatic cache updating section 505 passes to the priority providing section 509 a request for providing a priority including a network address of the other party of communications, prior to the communications. Then, the automatic cache updating section 505 passes the priority and a transmission packet provided from the priority providing section 509, to the priority information adding section 508. The priority information adding section 508 then transmits to the network the transmission packet having priority information showing the priority added thereto.

The storage 506 stores various Web contents and content summaries.

The cache server cooperated section 507 exchanges with each other lists of contents held by the respective cache servers and information (content summary) that shows the validity of the cache of the content held by each server, for carrying out redistribution, sharing and comparison of freshness among the cache servers. Based on this information, the cache server cooperating section 507 exchanges the contents with other cache servers as necessary. In relation to the above communication, the cache server cooperating section 507 passes to the priority providing section 509 a request for providing a priority including a network address of the other party of communications, prior to the communications. Then, the cache server cooperating section 507 passes the priority and a transmission packet provided from the priority providing section 509, to the priority information adding section 508. The priority information adding section 508 then transmits to the network the transmission packet having priority information showing the priority added thereto.

The priority information adding section 508 receives a transmission packet and priority information from the cache operating section 503, the link prefetching control section 504, the automatic cache updating section 505, or the cache server cooperating section 507. The priority information adding section 508 adds priority information showing the priority to the received transmission packet, and passes it to the communication interface section 501.

The priority providing section 509 receiving a request for providing a priority, from the cache operating section 503, the link prefetching control section 504, the automatic cache updating section 505, or the cache server cooperating section 507. Then, the priority providing section 509 provides the priority to the source of request. There are various methods of determining the priority to be provided. For example, it is possible to employ the following methods a) to c).

a) A priority to be given to each source of request is determined in advance. When there has occurred a request for provision of a priority, the predetermined priority is given to this source of request. More specifically, the priorities to be given to the link prefetching control section 504, the automatic cache updating section 505, and the cache server cooperating section 507 are set lower than the priority to be given to the cache operating section 503 or other communication units (not shown).

b) A priority to be given to each source of request is determined depending on the load on the path to the other communication party. (In the case of the same load, the priorities to be given to the cache operating section 503, the automatic cache updating section 505, and the cache server cooperating section 507 are set lower than the priority to be given to the link prefetching control section 504 or other communication units.) When there has occurred a request for provision of a priority, a load on the path is obtained. Then, a priority corresponding to this obtained load is selected from the priorities determined in advance for various source of requests and the selected priority is provided to this source of request. Specifically, when the load on the path to the other communication party is high, the priority is set low, and when the load on the path to the other communication party is low, the priority is set high. In the case of this method, it is necessary that the function of obtaining the load on the path to the other communication party based on the QoS path information obtained by the QoS path information obtaining section 502 is added to the priority providing section 509. The source of request passes a request for providing a priority including a network address of the other communication party, to the priority providing section 509.

c) A priority is provided depending on the type and attribute of content (e.g. moving picture, text, size, etc.) to be communicated. Specifically, when the type of content is a moving picture, a high priority is given, and when the type of content is a text, a low priority is given. In this case, a source of request passes a request for providing the priority including the type of the content to the priority providing section 509. Further, the source of request judges the type of content based on an extension added to the content stored in the storage 506.

In addition to the above-described methods (a) to (c), when the other communication party is a host such as the cache server with priority function allowing the priority control, which has a function equivalent to that of the priority providing section 509, it is possible to determine a priority based on mutual communications. Further, it is also possible that the other communication party designates the priority of a packet to be received.

The QoS path information obtaining section 502 has similar functions to those of the QoS path information obtaining section 102 as shown FIG. 2.

The cache server with priority function C501 is implemented by a computer. A recording medium K5 like a disk or a semiconductor memory stores a program for making the computer function as the cache server with priority function. This program runs on the computer to control the operation of the computer, and thereby the communication interface section 501, the QoS path information obtaining section 502, the cache operating section 503, the link prefetching control section 504, the automatic cache updating section 505, the cache server cooperating section 507, the priority information adding section 508, and the priority providing section 509 are realized on the computer.

Figure 21:
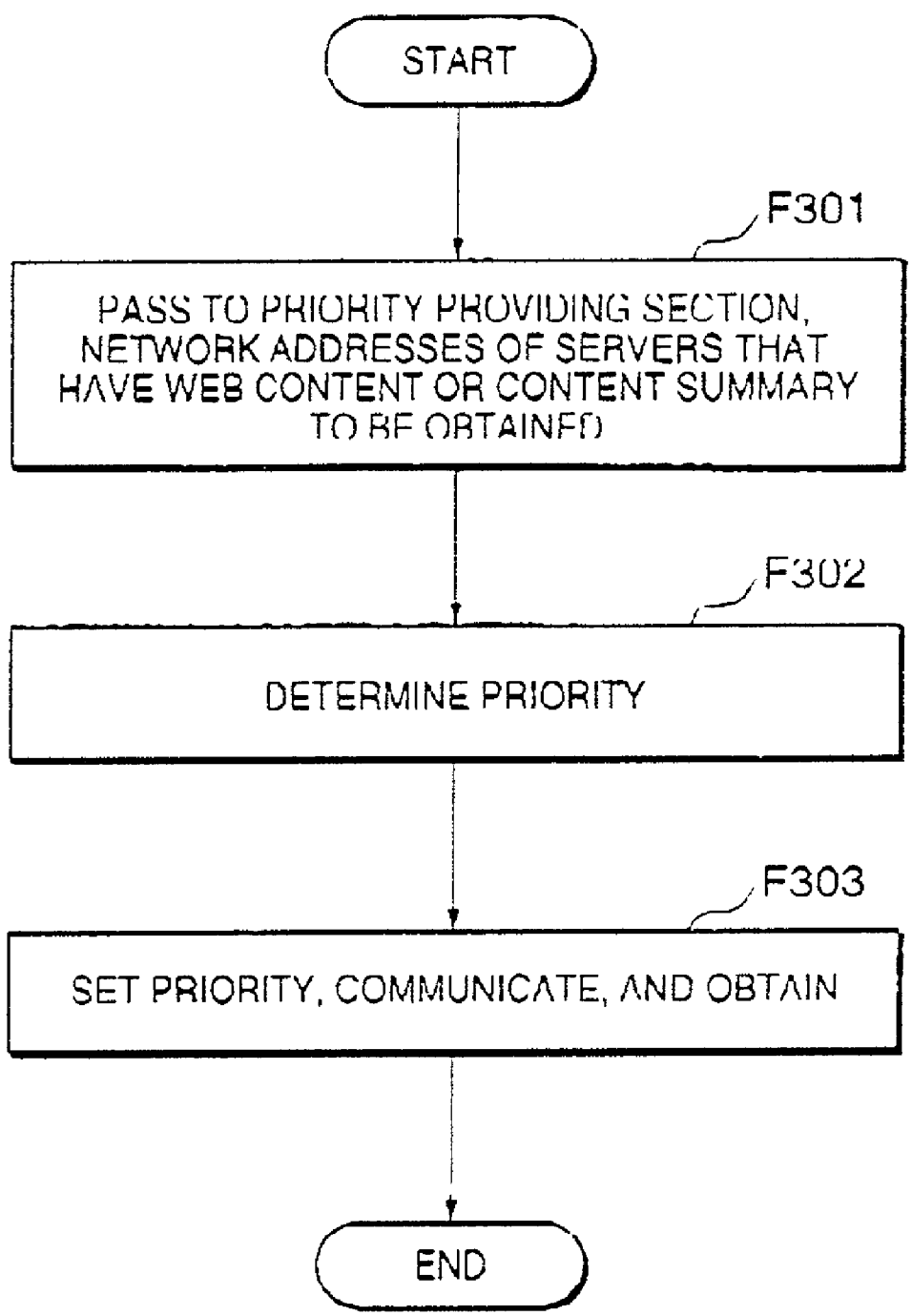
FIG. 21 is a flowchart showing an example of the operation according to the fifth embodiment of the present invention.

FIG. 21 is a flowchart showing the cache operation, the automatic cache updating operation, the link prefetching operation, and the cache server cooperating operation according to the fifth embodiment of the present invention. The process of determination of the other communication party in each operation is similar to that of the conventional cache server. Therefore, the flowchart of FIG. 21 show the operation after the other communication party has been determined.

First, among the cache operating section 503, the link prefetching control section 504, the automatic cache updating section 505, and the cache server cooperating section 507, a source of request that wants to obtain content or content summary passes to the priority providing section 509 a request for providing a priority including the network address of a Web server or cache server such as a cache server with priority function that holds the content or the content summary (F301).

The priority providing section 509 determines the priority to be provided, depending on the network address included in the priority provision request and which on of the cache operating section 503, the link prefetching control section 504, the automatic cache updating section 505, and the cache server cooperating section 507 is the source of request. When the other communication party has a function equivalent to the function of the priority control, the priority may be determined through communications with this communication party. Alternatively, the priority may be determined depending on what is designated by the other communication party as priority to be given to the packet. After the priority has been determined, the priority providing section 509 notifies the source of request of this determined priority (F302).

The source of request passes the received priority and the transmission packet (that includes the information showing the content to be obtained) to the priority information adding section 508. The priority information adding section 508 adds the priority to this transmission packet, and passes it to the communication interface section 501. As a result, communication with the other party can be performed according to the priority specified by the priority information, obtaining the Web content or content summary (F303).

Based on the above operation, according to the network system of the present invention, it is possible to carry out communications by setting low priority to communications relating to the automatic cache updating operation, the link prefetching operation, and the cache server cooperating operation, even under congestion in a part of the network where the conventional cache server has not been able to achieve these operations. As a result, it is possible to achieve the communications without aggravating the congestion status of the network.

Sixth Embodiment

Figure 22:
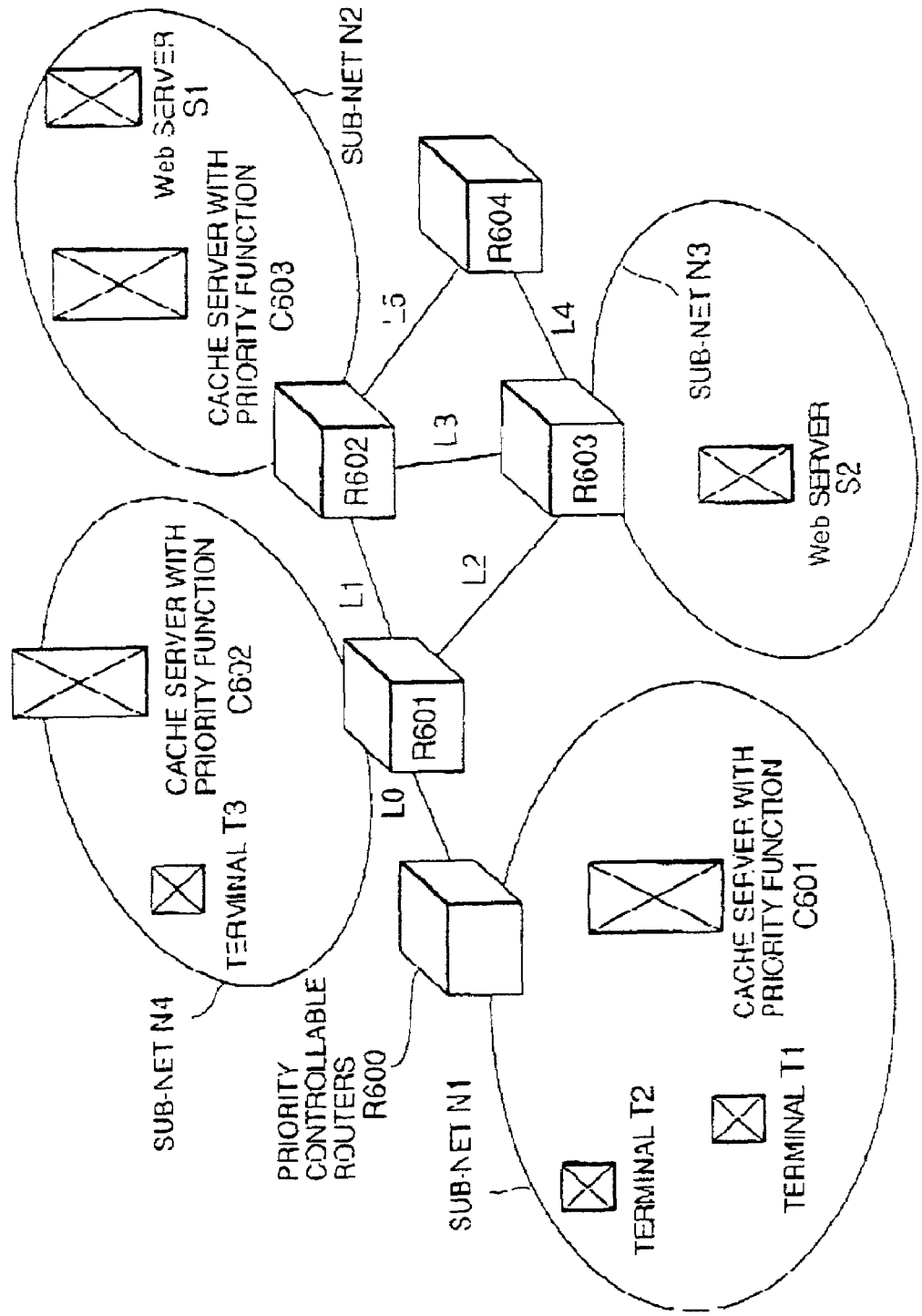
FIG. 22 is a block diagram showing an example of a structure according to a sixth embodiment of the present invention.

FIG. 22 is a block diagram showing an example of a structures of a network system according to a sixth embodiment of the present invention. In the sixth embodiment, the cache servers C1 to C3 of the network system (see FIG. 36) described in the conventional technique are replaced with cache servers with priority function C601 to C603, and the routers R0 to R4 are replaced with priority controllable routers R600 to R604.

The priority controllable routers R600 to R604 have a function of providing priority information showing a priority to a packet relating to a communication flow indicated in the packet that flows through the network, where the communication flow and the priority are indicated by the cache server with priority functions C601 to C603, and a function of controlling the priority of transmitting the packet to a link based on the priority information given to the packet. A specific communication flow is defined depending on a set of network address information of hosts at both ends (a cache server and a Web server) on the communication, port numbers information for identifying the communication, and protocol information, for example, that are included in a packet header. The specific communication flow can be identified by making a decision about whether the set of the information matches a set of information given from the cache server with priority function for each packet in advance. For a communication flow without designation, this flow is handled in a certain predetermined priority (called a default priority PD).

Figure 23:
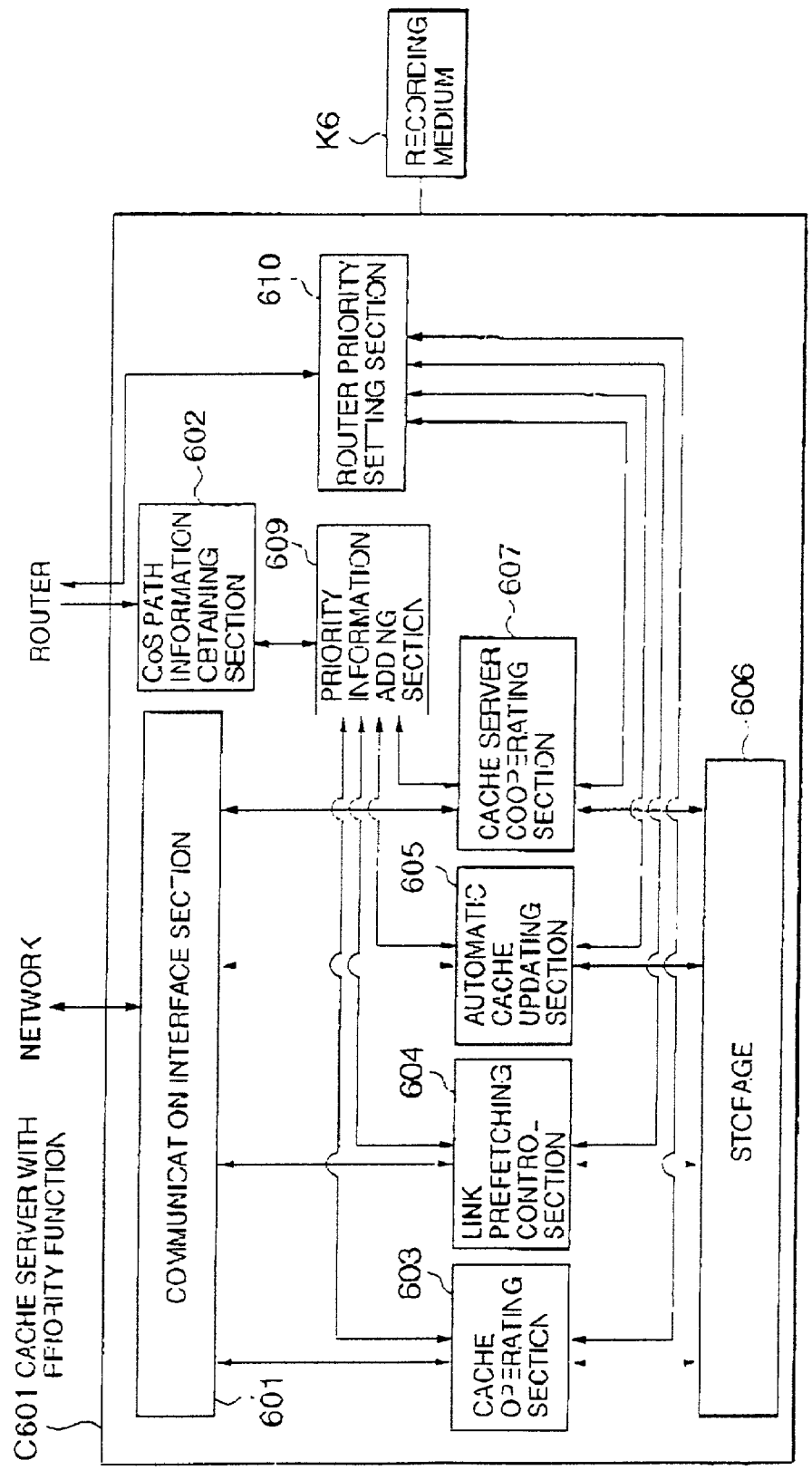
FIG. 23 is a block diagram showing an example of a structure of a cache server with priority function C601.

FIG. 23 is a block diagram showing an example of a structure of the cache server with priority function C601. Constitute elements of the cache server with priority function C601 will be described below. The other cache server with priority functions C602 and C603 also have similar structures.

The communication interface section 601 passes data (a packet) from a network to a cache operating section 603, a link prefetching control section 604, a automatic cache updating section 605, and a cache server cooperating section 607.

The QoS path information obtaining section 602 has similar functions to those of the QoS path information obtaining section 102 as shown in FIG. 2.

The cache operating section 603 receives a request for making access to the Web content from a terminal via the communication interface section 601, and searches a storage 606 for the content. When the content is not found, the cache operating section 603 makes access to the corresponding Web server or other cache servers to obtain the content. The cache operating section 603 stores the obtained content in the storage 606, and at the same time, transmits the content to the request-orginating terminal. When the content is found, the cache operating section 603 transmits the content to the request originating terminal. In the case of carrying out the update checking operation when the content is found, the cache operating section 603 checks whether the last update date and time of the held content is older than the last update date and time of the content held by the Web server. When the last update date and time of the held content is older, the cache operating section 603 obtains the content of the Web server, holds the obtained content in the storage 606, and at the same time, passes the content to the terminal. In relation to the above communications for obtaining the content, the cache operating section 603 carries out the following "priority setting operation".

Priority Setting Operation

Prior to communication, the cache operating section 603 passes a request for providing a priority including a network address of the other communication party, to the priority providing section 609. The cache operating section 603 receives information indicating one or more set of address of router to which priority is to be set, next hop router address, and priority, from the priority providing section 609. The cache operating section 603 notifies each of routers shown in the priority-setting router addresses included in the above information of flow identification information, the next hop router address and the priority included in the above information, by utilizing a router priority setting section 610 to set the priority. After finishing the communication, the above priority setting in canceled.

The link prefetching control section 604 extracts links to content information which are now not stored in the storage 606 but have a possibility of making access thereto from now on, from the links to relevant information described in the Web content stored in the storage 606. The link prefetching control section 604 obtains the content, and stores them in the storage 606. In relation to the above communications for obtaining the content, the link prefetching control section 604 also carries out the priority-setting operation defined above.

The automatic cache updating section 605 investigates the intervals of updating of the content on the Web server where the content originally exists, for the Web content held within the storage 606. Then, the automatic cache updating section 605 determines the time of updating the cache content to obtain the content, and stores them in the storage 606. In relation to the above communications for obtaining the content, the automatic cache updating section 605 also carries out the priority-setting operation defined above.

The storage 606 stores various Web contents and content summaries.

The cache server cooperating section 607 exchanges with each other lists of contents held by the respective cache servers and information (content summary) that shows the validity of the cache of the content held by cache server, for carrying out redistribution, sharing and comparison of freshness among the cache servers. Based on this information, the cache server cooperating section 607 exchanges the content as necessary. In relation to the communications for the content summary and for exchanging contents, the cache server cooperating section 607 also carries out the priority-setting operation defined above.

The priority providing section 609 receives a request for providing a priority, from the cache operating section 603, the link prefetching control setting 604, the automatic cache updating section 605, and the cache server cooperating section 607. When receiving such a request, the priority providing section 609 notifies the source of request of what priority is to be set to which router. This information includes one or more set of router address of router to which a priority is to be set, a next hop-router address, and a priority. There are various methods of determining the priority to be provided. For example, it is possible to employ the following methods (d) to (f).

Priority Determination d) A threshold value with respect to a load on the path to the other communication party, and a priority to be set when the load exceeds the threshold value, are determined for each source of request in advance. A threshold value for the link prefetching control section 604, the automatic cache updating section 605, and the cache server cooperating section 607 is set lower than that for the cache operating section 603 or other communications unit (not shown). The priority to be applied when the load threshold value is exceeded is set lower than that to be applied when the load threshold value is not exceeded. The priority to be applied when the threshold value is not exceeded can be set as a default priority PD, for example. The priority to be applied when the threshold value is exceeded can be set as P (P<PD) for all the source of requests. The priority to be applied when the threshold value is exceeded can also be set different for each source of request. In this case, the priority to the link prefetching control section 604, the automatic cache updating section 605, and the cache server cooperating section 607 is set lower than the priority to the cache operating section 603 or other communication unit (not shown). When there has been a request for providing a priority, the load of each link on the path is obtained. For the link of which load exceeds the threshold value determined in advance for each source of request, a corresponding priority is provided.

Consider the case where the cache server with priority function C601 carries out a link prefetching operation from the Web server S1, taking the network system as shown in FIG. 22 as an example.

It is here assumed that the path in this case is C601←→R600←(L0)→R601←→R603←→R604←(L5)→R602←→S1, in which the load on the link (L5) between the R602 and R604 and the load on the link (L0) between the R601 and R600 both exceed the threshold value determined in advance for the link prefetching operation, and further that the priority when the load exceeds the threshold value is P.

The priority providing section 609 wants to set a priority to the communication flow from the Web server S1 to the cache server with priority function C601. Therefore, the priority providing section 609 decides as follows:

1. The priority providing section 609 sets the priority P to the flow to the direction of R604 at the first router R602 of the Web server S1;

2. The priority providing section 609 sets the default priority PD to the flow to the direction of R603 at the R604; and 3. The priority providing section 609 sets the priority P to the flow to the direction of R600 at the R601.

Thereafter, the priority providing section 609 sends back to the link prefetching control section 604, a set of the network address to the R602, the address of the next hop router R604, and the priority P, a set of the network address of the R604, the address of the next hop router R603, and the priority PD: PD>P, and a set of the network address of the R601, the address of the next hop router R600, and the priority P.

Alternatively, the priority providing section 609 may carry out only the processing of 1, out of the processing from 1, to 3, to return only the set of the network address of the R602, the address of the next hop router R604, and the priority P to the link prefetching control section 604. However, in this case, it takes longer time for the source of request to obtain the content than the case when the priority providing section 609 carries out all the processing from 1, to 3, above.

e) In the above (d), the threshold value of the load on the path and the priority to be set when the threshold value is exceeded, may be changed for each link. Consider the case where the cache server with priority function C601 carries out a link prefetching operations from the Web server S1 in FIG. 22, for example.

In this case, it is assumed that the path is C601←→R600←(L0)→R601←→R603←→R604←(L5)→R602←→S1. Further, it is assumed that, on the path, the load on the link (L5) between the R602 and R604, and the load on the link (L0) between the R601 and R600 exceed threshold values determined in advance for the link prefetching operation, respectively and that the priorities when the respective loads exceed the threshold values are P1 and P2 (P1<PD, P2<PD).

The priority providing section 609 wants to set a priority to the communication flow from the Web server S1 to the cache server with priority function C601. Therefore, the priority providing section 609 decides as follows.

1. The priority providing section 609 sets the priority P1 to the flow to the direction of R604 at the first router R602 of the Web server S1;

2. The priority providing section 609 sets the default priority PD to the flow to the direction of R603 at the router R604;

3. The priority providing section 609 sets the priority P2 to the flow to the direction of R600 at the router R601.

Thereafter, the priority providing section 609 returns to the link prefetching control section 604, a set of the network address of the R602, the address of the next hop router R604, and the priority P1, a set of the network address of the R604, the address of the next hop router R603, and the priority PD, and a set of the network address of the R601, the address of the next hop router R600, and the priority P2.

f) The priority is changed for each link depending on the characteristic of content (a moving picture, a text, a frequency of updating the content, a size, etc.) or the degree of congestion at the link. For example, in the case of a moving picture, a priority is provided (a lower priority than the default priority is provided) even when the degree of congestion at the link is lower than that in the case of a text. Further, a higher priority is provided to a moving picture, than the priority of a text.

In addition to the methods (d) to (f) described above, when the other communication party is a priority-controllable host such as the cache server with priority function and has a function equivalent to the function of the priority providing section 609, it is possible to determine a priority through mutual communications.

The router priority setting section 610 receives (sets of information including addresses of routers to which priority is to be set, a next hop router address, and a priority), and flow identification information, from the link prefetching control section 604, the automatic cache updating section 605, and the cache server cooperating section 607. The router priority setting section 610 instructs the router indicated by the priority-setting router address to set the flow identification information and the priority to the path to the next hop router address, for each of the above set.

When the link prefetching control section 604, the automatic cache updating section 605, or the cache server cooperating section 607 has issued a setting-cancellation instruction, the router priority setting section 610 cancels the setting.

The cache server with priority function C601 is implemented by a computer. A recording medium K6 like a disk or a semiconductor memory stores a program for making the computer function as the cache server with priority function. This program runs on the computer to control the operation of the computer, and thereby the communication interface section 601, the QoS path information obtaining section 602, the cache operating section 603, the link prefetching control section 604, the automatic cache updating section 605, the cache server cooperating section 607, the priority providing section 609, and the router priority setting section 610 are realized on the computer.

Figure 24:
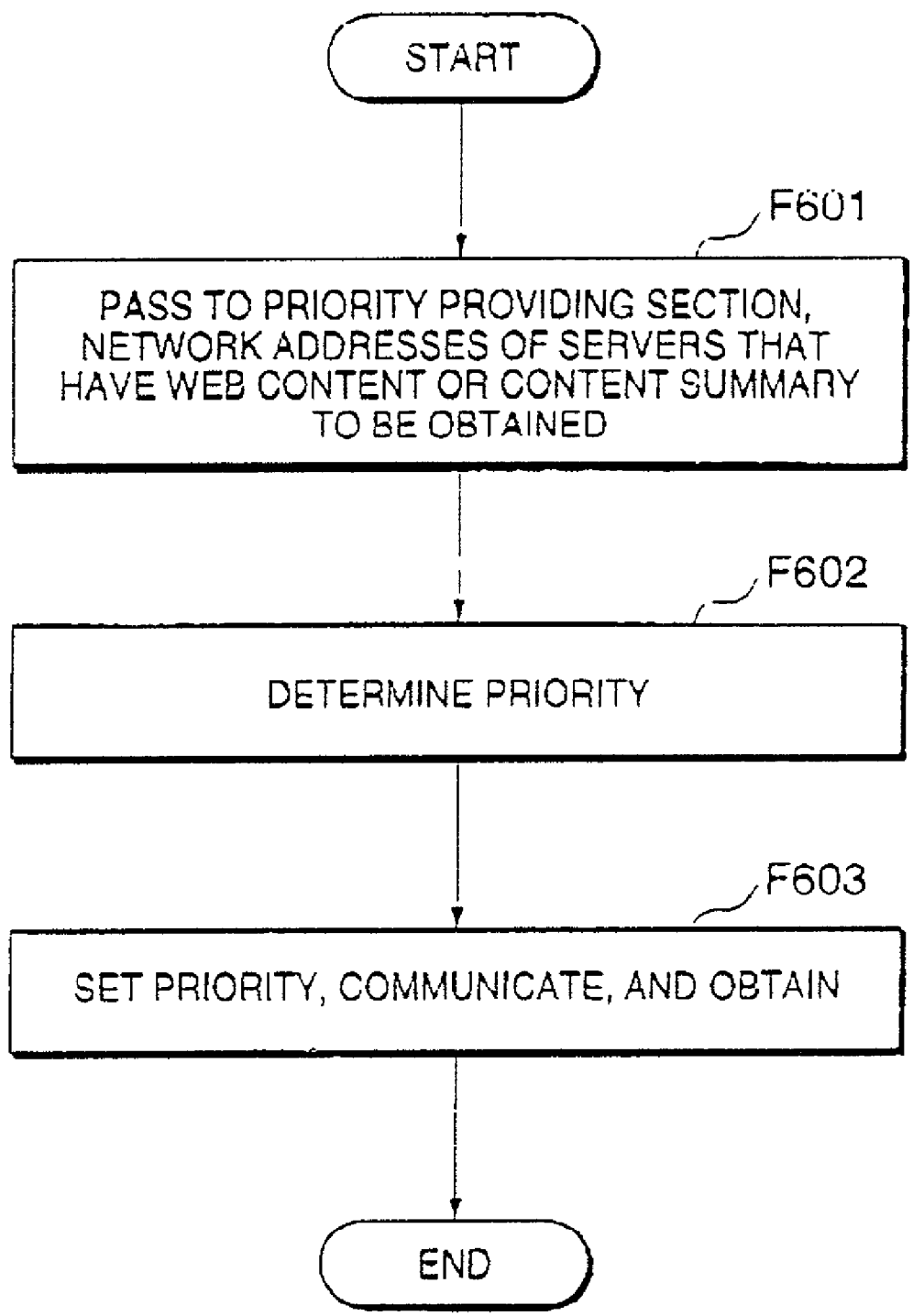
FIG. 24 is a flowchart showing an example of the operation according to the sixth embodiment of the present invention.

FIG. 24 is a flowchart showing the cache operation, the automatic cache updating operation, the link prefetching operation, and the cache server cooperating operation according to the sixth embodiment of the present invention. The determination of the other communication party in each operation is similar to that of the conventional cache server. Therefore, the flowchart shows the operation after the other communication party has been determined.

First, among the cache operating section 603, the link prefetching control section 604, the automatic cache updating section 605, and the cache server cooperating section 607, a source of request that wants to obtain content or content summary passes to the priority providing section 609 a request for providing a priority including network addresses of Web servers or cache server such as cache servers with priority functions, that hold the content or the content summary (F601).

The priority providing section 609 determines the network address included in the request for priority provision, the source of request which is one of the cache operating section 503, the link prefetching control section 504, the automatic cache updating section 505, and the cache server cooperating section 507, the priority to be provided depending on the content and the QoS path information of the network, and the next hop router to which the priority is to be set, and then notifies the source of request of the determination (F602).

The source of request passes the received one or more set of router to which the priority is to be set, next hop router, and priority, and identification information on the communication flow to which the priority is to be set, to the router priority setting section 310. The router priority setting section 310 sets the priority to the router based on the received information. After this has been completed, the source of request obtains the Web content or content summary from the other communication party (F603). Then, the source of request instructs the router priority setting section 310 to cancel the priority setting, which causes the priority setting to be canceled.

Based on the above operation, according to the network system of the present invention, it is possible to carry out communications by setting a low priority to communications relating to the automatic cache updating operation, the link prefetching operation, and the cache server cooperating operation, even under a congestion in a part of the network where the conventional cache server has not been able to achieve these operations. As a result, it is possible to achieve the communications without aggravating the congestion status of the network. Therefore, it is possible to increase the efficiency of the cache server.

Seventh Embodiment

Figure 25:
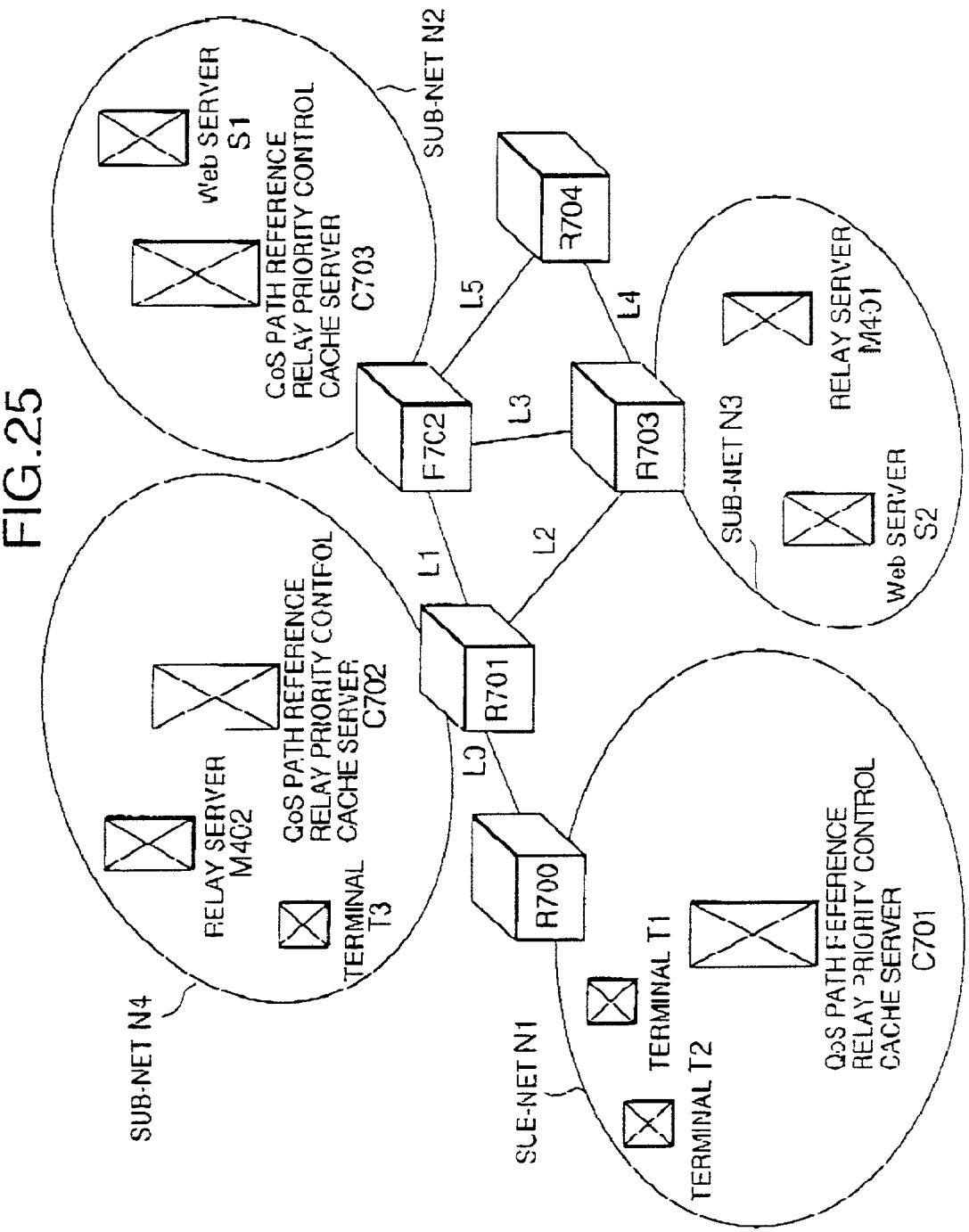
FIG. 25 is a block diagram showing an example of a structure according to a seventh embodiment of the present invention.

FIG. 25 is a block diagram showing an example of a structure according to a seventh embodiment of the present invention. The seventh embodiment is similar to the fourth embodiment, but is different in the following points. The path settable routers R200 to R204 are replaced with path-setting priority controllable routers R700 to R704 that have the priority control function explained in the routers of the sixth embodiment in addition to the functions of the path-settable routers. Further, the QoS path reference relay control cache servers C401 to C403 are replaced with QoS path reference relay priority control cache server C201 to C703.

The routers R700 to R704 according to the present embodiment are designed to operate on MPLS protocol similarly to the routers R200 to R204 of the fourth embodiment, in addition to the ordinary routers. In other words, each of the routers R700 to R704 has a function of setting a necessary path based on the designated information (network addresses of two cache servers that communicate with each other, identifiers such as port numbers for identifying communications, and a string of router names of routers that constitute a cache path). In addition, each of the routers R700 to R704 has the function similar to that of the priority controllable router (R600 to R604) described in the sixth embodiment. In other words, each of the routers R700 to R704 has a function of identifying a specific communication flow, and providing priority information to a packet, according to the request from the cache servers C701 to C703, and a function of controlling the priority of transmitting a packet to a link, based on the priority information provided to the packet. The specific communication flow is defined by a set of network address information of hosts at both ends (a cache server and a Web server) that communicate with each other, port number information for identifying the communications, and protocol information, for example, that are included in the header of the packet. The specific communication flow can be identified by making a decision about whether the set of the information matches a set of information given from the cache server with priority function for each packet in advance. A communication flow having no designation is handled in a certain predetermined priority (called a default priority PD). Further, the QoS path reference relay priority control cache servers C701 to C703 have the function of setting a priority to a router as described in the sixth embodiment, in addition to the functions of the QoS path reference relay control cache servers described in the fourth embodiment.

Figure 26:
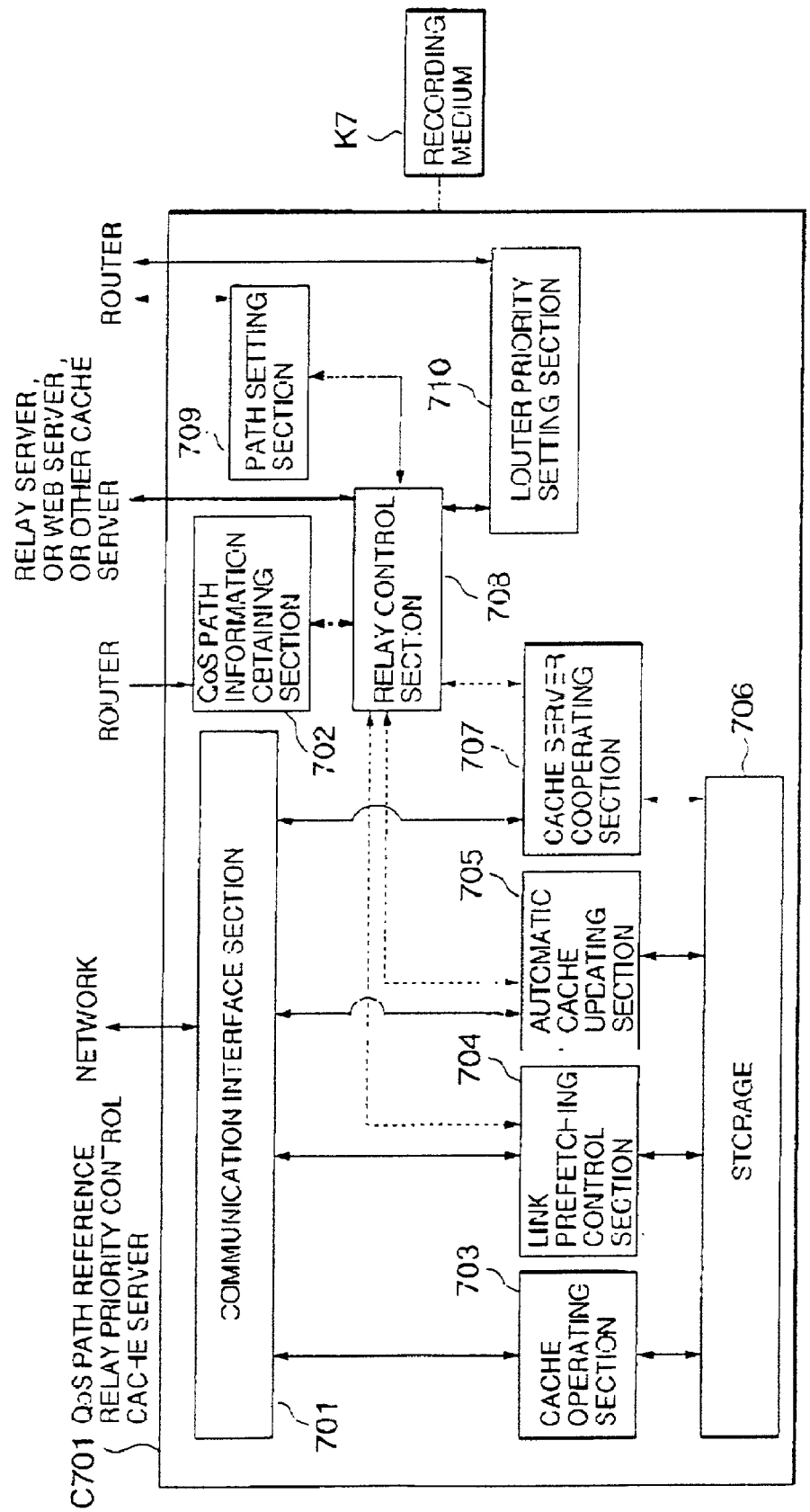
FIG. 26 is a block diagram showing an example of a structure of a QoS path reference relay priority control cache server C701.

FIG. 26 is a block diagram showing an example of a structure of the QoS path reference relay priority control cache server C701. The other QoS path reference relay priority control cache server C702 and C703 also have similar structures.

Among the constituent elements of the QoS path reference relay priority control cache server C701, a relay communication interface section 701, a QoS path information obtaining section 702, a cache operating section 703, a link prefetching control section 704, an automatic cache updating section 705, a cache server cooperating section 707, and a path setting section 709 have functions similar to these of the relay communication interface section 101, the QoS path information obtaining section 102, the cache operating section 103, the link prefetching control section 104, the automatic cache updating section 105, the cache server cooperating section 107, and the path setting section 109 shown in FIG. 15, respectively. The router priority setting section 710 has a function similar to that of the router priority setting section 610 shown in FIG. 23. Accordingly, a relay control section 708 that is a different point from the other embodiments will be described hereafter.

The relay control section 708 receives information for specifying the Web content or content summary to be obtained, from the link prefetching control section 704, the automatic cache updating section 705, and the cache server cooperating section 707. Based on the load status of the network received from the QoS path information obtaining section 702, the relay control section 708 determines which relay server is to be used, which path is to be used for obtaining the Web content or content summary, and whether it is necessary to set a priority to the path or not. In the case where it is necessary to obtain the content or content summary by setting a path, the relay control section 708 issues a request for setting a path and canceling the setting of the path, to the path setting section 709. In the case of using relay servers, the relay control section 708 issues a relay instruction to all the relay servers that are used for the relay. Then, the relay control section 708 obtains the Web content or content summary through these relay servers. When it is necessary to set a priority, the relay control section 708 passes a set of information of router to which the priority is to be set, the address of the next hop router, and the priority, and the flow identification information, to the router priority setting section 710, which sets the priority and cancels the setting of the priority.

The QoS path reference relay priority control cache server C701 is implemented by a computer. A recording medium K7 like a disk or a semiconductor memory stores a program for making the computer function as the QoS path reference relay position control cache server. This program runs on the computer to control the operation of the computer, and thereby the communication interface section 701, the QoS path information obtaining section 702, the cache operating section 703, the link prefetching control section 704, the automatic cache updating section 705, the cache server cooperating section 707, the relay control section 708, the path setting section 709, and the router priority setting section 710 are realized on the computer.

Figure 27:
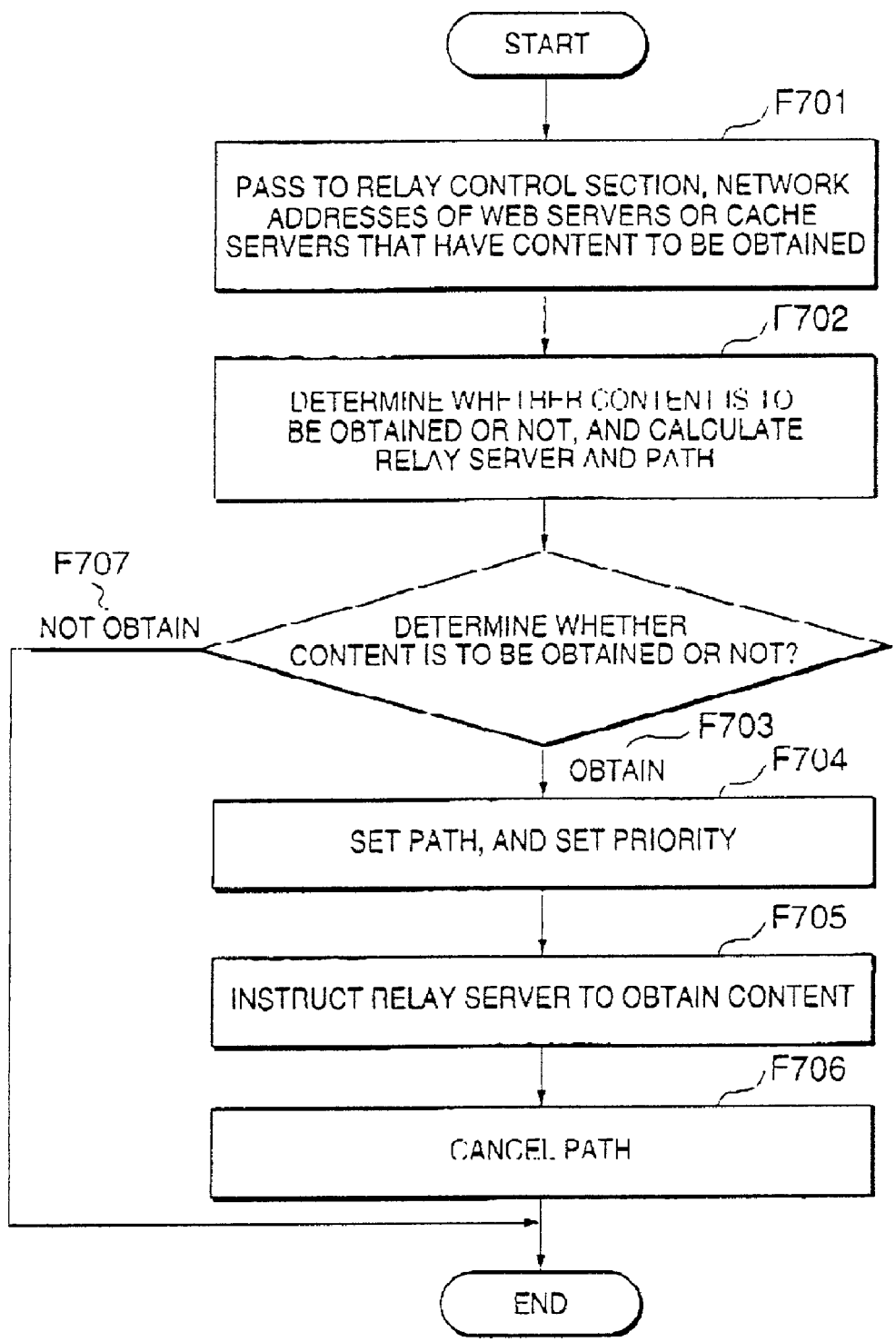
FIG. 27 is a flowchart showing an example of the operation according to the seventh embodiment of the present invention.

FIG. 27 is a flowchart showing the cache operation, the automatic cache updating operation, the link prefetching operation, and the cache server cooperating operation according to the seventh embodiment of the present invention. The operation that the automatic cache updating section 705 carries out for determining the content to be automatically updated, the operation that the link prefetching control section 704 carries out for determining the content for link prefetching, and the operation that the cache server cooperating section 707 carries out for determining the necessary content or the content summary, are the same as those of the conventional cache server. Therefore, those operations will not be explained here. The operation after the necessary content or content summary has been determined will be described hereafter.

The automatic cache updating section 705, the link prefetching control section 704, and the cache server cooperating section 707 pass to the relay control section 708 network addresses of the cache servers such as the QoS path reference relay priority control cache servers or the Web servers to which they want to make connection to obtain the contents or the content summaries in order to carry out the automatic cache updating operation, the link prefetching operation, and the cache server cooperating operation (F701).

Then, the relay control section 708 determines whether the content should be obtained from the received network address or not, based on the location information of the relay servers recognized in advance and the QoS path information obtained from the QoS path information obtaining section 702. When the contents are to be obtained, the relay control section 708 determines a path and relay servers to be used, and also determines to which path the priority is to be set (F702).

In the case of obtaining the content (F703), the relay control section 708 instructs the path setting section 709 to set the determined path. In the case of setting a priority, the relay control section 708 instructs the router priority setting section 710 to set the priority (F704). After that, obtain the content or the content summary, and passes the obtained content or content summary to the source of request (the automatic cache updating section 705, the link prefetching control section 704, or the cache server cooperating section 707) (F705). Thereafter, the relay control section 708 instructs the path setting section 709 to cancel the set path (F706), and terminates the processing. When the content are not obtained (F707), the processing is terminated immediately.

Figure 28:
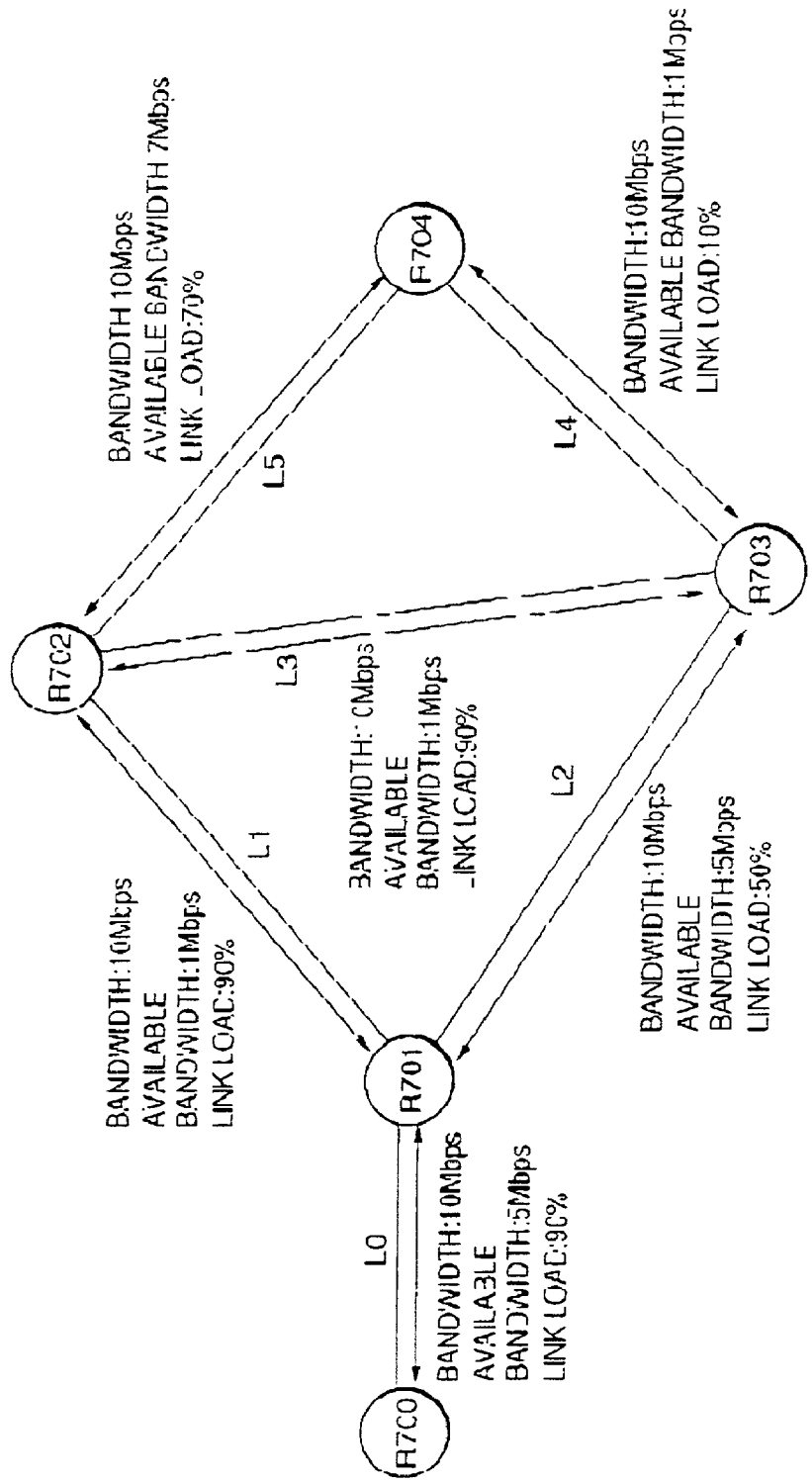
FIG. 28. is a diagram showing one example of QoS path information according to the seventh embodiment of the present invention.

The operation of the present embodiment will be described. Description will be made of a case where the QoS path reference relay priority control cache server C701 obtains certain content α from the Web server S1 in the network system as shown in FIG. 28. It is assumed that paths determined based on the content of a routing table are as follows:

A path from S1 to C601: S1→R702→L1→R701→L0→R700→C701;

A path from S1 to M402: S1→R702→L1→R701→M402;

A path from S1 to M401: S1→R702→L3→R703→M401; and

A path from M401 to M402: M401→R703→L2→R701→M402.

It is further assumed that the QoS path information obtained from the QoS path information obtaining section 702 is as shown in FIG. 28, that when 90% or more of the link bandwidth is being used, a congestion status exists. When the using rate ranges from 60% to 80%, a priority P1 is set, and the influence on other traffics is substantially negligible. In this case, it is considered that a congestion status exists in the link L1 that is on the path from the QoS path reference relay priority control cache server C701 to the Web server S1.

First, the relay control section 708 checks, based on the QoS path information, whether there exists or not a congestion portion on the path that is determined based on the content of the routing table. When a congestion portion does not exist on the path, the relay control section 708 determines a priority based on the load on each link that constitutes the path, and a threshold value that is set to the source of request. The relay control section 708 makes the routing priority setting section 710 set the priority and the communication flow to the router.

However, in this case, a congestion portion (the link L1) exists on the path that is determined based on the content of the routing table. Therefore, the relay control section 706 uses the relay servers M401 and M402 and the path-settable routers R700 to R704 existing on the network, to check whether it is possible or not to set a path from the Web server S1 to the QoS path reference relay priority control cache server C701 without passing through congestion portions (the links L0, L1 and L3). In this example, it is possible to set a path that does not pass through a congestion portion, by using the relay servers M401 and M402, the path-settable routers R400 to R404, and the priority control, without affecting the other traffics and thereby the data is obtained through the path that does not pass through the congestion portion.

In this example, it is possible to set a path as follows.
1) A path is set from the S1 to the M401: S1→R702→L5→R704→L4→R703→M401.
2) The priority P1 is set to the portion of R702→L5→R704 on the flow for obtaining the data in the above (1), and also the priority PD is set to the portion of R704→L4→R703.
3) The data is relayed from the M401 to the M402.

Finally, the QoS path reference relay priority control cache server C701 obtains the data from the M402 according to one of the following methods (4-1) and (4-2).
4-1) After the load on the link L0 has become 80% or lower, the priority P1 is set to the flow at the R701 in the direction from the M402 to the C701 through the R700, and the data is obtained.
4-2) After the load on the link L0 has become 60% or lower, the data is obtained from the M402.

The above operation cannot be achieved in the fourth embodiment that does not have the priority setting function. The operation can be achieved in the seventh embodiment. Based on the above operation, the available bandwidths on the network are effectively utilized. Accordingly, there increases the possibility of achieving the automatic cache updating operation, the link prefetching operation, and the cache server cooperating operation, even in the situation where the conventional cache server has not been able to achieve these operations.

Eight Embodiment

Figure 29:
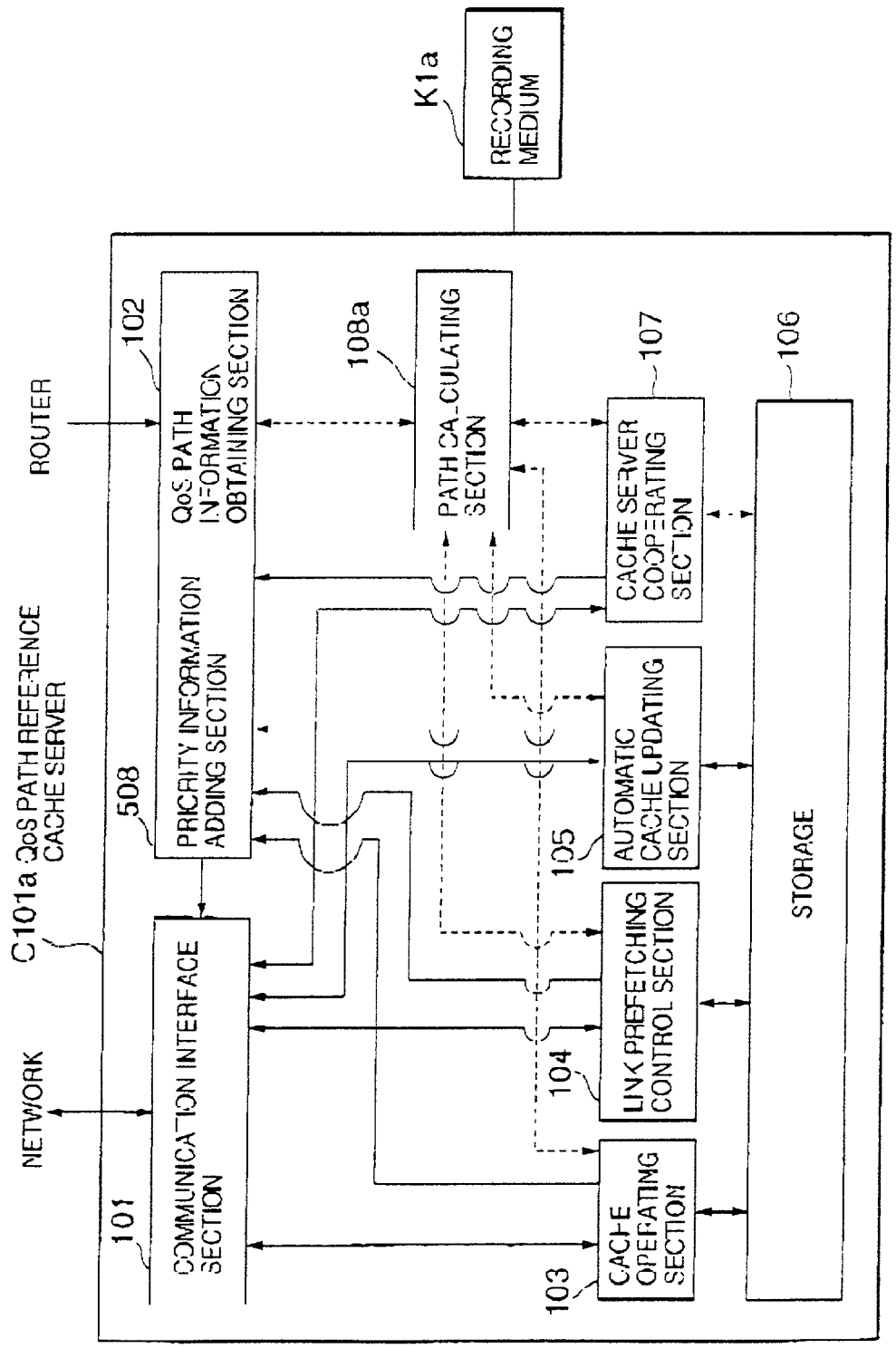
FIG. 29 is a block diagram showing an example of a structure of a QoS path reference cache server C101a that is used in an eighth embodiment of the present invention.

FIG. 29 is a block diagram showing an example of a structure of a QoS path reference cache server C101a that is used in a eight embodiment of the present invention. The eighth embodiment is realized as follows. In the network system of the first embodiment as shown in FIG. 1, each of the QoS path reference cache server C101 to C103 is replaced with a QoS path reference cache server (C101a) as shown in FIG. 29. Further, the routers R100 to R104 are replaced with the priority controllable routers R300 to R304 as shown in FIG. 19.

The QoS path reference cache server C101a shown in FIG. 29 is different from the QoS path reference cache server C101 of the first embodiment shown in FIG. 2 in that the priority information adding section 508 of FIG. 20 (the fifth embodiment) is added, that the path calculating section 108 is replaced with a path calculating section 100a, and that the recording medium K1 is replaced with a recording medium K1a.

The QoS path reference cache server C101a is implemented by a computer. The recording medium K1a like a disk or a semiconductor memory stores a program for making the computer function as the QoS path reference cache server. This program runs on the computer to control the operation of the computer, and thereby the communication interface section 101, the QoS path information obtaining section 102, the cache operating section 103, the link prefetching control section 104, the automatic cache updating section 105, the cache server cooperating section 107, the path calculating section 108a, and the priority information adding section 508 are realized on the computer.

The path calculating section 108a has a function of obtaining a maximum remaining bandwidth path to a Web server or the like based on a network address (indicating the Web server or the like) received from a source of request (the cache operating section 103, the link prefetching control section 104, the automatic cache updating section 105, or the cacher server cooperating section 107) and QoS path information obtained from the QoS path information obtaining section 102. The path calculating section 108a further has a function of providing a priority to the source of request based on the above-described priority-determining methods (a) to (c) (see the description of the priority providing section 509 shown in FIG. 20).

When the network address has been received from the source of request, the path calculating section 108a obtains a maximum remaining bandwidth path to a Web server or the like indicated by the network address. At the same time, the path calculating section 108a determines a priority based on the above priority-determining methods (a) to (c). The source of request passes the determined priority and a transmission packet (including the information showing the content to be obtained) having a path set as the maximum remaining bandwidth path based on the source router option, to the priority information adding section 508. The priority information adding section 508 adds the priority information showing the priority, to the transmission packet, and passes it to the communication interface section 101. As a result, the source of request can carry out transmission/reception of the packet having the priority using the maximum remaining bandwidth path, to/from the other communication party, and can obtain the Web content or content summary.

Ninth Embodiment

Figure 30:
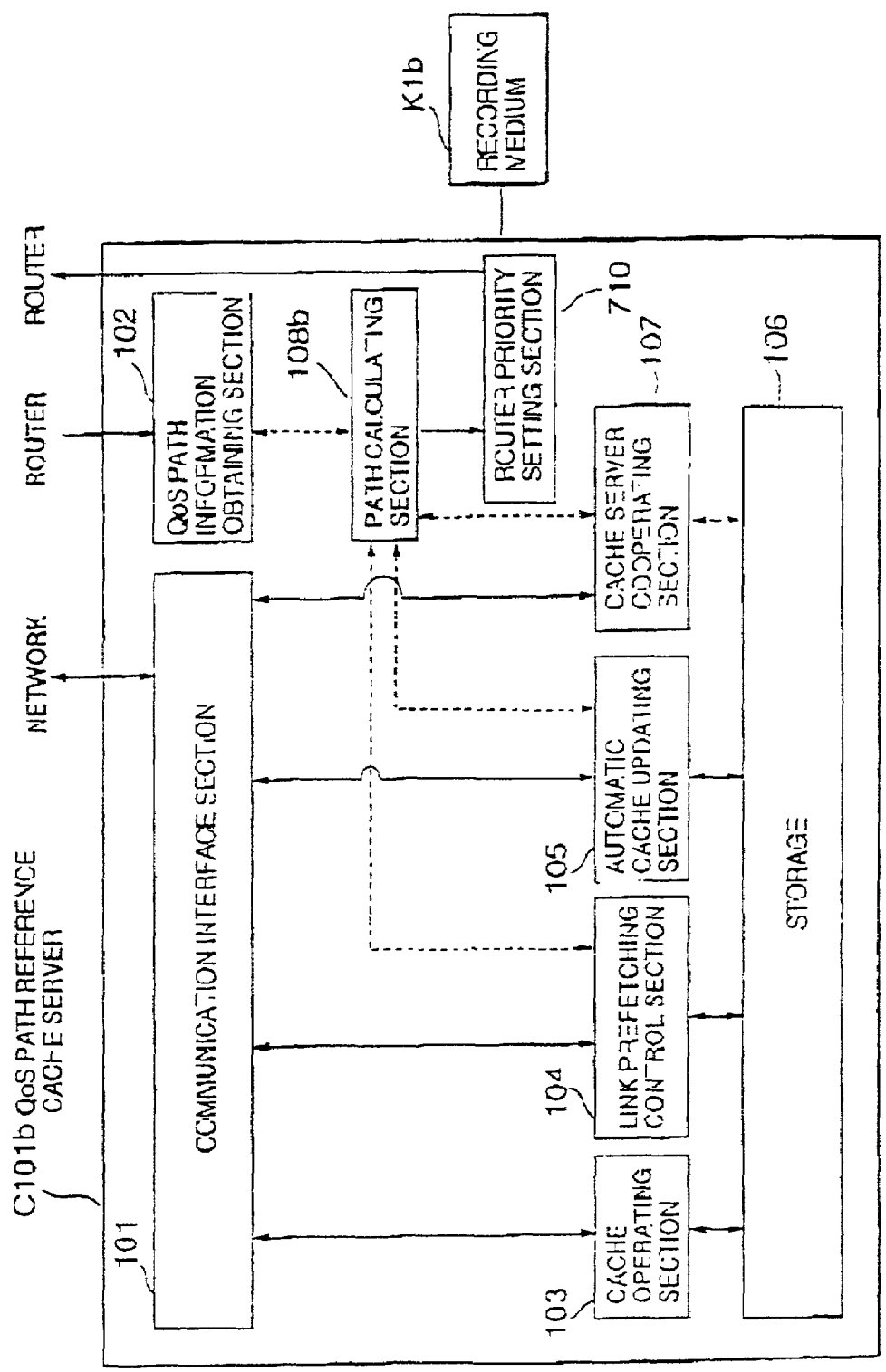
FIG. 30 is a block diagram showing an example of a structure of a QoS path reference cache server C101b that is used in a ninth embodiment of the present invention.

FIG. 30 is a block diagram showing an example of a structure of a QoS path reference cache server C101b that is used in a ninth embodiment of the present invention. The ninth embodiment is realized as follows. In the network system of the first embodiment shown in FIG. 1, the QoS path reference cache servers C101 to C103 are replaced with the QoS path reference cache server C101b shown in FIG. 30. Further, the routers R100 to R104 are replaced with the priority controllable routers R600 to R604 shown in FIG. 22. The QoS path reference cache server C101b shown in FIG. 30 is different from the QoS path reference cache server C101 of the first embodiment shown in FIG. 2 in that the router priority setting section 710 that is the router priority setting section 610 as shown in FIG. 23 (the sixth embodiment) is added, that the path calculating section 108 is replaced with a path calculating section 108b, and that the recording medium K1 is replaced with a recording medium K1b.

The QoS path reference cache server C101b is implemented by a computer. The recording medium K1b like a disk or a semiconductor memory stores a program for making the computer function as the QoS path reference cache server. This program runs on the computer to control the operation of the computer, and thereby the communication interface section 101, the QoS path information obtaining section 102, the cache operating section 103, the link prefetching control section 104, the automatic cache updating section 105, the cache server cooperating section 107, the path calculating section 108b, and the router priority setting section 710 are realized on the computer.

The path calculating section 108b has a function of obtaining a maximum remaining bandwidth path to a Web server indicated by a network address, based on the network address (indicating the Web server) received from a source of request (the link prefetching control section 104, the automatic cache updating section 105, or the cache server cooperating section 107), and the QoS path information obtained from the QoS path information obtaining section 102. The path calculating section 108b also has a function of determining one or more set of router to which priority is to be set, a next hop router, and a priority, based on the above-described methods (d) to (f) (see the description of the priority providing section 609 shown in FIG. 23).

When a network address of the other communication party has been passed from the source of request, the path calculating section 108b obtains a maximum remaining bandwidth path to the other communication party shown in the network address. At the same time, the path calculating section 108a determines one or more set of router to which priority is to be set, a next hop router, and a priority, according to the above-described methods (d) and (f). The source of request passes the determined one or more set of router to which priority is to be set, a next hop router, and a priority, and flow identification information of communication to which the priority is to be set, to the router priority setting section 710. The router priority setting section 710 sets the priority to the router based on the received information. After this has been completed, the source of request obtains the Web content an the like from the other communication party using the maximum remaining bandwidth path, according to a method such as the source route option. Then, the source of request instructs the router priority setting section 710 to cancel the setting. The router priority setting section 710 cancels the setting.

Tenth Embodiment

Figure 31:
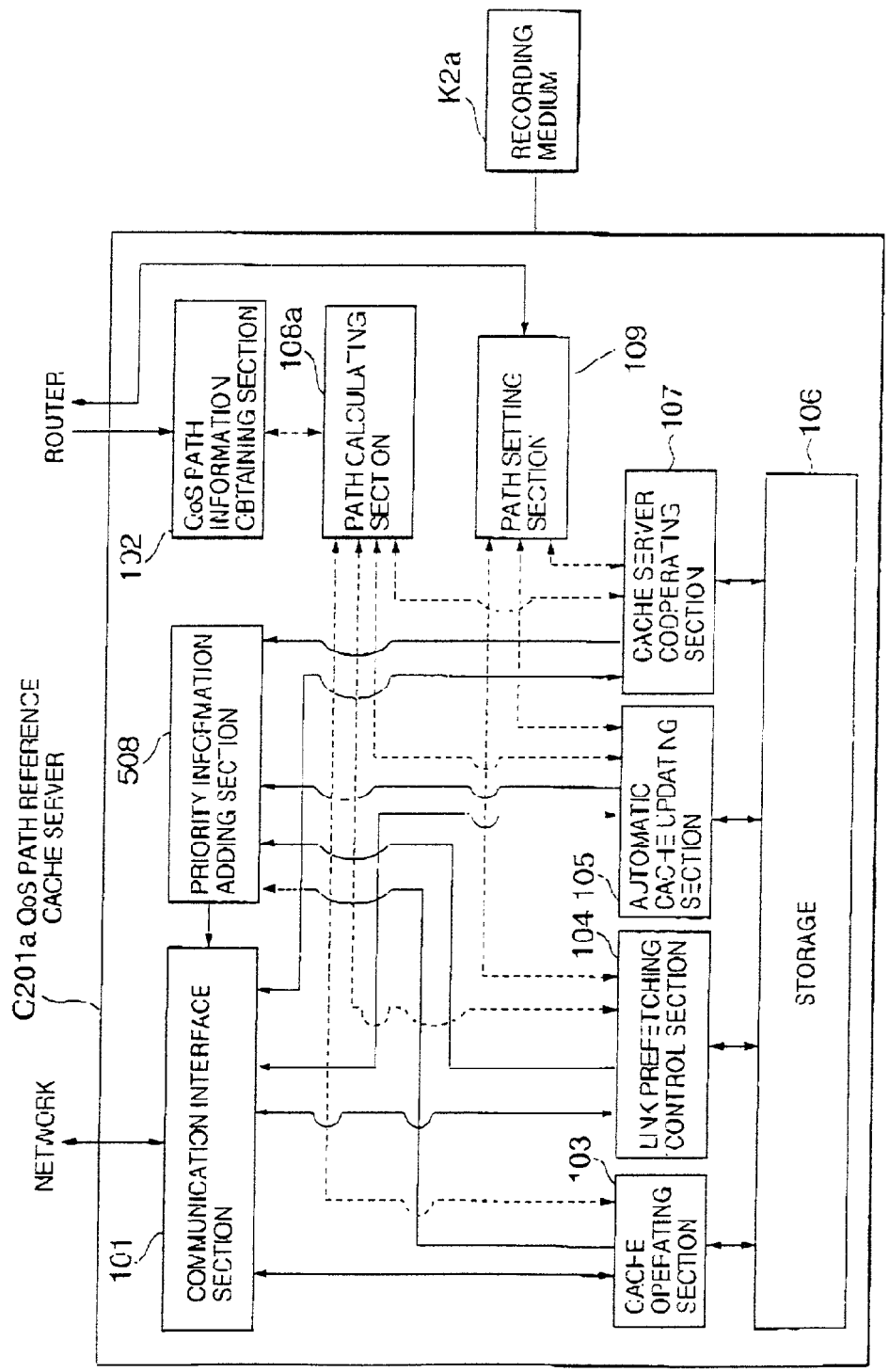
FIG. 31 is a block diagram showing an example of a structure of a QoS path reference cache server C201a that is used in a tenth embodiment of the present invention.

FIG. 31 is a block diagram showing an example of a structure of a QoS path reference cache server C201a that is used in a tenth embodiment of the present invention. The tenth embodiment is realized as follows. In the network system of the second embodiment shown in FIG. 6, the routers R200 to R204 are replaced with routers that can set a path and a priority. Further, the QoS path reference cache servers C201 to C203 are replaced with the QoS path reference cache server C201a shown in FIG. 31.

The QoS path reference cache server C201a shown in FIG. 31 is different from the QoS path reference cache server C201 shown in FIG. 7 in that a priority information adding section 508 is added, that the path calculating section 108 is replaced with a path calculating section 108a, and that the recording medium K2 is replaced with a recording medium K2a.

The QoS path reference cache server C201a is implemented by a computer. The recording medium K2a like a disk or a semiconductor memory stores a program for making the computer function as the QoS path reference cache server. This program runs on the computer to control the operation of the computer, and thereby the communication interface section 101, the QoS path information obtaining section 102, the cache operating section 103, the link prefetching control section 104, the automatic cache updating section 105, the cache server cooperating section 107, the path calculating section 108a, the path setting section 109, and the priority information adding section 508 are realized on the computer.

The path calculating section 108a has a function of obtaining a maximum remaining bandwidth path to a Web server indicated by a network address, based on the network address (indicating the Web server) received from a source of request (the cache operating section 103, the link prefetching control section 104, the automatic cache updating section 105, or the cache server cooperating section 107), and the QoS path information obtained from the QoS path information obtaining section 102. The path calculating section 108a also has a function of providing a priority to the source of request based on the above-described priority-determining methods (a) to (c) (see the description of the priority providing section 509 shown in FIG. 20).

When a network address of the other communication party has been received from the source of request, the path calculating section 108a obtains a maximum remaining bandwidth path to a Web server indicated by the network address. At the same time, the path calculating section 108a determines a priority based on the above priority-determining methods (a) to (c). Thereafter, the path setting section 109 instructs the router to set the maximum remaining bandwhich path on the network. The source of request passes a transmission packet and the determined priority to the priority information adding section 508. The priority information adding section 508 adds the priority to the transmission packet, and passes it to the communication interface section 101. As a result, the source of request can carry out transmission/reception of the packet having the priority using the maximum remaining bandwidth path, to/from the other communication party, and can obtain the Web content and the like.

Eleventh Embodiment

Figure 32:
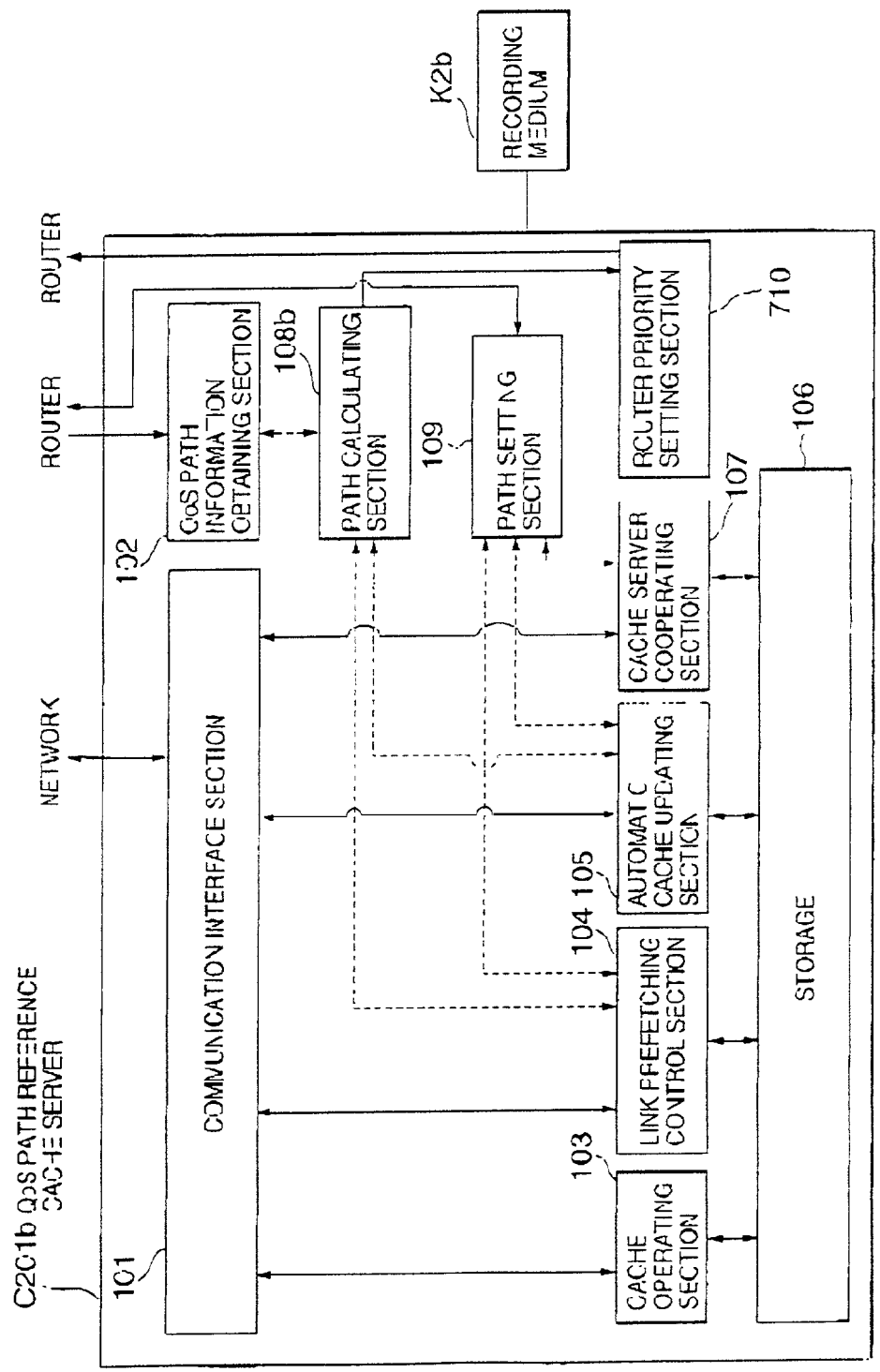
FIG. 32 is a block diagram showing an example of a structure of a QoS path reference cache server C201b that is used in an eleventh embodiment of the present invention.

FIG. 32 is a block diagram showing an example of a structure of a QoS path reference cache server C201b that is used in an eleventh embodiment of the present invention. The eleventh embodiment is realized as follows. In the network system of the second embodiment shown in FIG. 6, the routers R200 to R204 are replaced with the routers R700 to R704 shown in FIG. 26. Further, the QoS path reference cache servers C201 and C203 are replaced with the QoS path reference cache server C201b shown in FIG. 32.

The QoS path reference cache server C201b shown in FIG. 32 is different from the QoS path reference cache server C201 shown in FIG. 7 in that a router priority setting section 710 is added, and that the recording medium K2 is replaced with a recording medium K2b.

The QoS path reference cache server C201b is implemented by a computer. The recording medium K2b like a disk or a semiconductor memory stores a program for making the computer function as the QoS path reference cache server. This program runs on the computer to control the operation of the computer, and thereby the communication interface section 101, the QoS path information obtaining section 102, the cache operating section 103, the link prefetching control section 104, the automatic cache updating section 105, the cache server cooperating section 107, the path calculating section 108b, the path setting section 109, and the router priority setting section 710 are realized on the computer.

The path calculating section 108b has a function of obtaining a maximum remaining bandwidth path to a Web server indicated by a network address, based on the network address (indicating the Web server) received from a source of request (the link prefetching control section 104, the automatic cache updating section 105, or the cache server cooperating section 107), and the QoS path information obtained from the QoS path information obtaining section 102. The path calculating section 108b also has a function of determining one or more set of router to which priority is to be set, a next hop router, and a priority, based on the above-described methods (d) and (f) (see the description of the priority providing section 609 shown in FIG. 23).

When a network address of the other communication party has been received from the source of request, the path calculating section 108a obtains a maximum remaining bandwidth path to the other communication party indicated by the network address. At the same time, the path calculating section 108a determines one or more set of router to which priority is to be set, a next hop router, and a priority, according to the methods (d) and (f). Thereafter, the path setting section 109 instructs the router to set the maximum remaining bandwidth path on the network. The source of request passes the determined one or more set of routers to which priority is to be set, a next hop router, and a priority, and flow identification information of communications to which the priority is to be set, to the router priority setting section 710. The router priority setting section 710 sets the priority to the router based on the received information. After this has been completed, the source of request obtains the Web content or content summary from the other communication party using the maximum remaining bandwidth path. Then, the source of request instructs the router priority setting section 710 to cancel the setting. The router priority setting section 710 cancels the setting.

Twelfth Embodiment

Figure 33:
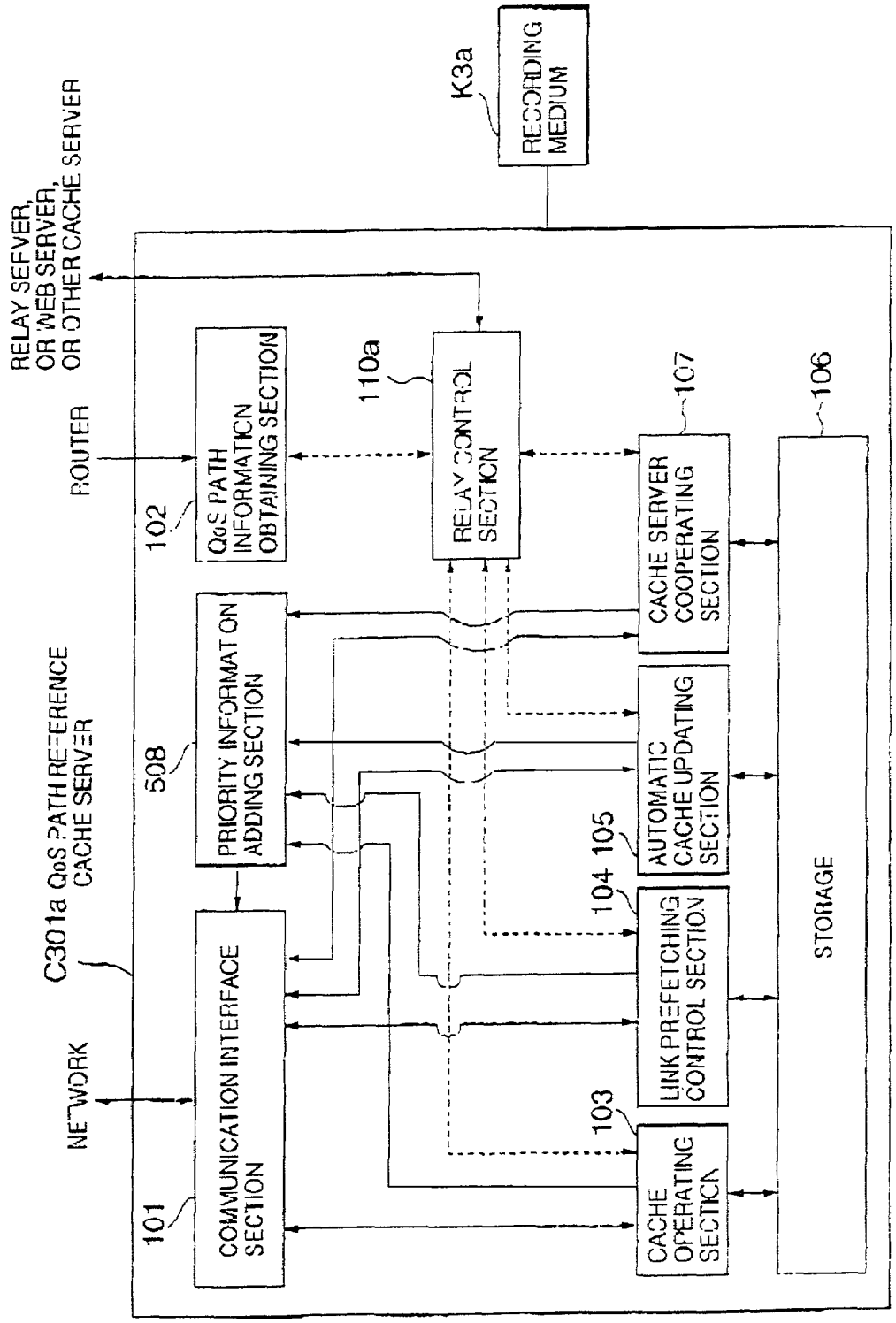
FIG. 33 is a block diagram showing an example of a structure of a QoS path reference relay control cache server C301a that is used in a twelfth embodiment of the present invention.

FIG. 33 is a block diagram showing an example of a structure of a QoS path reference relay control cache server C301a that is used in a twelfth embodiment of the present invention. The twelfth embodiment is realized as follows. In the network system of the third embodiment shown in FIG. 9, each of the QoS path reference relay control cache servers C301 to C303 is replaced with the QoS path reference relay control cache server C301a as shown in FIG. 33. Further, the routers R100 to R104 are replaced with the priority controllable routers R300 to R304 as shown in FIG. 19, respectively.

The QoS path reference relay control cache server C301a shown in FIG. 33 is different from the QoS path reference relay control cache server C301 shown in FIG. 10 in that a priority information adding section 508 is added, the relay control section 110 is replaced with a relay control section 110a, and that the recording medium K3 is replaced with a recording medium K3a.

The QoS path reference relay control cache server C301a is implemented by a computer. The recording medium K3a like a disk or a semiconductor memory stores a program for making the computer function as the QoS path reference relay control cache server. This program runs on the computer to control the operation of the computer, and thereby the communication interface section 101, the QoS path information obtaining section 102, the cache operating section 103, the link prefetching control section 104, the automatic cache updating section 105, the cache server cooperating section 107, the relay control section 110a, and the priority information adding section 500 are realized on the computer.

The relay control section 110a receives information for specifying the Web content or content summary to be obtained, from a source of request (the link prefetching control section 104, the automatic cache updating section 105, or the cache server cooperating section 107). Then, the relay control section 110a determines a priority to be given to the source of request, according the methods (a) to (c). At the same time, the relay control section 110a checks whether or not there exists a congestion portion on the path to the other communication party to be determined based on the content of a routing table, based on the load status of the network held in the QoS path information obtaining section 102. When there exists no congestion portion, the relay control section 110a transfers the priority to the source of request. Then, the source of request passes the priority and a transmission packet to the priority information adding section 508. The priority information adding section 508 adds the priority to this transmission packet, and passes it to the communication interface section 101. As a result, the source of request can carry out transmission/reception of the packet of this priority to/from the other communication party, and can obtain the Web content and the like.

Contrarily, when a congestion portion exists on the path determined based on the content of the routing table, the relay control section 110a decides whether it is possible or not to set a path that does not pass through the congestion portion by using relay servers. When it has been decided that it is possible to set such a path, the relay control section 110a sequentially instructs relay servers, starting from the upstream relay server, to actually relay the Web content and the like. In this case, the relay control section 110a instructs the relay servers to relay the data according to the determined priorities.

When it is not possible to set a path (determined based on the content of the routing table) that does not pass through a congestion portion even when relay servers are used, the content is relayed to a relay server that exists at the upstream of the congestion portion (this may not be a relay server nearest to the congestion portion, but it is most effective to transfer the content to the relay server nearest to the congestion portion). After the traffic has been recovered from the congestion status, the content is transferred to the downstream. In this case, the above-determined priority is set to the relay servers for relaying the content.

Alternatively, when it is not possible to set a path (determined based on the content of the routing table) that does not pass through a congestion portion even when relay servers are used, it is also possible to perform setting as follows. The relay control section 110a obtains a path to the other communication party on which no congestion portion exists, based on the QoS path information. In this case, the path is determined by disregarding the content of the routing table. Then, the relay control section 110a selects all the relay servers or a part of the relay servers existing on the path, as the relay servers to be used. The relay control section 110a instructs a relay server that is located at the most upstream among the relay servers to be used, the content to be obtained, a path for obtaining the content (by using a path designating method such as the source route option), and the priority. In response to this instruction, the relay server obtains the instructed content through the instructed path in the instructed priority. Each relay server up to the relay server located at the most downstream of the path sequentially repeats a similar processing. However, when the path between the relay servers is the same as that determined based on the content of the routing table, only the data to be relayed is designated, and the relay path is not designated. After the content have been relayed to the most downstream relay server, the QoS path reference relay control cache server C301a obtains the content from this most downstream relay server.

Thirteenth Embodiment

Figure 34:
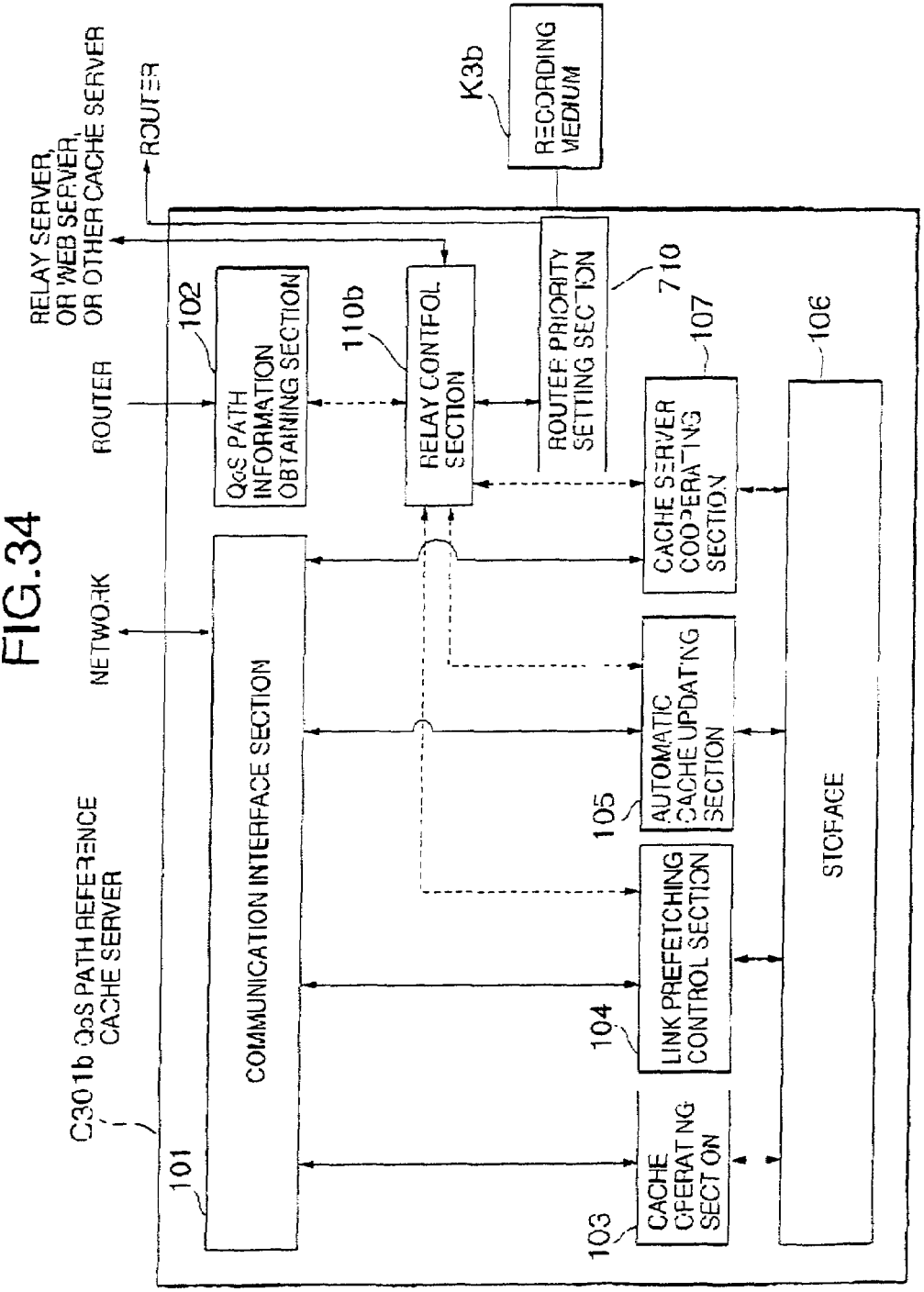
FIG. 34 is a block diagram showing an example of a structure of a QoS path reference relay control cache server C301b that is used in a thirteenth embodiment of the present invention.

FIG. 34 is a block diagram showing an example of a structure of a QoS path reference relay control cache server C301b that is used in a thirteenth embodiment of the present invention. The thirteenth embodiment is realized as follows. In the network system of the third embodiment shown in FIG. 9, each of the QoS path reference relay control cache servers C301 to C303 is replaced with the QoS path reference relay control cache server C301b shown in FIG. 34. Further, the routers R100 to R104 are replaced with the priority controllable routers R600 to R604 shown in FIG. 25, respectively.

The QoS path reference relay control cache server C301b shown in FIG. 34 is different from the QoS path reference relay control cache server C301 shown in FIG. 10 in that a router priority setting section 710 is added, that the relay control section 110 is replaced with a relay control section 110b, and that the recording medium K3 is replaced with a recording medium K3b.

The QoS path reference relay control cache server C301b is implemented by a computer. The recording medium K3b like a disk or a semiconductor memory stores a program for making the computer function as the QoS path reference relay control cache server. This program runs on the computer to control the operation of the computer, and thereby the communication interface section 101, the QoS path information obtaining section 102, the cache operating section 103, the link prefetching control section 104, the automatic cache updating section 105, the cache server cooperating section 107, the relay control section 110b, and the router priority setting section 710 are realized on the computer.

When a network address of the other communication party has been received from a source of request (the link prefetching control section 104, the automatic cache updating section 105, or the cache server cooperating section 107), the path calculating section 100b checks whether or not there exists a congestion portion on the path to the other communication party to be determined based on the content of a routing table. When there exists no congestion portion, the path calculating section 108b determines one or more set of router to which priority is to be set, a next hop router, and a priority, for the path, according to the methods (d) and (f). The source of request passes the determined one or more set of the router to which priority is to be set, the next hop router, and the priority, and flow identification information or communication to which the priority is to be set, to the router priority setting section 710. The router priority setting section 710 sets the priority to the router based on the received information. After this been completed, the source of request obtains the Web content and the like from the other communication party.

Contrarily, when a congestion portion exists on the path determined based on the content of the routing table, the path calculating section 108b checks whether it is possible or not to set a path on which there exists no congestion portion by using relay servers.

When it is possible to set such a path, the path calculating section 108b determines one or more set of router to which priority is to be set, a next hop router, and a priority, for the path, according to the methods (d) and (f). The source of request passes the determined set of the router to which priority is to be set, the next hop router, and the priority, and flow identification information of communications to which the priority is to be set, to the router priority setting section 710. The router priority setting section 710 sets the priority to the router based on the received information. After this has been completed, the source of request sequentially instructs relay servers, starting from the upstream relay server, to actually relay the Web content or the like, and obtains the Web content and the like.

When it is not possible to set a path (determined based on the contact of the router table) that does not pass through a congestion portion even when relay servers are used, the content are relayed to a relay server that exists at the upstream of the congestion portion (this may not be a relay server nearest to the congestion portion, but it is most effective to transfer the content to the relay server nearest to the congestion portion). After the traffic has been recovered from the congestion status, the content are transferred to the downstream.

Figure 35:
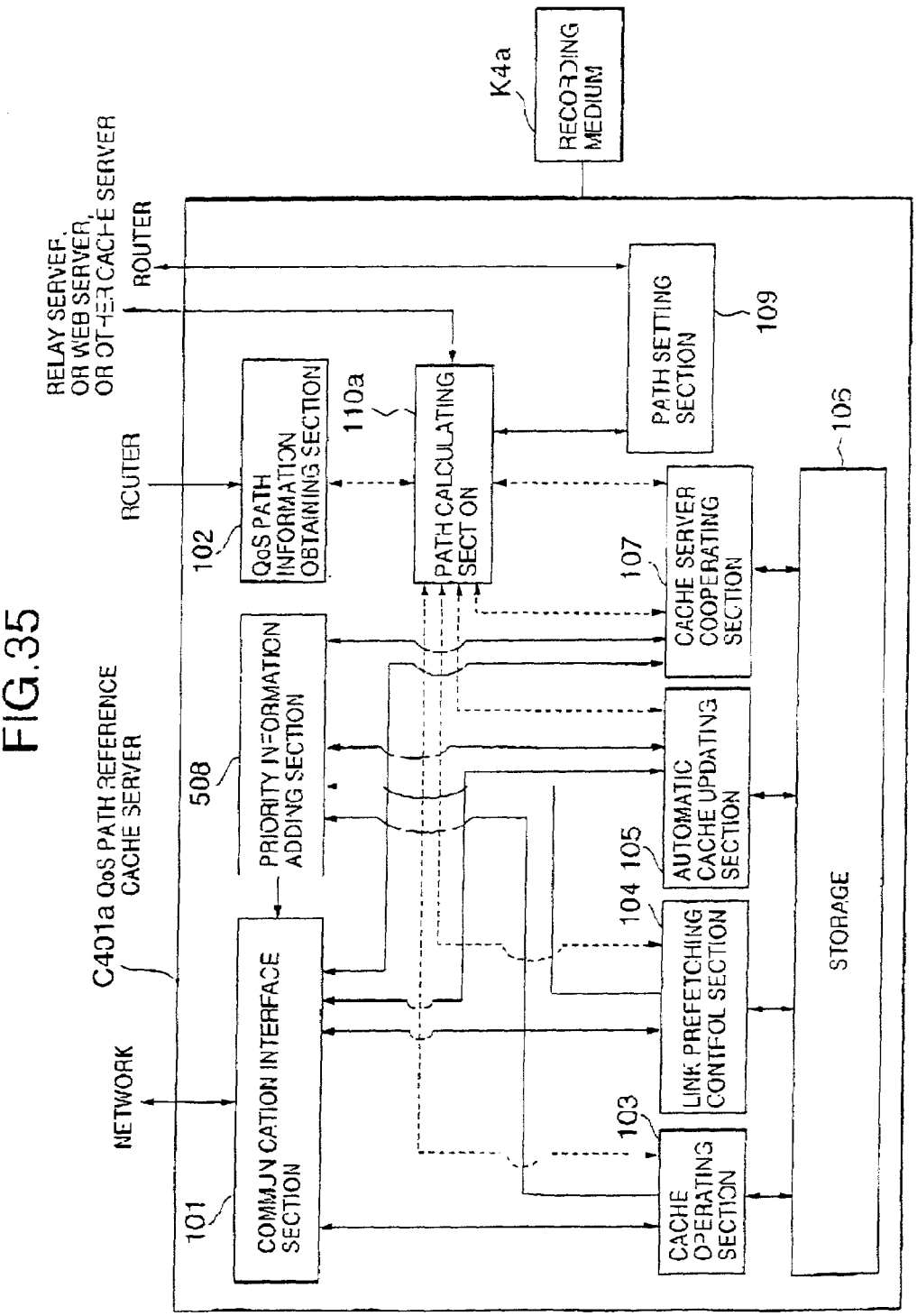
FIG. 35 is a block diagram showing an example of a structure of a QoS path reference relay control cache server C401a that is used in a fourteenth embodiment of the present invention.

Alternatively, when it is not possible to set a path (determined based on the content of the router table) that does not pass through a congestion portion even when relay servers are used, it is also possible to perform setting as follows. The relay control section 110b obtains a path to the other communication party on which no congestion portion exists, based on the QoS path information. In this case, the path is determined by disregarding the content of the routing table. Then, the relay control section 110b selects all the relay servers or a part of the relay servers existing on the path, as the relay servers to be used. The relay control section 110b instructs a relay server that is located at the most upstream among the relay servers to be used, the content to be obtained, a path for obtaining the content (by using a path assigning method like the source route option). In response to this instruction, the relay server obtains the instructed content through the instructed path. Each relay server up to the relay server located at the most downstream of the path sequentially repeats similar processing. However, when the path between the relay servers is the same as that determined based on the content of the routing table, only the date to be relayed is designated, and the relay path is not designated. After the content have been relayed to the most downstream relay server, the QoS path reference relay control cache server C301b obtains the content from this most downstream relay server, Fourteenth Embodiment FIG. 35 is a block diagram showing an example of a structure of a QoS path reference relay control cache server C401a that is used in a fourteenth embodiment of the present invention. The fourteenth embodiment is realized as follows. In the network system of the fourth embodiment shown in FIG. 14, each the QoS path reference relay control cache servers C401 to C403 is replaced with the QoS path reference relay control cache server C401b shown in FIG. 35. Further, the routers R200 to R204 are replaced respectively with routers each of which can set a priority and a path.

The QoS path reference relay control cache server C401a shown in FIG. 35 is different from the QoS path reference relay control cache server C401 shown in FIG. 15 in that a priority information adding section 508 is added, that the relay control section 110 is replaced with a relay control section 110a, and that the recording medium K4 is replaced with a recording medium K4a.

The QoS path reference relay control cache server C401a is implemented by a computer. The recording medium K4a like a disk or a semiconductor memory stores a program for making the computer function as the QoS path reference relay control cache server. This program runs on the computer to control the operation of the computer, and thereby the communication interface section 101, the QoS path information obtaining section 102, the cache operating section 103, the link prefetching control section 104, the automatic cache updating section 105, the cache server cooperating section 107, the relay control section 110a, and the priority information adding section 508 are realized on the computer.

The relay control section 110a receives information for specifying the Web content and content summaries to be obtained, from a source of request, (the link prefetching control section 104, the automatic cache updating section 105, or the cache server cooperating section 107). Then, the relay control section 110a determines a priority to be given to the source of request, according the methods (a) to (c). At the same time, the relay control section 110a checks whether or not there exists a congestion portion on the path to the other communication party to be determined based on the content of a routing table, based on the load status of the network held in the QoS path information obtaining section 102. When there exists no congestion portion, the relay control section 110a notified the source of request of the priority. Then, the source of request passes the received priority and a transmission packet to the priority information adding section 508. The priority information adding section 508 adds the priority to this transmission packet, and passes it to the communication interface section 101. As a result, the source of request can carry out transmission/reception of the packet of this priority to/from the other communication party, and can obtain the Web content and the like.

Contrarily, when a congestion portion exists on the path determined based on the content of the routing table, the relay control section 110a decides whether it is possible or not to set a path on which there exists no congestion portion by using relay servers and path-settable routers. When a decision has been made that it is possible to set a path, the relay control section 110a uses the path setting section 109 to instruct the router to set the path on the network. Thereafter, the relay control section 110a sequentially instructs relay servers, starting from the upstream relay server, to actually relay the Web content and the like. In this case, the relay control section 110a instructs the relay servers to relay according to determined priorities. When it is not possible to set a path that does not pass through a congestion portion even when relay servers are used, the content is relayed to a relay server that exists at the upstream of the congestion portion (this may not be a relay server nearest to the congestion portion, but it is most effective to transfer the content to the relay server nearest to the congestion portion). After the traffic has been recovered from the congestion status, the content is further transferred to the downstream.

According to the present invention, there is a first advantage such that it is possible to execute an automatic cache updating operation, a link prefetching operation, and a cache server cooperating operation in higher probabilities than those of the conventional practice, without deteriorating a congestion status of the network.

Such a first advantage resides in the following arrangements. A path suitable for carrying out the automatic cache updating operation, the link prefetching operation, and the cache server cooperating operation is obtained based on QoS path information. A relay server suitable for carrying out the above three operations is selected, or the priority of communication for carrying out the above three operations is set lower.

According to the present invention, there is a second advantages such that is it possible to obtain desired content in a shorter time than the case of obtaining the content after the congestion status has been canceled. Such a second advantage can be achieved by using relay servers.

Further, according to the present invention, there is a third advantage such that, in the case of using relay servers, it is possible to execute a link prefetching operation, an automatic cache updating operation, and a cache server cooperating operation in higher probabilities, without deteriorating a congestion status of the network. This can be achieved by providing a cache server with a path setting function, and using a path-settable router as a router.

What is claimed is:

1. A network system including comprising:
   a plurality of paths; and
   at least one cache server, the at least one cache server comprising:
   a quality-of-service (QoS) path information obtaining section for obtaining QoS path information including network path information and path load information,
   a path calculating section for identifying a candidate path suitable for carrying out at least one of an automatic cache updating operation, a link prefetching operation, and a cache server cooperating operation, based on the QoS path information obtained by the QoS path information obtaining section, wherein the path calculating section identifies the candidate path as having a maximum remaining bandwidth of the plurality of the paths and identifies a link on the candidate path that has a minimum remaining bandwidth, and
   at least one of an automatic cache updating section, a link prefetching control section, and a cache server cooperating section, which carry out respective ones of the automatic cache updating operation, the link prefetching operation, and the cache server cooperating operation by using the candidate path identified by the path calculating section when the minimum remaining bandwidth is not smaller than a predetermined value.

2. The network system according to claim 1, further comprising:
   a router on which a path control protocol operates to exchange network path information and path load information,
   wherein the QoS path information obtaining section obtains the network path information and the path load information in cooperation with the router.

3. A network system having a plurality of paths, the network system comprising:
   a plurality of path-settable routers, each of which allows a requested path to be set up on a network; and
   at least one cache server, the at least one cache server comprising:
   a quality-of-service (QoS) path information obtaining section for obtaining QoS path information including network path information and path load information,
   a path calculating section for obtaining a candidate path suitable for carrying out at least one of an automatic cache updating operation, a link prefetching operation, and a cache server cooperating operation, based on the QoS path information obtained by the QoS path information obtaining section, wherein the path calculating section identifies the candidate path as having a maximum remaining bandwidth of the plurality of the paths, identifies a link on the candidate path having a minimum remaining bandwidth and determines whether the minimum remaining bandwidth is not smaller than a predetermined value, and at least one of an automatic cache updating section, a link prefetching control section, and a cache server cooperating section, which request at least one of the path-settable routers to set the candidate path obtained by the path calculating section and carry out respective ones of the automatic cache updating operation, the link prefetching operation, and the cache server cooperating operation, by using the candidate path set by said at least one of the path-settable routers.

4. The network system according to claim 3, wherein each of the path-settable routers operates a path control protocol to exchange network path information and path load information, and the QoS path information obtaining section obtains the network path information and the path load information in cooperation with at least one of the path-settable routers.

5. A network system comprising:

a plurality of routers;

at least one cache server; and at least one relay server, wherein each of the routers operates a path control protocol to exchange network path information and path load information, wherein the at least one cache server comprises:

a quality-of-service (QoS) path information obtaining section for obtaining QoS path information including network path information and path load information in cooperation with at least one of the routers, and a relay control section for selecting at least one relay server and a path, which are suitable for carrying out at least one of an automatic cache updating operation, a link prefetching operation, and a cache server cooperating operation, based on the QoS path information obtained by the QoS path information obtaining section, the relay control section selecting the path as having a maximum remaining bandwidth of a plurality of paths by identifying a link on the selected path having a minimum remaining bandwidth, and determining whether the minimum remaining bandwidth is not smaller than a predetermined value, the relay control section further and for instructing the selected at least one relay server about data to be relayed and to relay the data using the selected path, the at least one relay server relaying the data according to an instruction from the relay control section.

6. A cache server comprising:

a QoS path information obtaining section for obtaining QoS path information that includes network path information and path load information;

a path calculating section for identifying a candidate path suitable for carrying out at least one of an automatic cache updating operation, a link prefetching operation, and a cache server cooperating operation, based on the QoS path information obtained by the QoS path information obtaining section, the path calculating section identifying the candidate path having a maximum remaining bandwidth of a plurality of paths and determining a link on the candidate path having a minimum remaining bandwidth, and determining whether the minimum remaining bandwidth is not smaller than a predetermined value; and at least one of an automatic cache updating section, a link prefetching control section, and a cache server cooperating section, which carry out respective ones of the automatic cache updating operation, the link prefetching operation, and the cache server cooperating operation respectively, by utilizing the candidate path identified by the path calculating section.

7. A cache server comprising:

a QoS path information obtaining section for obtaining QoS path information that includes network path information and path load information, in cooperation with at least one path-settable router that operates a path control protocol to exchange network path information and path load information and sets a requested path on the network;

a path calculating section for identifying a candidate path suitable for carrying out at least one of an automatic cache updating operation, a link prefetching operation, and a cache server cooperating operation, based on the QoS path information obtained by the QoS path information obtaining section, the path calculating section identifying the candidate path having a maximum remaining bandwidth of the plurality of the paths and determining a link on the candidate path having a minimum remaining bandwidth, and determining whether the minimum remaining bandwidth is not smaller than a predetermined value; and at least one of an automatic cache updating section, a link prefetching control section, and a cache server cooperating section that requests the path-settable router to set the path obtained by the path calculating section, and carry out respective ones of the automatic cache updating operation, the link prefetching operation, and the cache server cooperating operation respectively, by utilizing the candidate path set by the path-settable router.

8. A cache server comprising:

a QoS path information obtaining section for obtaining QoS path information that includes network path information and path load information, in cooperation with at least one router that operates a path control protocol to exchange network path information and path load information; and a relay control section for selecting a relay server suitable for carrying out at least one of an automatic cache updating operation, a link prefetching operation, and a cache server cooperating operation, based on the QoS path information obtained by the QoS path information obtaining section, the relay control section for identifying a candidate path having a maximum remaining bandwidth of a plurality of paths and identifying a link on the candidate path having a minimum remaining bandwidth, and determining whether the minimum remaining bandwidth is not smaller than a predetermined value, the relay control section further for instructing the selected relay server about data to be relayed.

9. A cache server comprising:

a QoS path information obtaining section for obtaining QoS path information that includes network path information and path load information, in cooperation with at least one path-settable router that operates a path control protocol to exchange network path information and path load information and sets a requested path on the network;

a relay control section for selecting a candidate path and a relay server suitable for carrying out at least one of an automatic cache updating operation, a link prefetching operation, and a cache server cooperating operation, based on the QoS path information obtained by the QoS path information obtaining section, the relay control section for identifying the candidate path having a maximum remaining bandwidth of a plurality of paths and identifying a link on the candidate path having a minimum remaining bandwidth, and determining whether the minimum remaining bandwidth is not smaller than a predetermined value, the relay control section further for instructing the selected relay server about data to be relayed; and a path setting section for requesting said at least one path-settable router to set the candidate path selected by the relay control section.

10. A relay server for relaying data necessary for at least one of an automatic cache updating operation, a link prefetching operation, and a cache server cooperating operation, according to an instruction received from a relay control section provided in a cache server, wherein the relay server identifies a candidate path having a maximum remaining bandwidth of a plurality of paths and identifies a link on the candidate path having a minimum remaining bandwidth, and determines whether the minimum remaining bandwidth is not smaller than a predetermined value.

11. The relay server according to claim 10, wherein the relay server relays data for each content.

12. A router provided on a network, comprising:

a QoS path information obtaining section for obtaining QoS path information that includes network path information and path load information; and a relay control section for selecting a router having a relay function suitable for carrying out at least one of an automatic cache updating operation, a link prefetching operation, and a cache server cooperating operation, based on the QoS path information obtained by the QoS path information obtaining section, and for notifying the selected router of data to be relayed, wherein the relay control section identifies a candidate path having a maximum remaining bandwidth of a plurality of paths and identifies a link on the candidate path having a minimum remaining bandwidth, and determines whether the minimum remaining bandwidth is not smaller than a predetermined value, and wherein the QoS path information obtaining section and the relay control section are provided within a housing of the router, wherein the router relays the data according to an instruction received from a relay control section within another router.

13. A router provided on a network, allowing a requested path to be set on the network, the router comprising:

a QoS path information obtaining section for obtaining QoS path information that includes network path information and path load information;

a relay control section for selecting a candidate path and a router having a relay function suitable for carrying out at least one of an automatic cache updating operation, a link prefetching operation, and a cache server cooperating operation, based on the QoS path information obtained by the QoS path information obtaining section, the relay control section for identifying a candidate path having a maximum remaining bandwidth of a plurality of paths and identifies a link on the candidate path having a minimum remaining bandwidth, and determines whether the minimum remaining bandwidth is not smaller than a predetermined value, and the relay control section for notifying a selected relay server of data to be relayed; and a path setting section for requesting the router to set the candidate path identified by the relay control section, wherein the QoS path information obtaining section, the relay control section and the path setting section are provided within a housing of the router, wherein the router relays the data according to an instruction received from a relay control section within another router.

14. A cache server controlling method comprising:

a) obtaining QoS path information that includes network path information and path load information;

b) obtaining a path suitable for carrying out at least one of an automatic cache updating operation, a link prefetching operation, and a cache server cooperating operation, based on the QoS path information obtained at the step (a) and by b1) identifying a candidate path having a maximum remaining bandwidth of a plurality of paths, b2) identifying a link on the candidate path having a minimum remaining bandwidth, and b3) determining whether the minimum remaining bandwidth is not smaller than a predetermined value; and c) providing at least one of an automatic cache updating step, a link prefetching control step, and a cache server cooperating step, which carry out respective ones of the automatic cache updating operation, the link prefetching operation, and the cache server cooperating operation, by utilizing the path obtained at the step (b).

15. A cache server controlling method comprising:

a) obtaining QoS path information that includes network path information and path load information, in cooperation with at least one path-settable router that operates a path control protocol to exchange network path information and path load information and sets a requested path on the network;

b) obtaining a path suitable for carrying out at least one of an automatic cache updating operation, a link prefetching operation, and a cache server cooperating operation, based on the QoS path information obtained at the step (a) by b1) identifying a candidate path having a maximum remaining bandwidth of a plurality of paths, b2) identifying a link on the candidate path having a minimum remaining bandwidth, and b3) determining whether the minimum remaining bandwidth is not smaller than a predetermined value;

c) requesting at least one path-settable router to set the path obtained by the step (b); and d) providing at least one of an automatic cache updating step, a link prefetching control step, and a cache server cooperating step, which carry out respective ones of the automatic cache updating operation, the link prefetching operation, and the cache server cooperating operation, by utilizing the path set by said at least one path-settable router.

16. A cache server controlling method comprising:

a) obtaining QoS path information that includes network path information and path load information, in cooperation with at least one router that operates a path control protocol to exchange network path information and path load information;

b) selecting at least one relay server suitable for carrying out at least one of an automatic cache updating operation, a link prefetching operation, and a cache server cooperating operation, based on the QoS path information obtained at the step (a)

c) obtaining a path suitable for carrying out the at least one of an automatic cache updating operation, the link prefetching operation, and the cache server cooperating operation, by c1) identifying a candidate path having a maximum remaining bandwidth of a plurality of paths, c2) identifying a link on the candidate path having a minimum remaining bandwidth, and c3) determining whether the minimum remaining bandwidth is not smaller than a predetermined value; and d) instructing said at least one selected relay server about data to be relayed.

17. A cache server controlling method comprising:

a) obtaining QoS path information that includes network path information and path load information, in cooperation with at least one path-settable router that operates a path control protocol to exchange network path information and path load information and sets a requested path on the network;

b) selecting at least one relay server and a path, which are suitable for carrying out at least one of an automatic cache updating operation, a link prefetching operation, and a cache server cooperating operation, based on the QoS path information obtained at the QoS path information obtaining step, and instructing said at least one selected relay server about data to be relayed, wherein the step of selecting the path further comprises b1) identifying a candidate path having a maximum remaining bandwidth of a plurality of paths, b2) identifying a link on the candidate path having a minimum remaining bandwidth, and b3) determining whether the minimum remaining bandwidth is not smaller than a predetermined value; and c) requesting said at least one path-settable router to set the path selected at the step (b).

18. A recording medium storing a program for instructing a computer to function as:

a quality-of-service (QoS) path information obtaining section for obtaining QoS path information including network path information and path load information;

a path calculating section for obtaining a path suitable for carrying out at least one of an automatic cache updating operation, a link prefetching operation, and a cache server cooperating operation, based on the QoS path information obtained by the QoS path information obtaining section, wherein the path calculating section identifies a candidate path having a maximum remaining bandwidth of a plurality of paths and identifies a link on the candidate path having a minimum remaining bandwidth, and determines whether the minimum remaining bandwidth is not smaller than a predetermined value; and at least one of an automatic cache updating section, a link prefetching control section, and a cache server cooperating section, which carry out respective ones of the automatic cache updating operation, the link prefetching operation, and the cache server cooperating operation by using the path obtained by the path calculating section.

19. A recording medium storing a program for instructing a computer to function as:

a QoS path information obtaining section for obtaining QoS path information that includes network path information and path load information, in cooperation with at least one path-settable router that operates a path control protocol to exchange network path information and path load information and sets a requested path on the network;

a path calculating section for obtaining a path suitable for carrying out at least one of an automatic cache updating operation, a link prefetching operation, and a cache server cooperating operation, based on the QoS path information obtained by the QoS path information obtaining section, wherein the path calculating section identifies a candidate path having a maximum remaining bandwidth of a plurality of paths and identifies a link on the candidate path having a minimum remaining bandwidth, and determines whether the minimum remaining bandwidth is not smaller than a predetermined value; and at least one of an automatic cache updating section, a link prefetching control section, and a cache server cooperating section, which request the path-settable router to set the path obtained by the path calculating section, and carry out respective ones of the automatic cache updating operation, the link prefetching operation, and the cache server cooperating operation, by utilizing the path set by the path-settable router.

20. A recording medium storing a program for instructing a computer to function as:

a QoS path information obtaining section for obtaining QoS path information that includes network path information and path load information, in cooperation with at least one router that operates a path control protocol to exchange network path information and path load information; and a relay control section for selecting at least one relay server suitable for carrying out at least one of an automatic cache updating operation, a link prefetching operation, and a cache server cooperating operation, based on the QoS path information obtained by the QoS path information obtaining section, and instructing said at least one relay server about data to be relayed, the relay control section further selecting a candidate path having a maximum remaining bandwidth of a plurality of paths, identifying a link on the candidate path having a minimum remaining bandwidth, and determining whether the minimum remaining bandwidth is not smaller than a predetermined value.

21. A recording medium storing a program for instructing a computer to function as:

a QoS path information obtaining section for obtaining QoS path information that includes network path information and path load information, in cooperation with at least one path-settable router that operates a path control protocol to exchange network path information and path load information and sets a requested path on the network;

a relay control section for selecting at least one relay server and a path suitable for carrying out at least one of an automatic cache updating operation, a link prefetching operation, and a cache server cooperating operation, based on the QoS path information obtained by the QoS path information obtaining section, and instructing said at least one relay server about data to be relayed, the relay control section selecting the path by identifying candidate path having a maximum remaining bandwidth of a plurality of paths, identifying a link on the candidate path having a minimum remaining bandwidth, and determining whether the minimum remaining bandwidth is not smaller than a predetermined value; and a path setting section for requesting at least one path-settable router to set the path selected by the relay control section.

22. A network system including a plurality of routers and at least one cache server, said at least one cache server comprising:

a network monitor for monitoring a network to obtain QoS path information including network path information and path load information;

a path calculator for calculating a path for use in a cache control operation that is at least one of an automatic cache updating operation, a link prefetching operation, and a cache server cooperating operation, wherein the path calculator identifies a candidate path having a maximum remaining bandwidth of a plurality of paths and identifies a link on the candidate path having a minimum remaining bandwidth, and determines whether the minimum remaining bandwidth is not smaller than a predetermined value; and a controller for performing said cache control operation through the path calculated by the path calculator.

23. The network system according to claim 22, wherein the controller comprises:

a relay controller for selecting at least one router as a relay router from the routers depending on the path calculated by the path calculator.

24. The network system according to claim 22, wherein said at least one cache server further comprises:

a priority controller for providing a first priority to a packet for use in a communication associated with the cache control operation, wherein the first priority is lower than a second priority provided to a communication associated with an ordinary operation of said at least one cache server.

* * * * *